(12) United States Patent
Sakumoto

(10) Patent No.: US 8,452,974 B2
(45) Date of Patent: May 28, 2013

(54) IMAGE PROCESSING APPARATUS, ELECTRONIC SIGNATURE GENERATION SYSTEM, ELECTRONIC SIGNATURE KEY GENERATION METHOD, IMAGE PROCESSING METHOD, AND PROGRAM

(75) Inventor: Koichi Sakumoto, Tokyo (JP)

(73) Assignee: Sony Corporation, Tokyo (JP)

( * ) Notice: Subject to any disclaimer, the term of this patent is extended or adjusted under 35 U.S.C. 154(b) by 284 days.

(21) Appl. No.: 12/766,506

(22) Filed: Apr. 23, 2010

(65) Prior Publication Data

US 2010/0281267 A1 Nov. 4, 2010

(30) Foreign Application Priority Data

Apr. 30, 2009 (JP) ................................ P2009-111578
May 22, 2009 (JP) ................................ P2009-124035

(51) Int. Cl.
*H04L 9/32* (2006.01)
(52) U.S. Cl.
USPC ............. 713/180; 713/175; 713/176; 726/17; 726/20; 726/21; 726/14
(58) Field of Classification Search
USPC ............. 713/176–180; 380/259–260; 726/30, 726/14–21
See application file for complete search history.

(56) References Cited

U.S. PATENT DOCUMENTS

| | | | | |
|---|---|---|---|---|
| 6,578,144 B1* | 6/2003 | Gennaro et al. | ............... | 713/176 |
| 6,745,327 B1* | 6/2004 | Messing | ........................ | 713/170 |
| 6,910,130 B2* | 6/2005 | Imai et al. | ........................ | 713/180 |
| 7,526,644 B2* | 4/2009 | Kocher | ........................... | 713/158 |
| 7,730,325 B2* | 6/2010 | Morrow et al. | ................ | 713/191 |
| 7,917,764 B2* | 3/2011 | Futa et al. | ........................ | 713/176 |
| 8,090,104 B2* | 1/2012 | Wajs | ................................ | 380/239 |
| 2008/0222418 A1* | 9/2008 | Futa et al. | ........................ | 713/176 |
| 2008/0263363 A1* | 10/2008 | Jueneman et al. | ............. | 713/184 |
| 2009/0185713 A1* | 7/2009 | Koike | ............................ | 382/100 |
| 2011/0055585 A1* | 3/2011 | Lee | ................................. | 713/183 |
| 2011/0126022 A1* | 5/2011 | Sieberer | ......................... | 713/180 |

FOREIGN PATENT DOCUMENTS

JP 3640785 1/2005

OTHER PUBLICATIONS

Nicolas Gonzalez—Deleito, A New Key-Insulated Signature Scheme, Springer, 2004, vol. 3269, pp. 5-8.*
European Search Report in European Application No. EP 10 25 0821 (Aug. 30, 2010).

(Continued)

*Primary Examiner* — Nathan Flynn
*Assistant Examiner* — Viral Lakhia
(74) *Attorney, Agent, or Firm* — Finnegan, Henderson, Farabow, Garrett & Dunner, L.L.P.

(57) ABSTRACT

An image processing apparatus includes a first partial information providing unit that provides first partial information to another device holding a first signing key KS corresponding to a first verification key KV, the first partial information constituting a part of a second verification key KV' (KV'≠KV) that is capable of verifying an electronic signature σ generated using the first signing key KS and being unable to identify the second verification key KV'; a second partial information acquisition unit that acquires second partial information which is generated by the another device using the first partial information and the first signing key KS, and which is unable to identify the first signing key KS and used for generating the remaining part of the second verification key KV'; and a second verification key generation unit that generates the second verification key KV' based on the first and second partial information.

18 Claims, 24 Drawing Sheets

OTHER PUBLICATIONS

K. Sakumoto et al., "Key-Substitutable Signature and its Application to Certified Signature," Research Reports on Mathematical and Computing Sciences, Department of Mathematical and Computing Sciences, Tokyo Institute of Technology; Series C: Computer Science, pp. 1-25 (Jan. 7, 2008).

* cited by examiner

FIG. 20
(A: WITHOUT REVELATION)
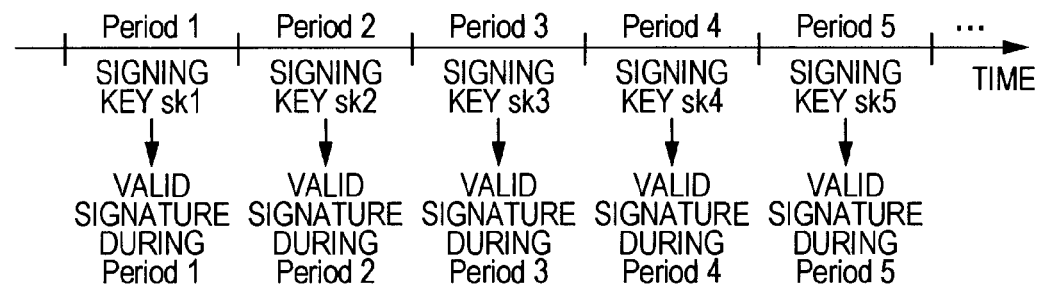
(B: WITH REVELATION)
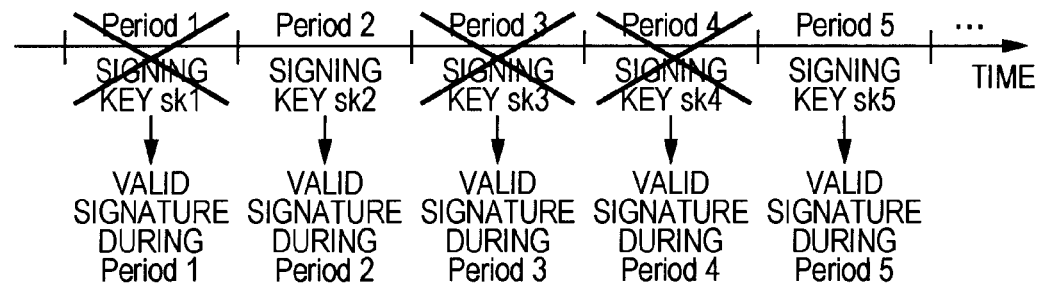
(C: INVALID SIGNATURE)
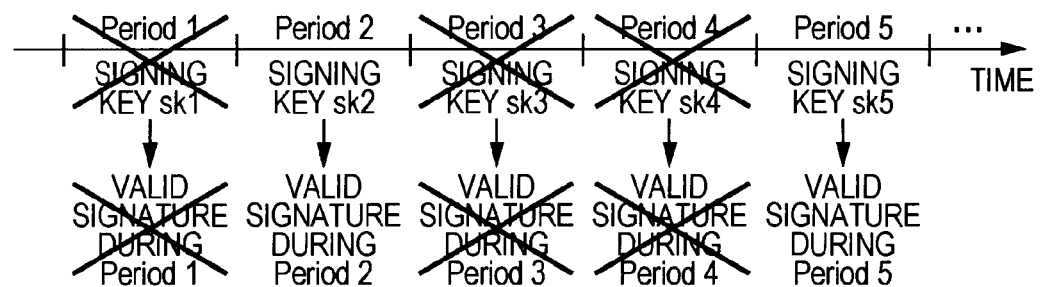

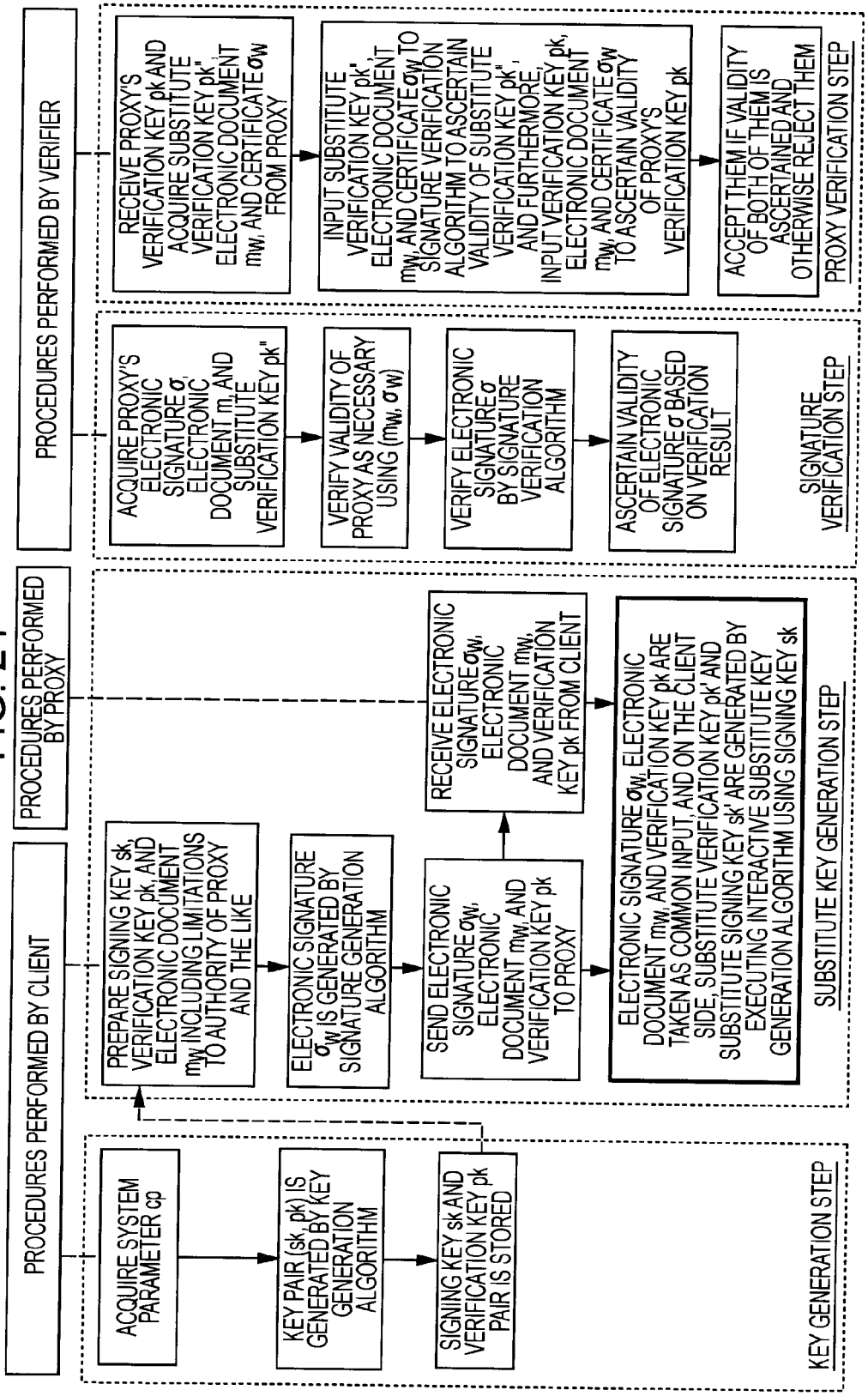

IMAGE PROCESSING APPARATUS, ELECTRONIC SIGNATURE GENERATION SYSTEM, ELECTRONIC SIGNATURE KEY GENERATION METHOD, IMAGE PROCESSING METHOD, AND PROGRAM

BACKGROUND OF THE INVENTION

1. Field of the Invention

The present invention relates to an image processing apparatus, an electronic signature generation system, an electronic signature key generation method, an image processing method, and a program.

2. Description of the Related Art

In general, in order to verify the authorship of a document, the author places a signature, a seal, or the like (hereinafter referred to as a signature) on that document. This signature is an indication that the person who signed takes responsibility for the contents described in that document. If the document is a paper document, the author of the document adds their handwritten signature. On the other hand, if the document is an electronic document, it is difficult for the signer to impress a seal on electronic data or place his/her autograph thereon. For this reason, a method of attaching data called an electronic signature to uniquely identify signers by these electronic signatures is used. In recent years, various documents are digitalized and the importance of electronic signatures is increasing. In such a circumstance, there are many cases where resistance to the forgery of electronic signatures becomes a problem. Although signatures attached to paper documents have the same problem, more caution is necessary for electronic signatures since electronic data can be reproduced more easily.

A well known example of an electronic signature scheme is the ElGamal signature scheme. This scheme is based on the difficulty of the discrete logarithm problem. First, a signer generates a signing key for generating an electronic signature and a verification key for verifying the validity of the electronic signature. Furthermore, the signer makes the verification key available to the public. Then, the signer generates the electronic signature using the signing key and an electronic document and provides the electronic signature to a verifier together with the electronic document. For this reason, the verifier is able to verify the electronic signature using the verification key available to the public. In the case of the ElGamal signature scheme, when one tries to generate a signing key or an electronic signature from a verification key, it is necessary to solve a discrete logarithm problem which is difficult to solve because it involves a large amount of computation. The same difficulty lies in generating a signing key from an electronic signature. Such a difficulty prevents the forgery of signatures.

However, if the signing key is revealed to a third party for some reason, the third party is able to forge the electronic signature freely. Therefore, when the signing key is revealed, it is difficult to differentiate whether the electronic signature generated with the signing key belongs to the true signer or it is forged by the third party. In the case of signatures attached to paper documents, it is possible to differentiate reproduction from the original relatively easily. However, in the case of electronic data, it is difficult to differentiate them perfectly. For this reason, a countermeasure is adopted to invalidate the electronic signature, the signing key, and the verification key at any stage where the revelation of the signing key is discovered. At that time, electronic documents having the electronic signature attached thereto are also made substantially invalid.

Various schemes have been proposed to reduce problems associated with the revelation of the signing key. For example, Japanese Patent No. 3640785 describes a method that sets different signing keys for each period so that the respective signing keys are valid for only electronic signatures generated during each period (see FIG. 21). According to this method, when a signing key is revealed and thus that signing key is disused, signing keys for periods earlier or later than the period corresponding to that signing key can be maintained as valid as they were. For this reason, it is not necessary to invalidate electronic signatures generated during other periods other than the period corresponding to the revealed signing key and electronic documents to which that electronic signature is attached. As a result, it is possible to reduce the number of electronic documents invalidated.

SUMMARY OF THE INVENTION

However, even when the technique described in Japanese Patent No. 3640785 is used, all electronic signatures generated in the period corresponding to the revealed signing key will be invalid, and substantially all electronic documents to which that electronic signature is attached will be invalid. Of course, even if the signing key is not revealed, if a reason to invalidate that signing key arises, there will be electronic documents that become invalid in the same way. As described above, the role of electronic signatures is the same as that of the signatures attached to paper documents. Therefore, depending on the kinds of electronic documents, there are cases where it is not easy to attach electronic signatures to an electronic document again.

For this reason, it is very important to strictly manage the signing keys so as not to be revealed and thus not invalidating electronic signatures. However, it is difficult to guarantee that signing keys will never be revealed. Here, even when a signing key used for generation of a certain electronic signature is revealed, if is possible to produce another verification key valid for that electronic signature (and a corresponding electronic document), that electronic signature will not be invalid. In addition, from a purpose other than due to such a reason, there may be a case where it is convenient to have an algorithm that is capable of securely generating a plurality of verification keys valid for a certain electronic signature and a corresponding electronic document.

In relation to the algorithm described above, the following research reports (hereinafter referred to as SC08 scheme) by Sakumoto and Tanaka are known. SC08 scheme: Koichi Sakumoto and Keisuke Tanaka, "Key-Substitutable Signature", The 2008 Symposium on Cryptography and Information Security, Miyazaki, Japan, Jan. 22-25, 2008.

The SC08 scheme is to allow an entity (hereinafter referred to as a substitute signer) capable of interacting with a signer to generate verification keys (hereinafter referred to as substitute verification keys) valid for a certain electronic signature and a corresponding electronic document. In the SC08 scheme, by providing an algorithm (hereinafter referred to as an interactive algorithm) that generates substitute verification keys in the course of the interaction with a signer, a third party other than a substitute signer is prevented from being able to freely generate a substitute verification key. However, in the SC08 scheme, since the signer generates a substitute verification key substantially in the interactive algorithm, there are concerns about the security of an electronic signature that is generated by the substitute signer using a signing key corresponding to the substitute verification key.

Therefore, it is desirable to provide new or improved image processing apparatus, electronic signature generation system, electronic signature key generation method, image processing method, and program, which enables generation of a substitute verification key more securely using an interactive algorithm.

According to an embodiment of the present invention, there is provided an image processing apparatus including: a first partial information providing unit that provides first partial information to another device holding a first signing key KS corresponding to a first verification key KV, the first partial information constituting a part of a second verification key KV' (KV'≠KV) that is capable of verifying an electronic signature σ generated using the first signing key KS and being unable to identify the second verification key KV'; a second partial information acquisition unit that acquires second partial information which is generated by the other device using the first partial information and the first signing key KS, and which is unable to identify the first signing key KS and is used for generating the remaining part of the second verification key KV' excluding the first partial information; and a second verification key generation unit that generates the second verification key KV' based on the first partial information and the second partial information.

The first signing key KS may be configured to include N1 (N1≧2) parameters, and the second partial information acquisition unit may be configured to acquire the second partial information which is generated using parameters generated using the first partial information and the N1 parameters included in the first signing key KS, and which is unable to identify the individual parameters included in the first signing key KS.

The second verification key KV' may be configured to include N2 (N2≧2) parameters, and the first partial information providing unit may be configured to provide M2 (M2<N2) parameters included in the second verification key KV' as the first partial information.

The second verification key KV' may be configured to include N2 (N2≧2) parameters, and the first partial information providing unit may be configured to provide hash values of M2 (M2<N2) parameters included in the second verification key KV' and (N2−M2) parameters excluding the M2 parameters as the first partial information.

If predetermined arithmetic processing based on random numbers generated by the other device has been subjected to the first partial information when the partial information is generated, the second partial information acquisition unit may be configured to acquire the random numbers generated by the other device together with the second partial information. In this case, the second verification key generation unit generates the second verification key KV' based on the first partial information, the second partial information, and the random number.

According to another embodiment of the present invention, there is provided an image processing apparatus including: a storage unit that stores a first verification key KV and a first signing key KS which are in pair; a first partial information acquisition unit that acquires first partial information which constitutes a part of a second verification key KV' (KV'≠KV) that is capable of verifying an electronic signature σ generated using the first signing key KS, and which is unable to identify the second verification key KV'; a second partial information generation unit that generates second partial information using the first partial information acquired by the first partial information acquisition unit and the first signing key KS, the second partial information being unable to identify the first verification key KV and being used for generating the remaining part of the second verification key KV' excluding the first partial information; and a second partial information providing unit that provides the second partial information generated by the second partial information generation unit to another device that provided the first partial information.

The first signing key KS may be configured to include N1 (N1≧2) parameters, and the second partial information generation unit may be configured to generate the second partial information using parameters generated using the first partial information and the N1 parameters included in the first signing key KS, the second partial information being unable to identify the individual parameters included in the first signing key KS.

The second verification key KV' may be configured to include N2 (N2≧2) parameters, and the first partial information acquisition unit may be configured to acquire M2 (M2<N2) parameters included in the second verification key KV' as the first partial information.

The second verification key KV' may be configured to include N2 (N2≧2) parameters, and the first partial information acquisition unit may be configured to provide hash values of M2 (M2<N2) parameters included in the second verification key KV' and (N2−M2) parameters excluding the M2 parameters as the first partial information.

The image processing apparatus may further include: a random number generator that generates random numbers; and an arithmetic processing unit that performs predetermined arithmetic processing on the first partial information using the random numbers generated by the random number generator. In this case, the second partial information generation unit may be generate the second partial information using the first partial information having subjected to the predetermined arithmetic processing by the arithmetic processing unit and the first signing key KS, and the second partial information providing unit may be configured to provide the random numbers used by the arithmetic processing unit together with the second partial information to the other device.

According to another embodiment of the present invention, there is provided an electronic signature generation system including: a first image processing apparatus; a second image processing apparatus, wherein: the first image processing apparatus includes: a storage unit that stores a first verification key KV and a first signing key KS which are in pair; a first partial information acquisition unit that acquires, from the second image processing apparatus, first partial information which constitutes a part of a second verification key KV' (KV'≠KV) that is capable of verifying an electronic signature σ generated using the first signing key KS, and which is unable to identify the second verification key KV'; a second partial information generation unit that generates second partial information using the first partial information acquired by the first partial information acquisition unit and the first signing key KS, the second partial information being unable to identify the first verification key KV and being used for generating the remaining part of the second verification key KV' excluding the first partial information; and a second partial information providing unit that provides the second partial information generated by the second partial information generation unit to the second image processing apparatus that provided the first partial information; and, the second image processing apparatus includes: a first partial information providing unit that provides the first partial information to the first image processing apparatus; a second partial information acquisition unit that acquires the second partial information; and a second verification key generation unit that generates the second verification key KV' based on the first partial information and the second partial information.

According to another embodiment of the present invention, there is provided an electronic signature key generation method including: a first partial information providing step of providing first partial information to another device holding a first signing key KS corresponding to a first verification key KV, the first partial information constituting a part of a second verification key KV' (KV'≠KV) that is capable of verifying an electronic signature σ generated using the first signing key KS and being unable to identify the second verification key KV'; a second partial information acquisition step of acquiring second partial information which is generated by the other device using the first partial information and the first signing key KS, and which is unable to identify the first signing key KS and is used for generating the remaining part of the second verification key KV' excluding the first partial information; and a second verification key generation step of generating the second verification key KV' based on the first partial information and the second partial information.

According to another embodiment of the present invention, there is provided an image processing method including: a first partial information acquisition step of acquiring first partial information which constitutes a part of a second verification key KV' (KV'≠KV) that is capable of verifying an electronic signature σ generated using a first signing key KS that pairs with a first verification key KV, and which is unable to identify the second verification key KV'; a second partial information generation step of generating second partial information using the first partial information acquired in the first partial information acquisition step and the first signing key KS, the second partial information being unable to identify the first verification key KV and being used for generating the remaining part of the second verification key KV' excluding the first partial information; and a second partial information providing step of providing the second partial information generated in the second partial information generation step to another device that provided the first partial information.

According to another embodiment of the present invention, there is provided an electronic signature key generation method including: a first partial information acquisition step where a second image processing apparatus provides first partial information which constitutes a part of a second verification key KV' (KV'≠KV) that is capable of verifying an electronic signature σ generated using a first signing key KS that pairs with a first verification key KV, and which is unable to identify the second verification key KV'; a first partial information acquisition step where a first image processing apparatus acquires the first partial information from the second image processing apparatus; a second partial information generation step where the first image processing apparatus generates second partial information using the first partial information acquired in the first partial information acquisition step and the first signing key KS, the second partial information being unable to identify the first verification key KV and being used for generating the remaining part of the second verification key KV' excluding the first partial information; a second partial information providing step where the first image processing apparatus provides the second partial information generated in the second partial information generation step to the second image processing apparatus that provided the first partial information; a second partial information acquisition step where the second image processing apparatus acquires the second partial information; and a second verification key generation step where the second image processing apparatus generates the second verification key KV' based on the first partial information and the second partial information.

According to another embodiment of the present invention, there is provided a program for causing a computer to implement: a first partial information providing function of providing first partial information to another device holding a first signing key KS corresponding to a first verification key KV, the first partial information constituting a part of a second verification key KV' (KV'≠KV) that is capable of verifying an electronic signature σ generated using the first signing key KS and being unable to identify the second verification key KV'; a second partial information acquisition function of acquiring second partial information which is generated by the other device using the first partial information and the first signing key KS, and which is unable to identify the first signing key KS and is used for generating the remaining part of the second verification key KV' excluding the first partial information; and a second verification key generation function of generating the second verification key KV' based on the first partial information and the second partial information.

According to another embodiment of the present invention, there is provided a program for causing a computer to implement: a first partial information acquisition function of acquiring first partial information which constitutes a part of a second verification key KV' (KV'≠KV) that is capable of verifying an electronic signature σ generated using a first signing key KS that pairs with a first verification key KV, and which is unable to identify the second verification key KV'; a second partial information generation function of generating second partial information using the first partial information acquired by the first partial information acquisition function and the first signing key KS, the second partial information being unable to identify the first verification key KV and being used for generating the remaining part of the second verification key KV' excluding the first partial information; and a second partial information providing function of providing the second partial information generated by the second partial information generation function to another device that provided the first partial information.

In the image processing apparatus, the other device may be a certificate authority server. Moreover, the image processing apparatus may further include an ID notification unit that notifies the other device of ID information for identifying the first device. Furthermore, the image processing apparatus may be configured to generate an electronic document $m_{ID}$ that includes the ID information generated by the other device having receiving a notification from the ID notification unit and a second verification key KV' that accepts an electronic signature $\sigma_{ID}$ generated using the first signing key KS with respect to the electronic document $m_{ID}$, and use the electronic document $m_{ID}$ and the electronic signature $\sigma_{ID}$ as an electronic certificate for certifying validity of the second verification key KV'.

In the image processing apparatus, the first device may be a proxy terminal used by a proxy that substitutes for an electronic signature of a client. Moreover, the other device may be a client terminal used by the client. Furthermore, the image processing apparatus may be configured to generate an electronic document $m_w$ that includes at least the content of a signing power that the client transfers to the proxy and a second verification key KV' that accepts an electronic signature $\sigma_w$ generated using the first signing key KS with respect to the electronic document $m_w$ using the first partial information providing unit, the second partial information acquisition unit, and the second verification key generation unit, and use the electronic document $m_w$ and the electronic signature $\sigma_w$ as a certificate for certifying that the second verification key KV' is recognized by the client.

According to another embodiment of the present invention, there may be provided a program capable of realizing the functions of the electronic signature generation system in a computer. According to another embodiment of the present invention, there may be provided a computer-readable recording medium recording the program.

As described above, according to the embodiments of the present invention, it is possible to generate a substitute verification key more securely using an interactive algorithm.

BRIEF DESCRIPTION OF THE DRAWINGS

FIG. 20 is a diagram schematically showing a key update method according to a real-life electronic signature scheme.

FIG. 24 is a diagram showing an application method where the substitute key generation method according to the first and second embodiments of the present invention is applied to proxy authentication of a proxy signature scheme.

DESCRIPTION OF THE PREFERRED EMBODIMENTS

Figure 1:
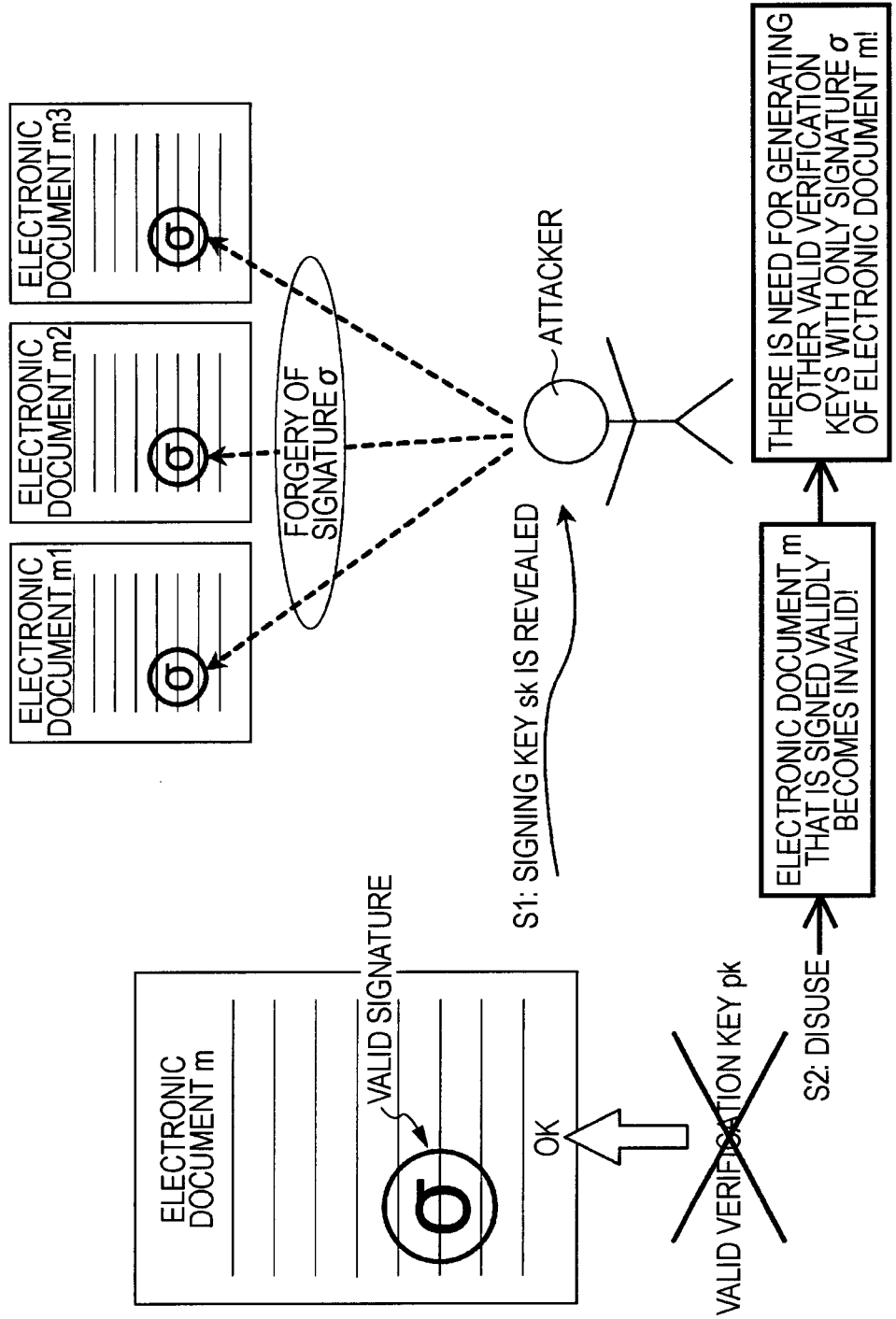
FIG. 1 is a diagram schematically showing problems occurring when a signing key used for generating an electronic signature is revealed.

Hereinafter, preferred embodiments of the present invention will be described with reference to the accompanying drawings. Throughout this specification and the drawings, constituent elements having substantially the same functional configuration will be denoted by the same reference numerals, and redundant description thereof will be omitted.

Flow of Description

Here, the flow of description on the embodiments of the present invention described below will be mentioned in brief. First, by referring to FIG. 1, problems occurring when a signing key used in an electronic signature scheme is revealed will be described in brief. In addition, by referring to FIG. 21, typical countermeasures against the revelation of a signing key will be described in brief, and problems thereof will be discussed.

Figure 2:
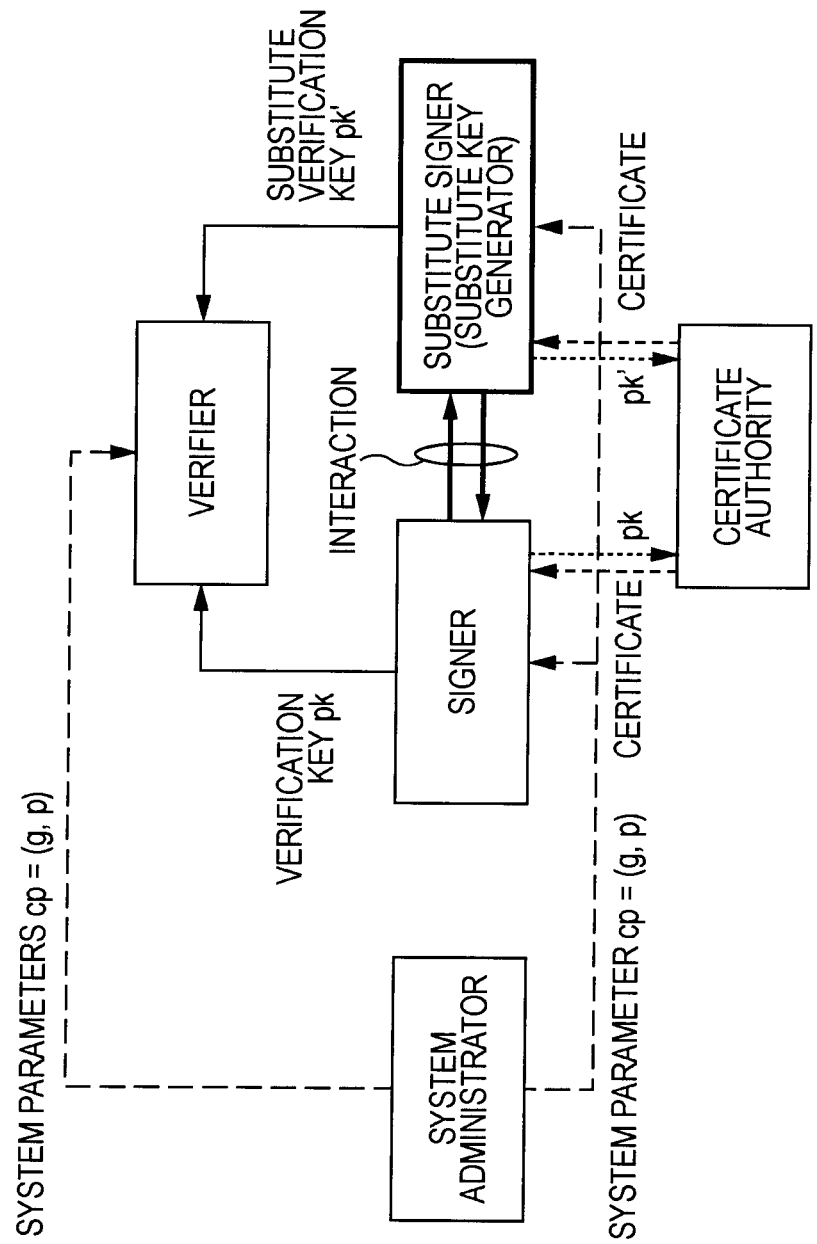
FIG. 2 is a diagram showing one exemplary configuration of the entities of a SC08 scheme which is an example of a key-substitutable electronic signature scheme.

Subsequently, by referring to FIGS. 2 and 3, the configuration of the entities of the SC08 scheme and a key-substitutable electronic signature scheme according to the present embodiment and the procedures performed by each entity will be described. After that, by referring to FIG. 4, the property of a substitute key used in a key update method according to the present embodiment and the requirements of the substitute key will be described. Subsequently, by referring to FIGS. 5 to 9, a substitute key generation method of the SC08 scheme will be described in detail. In this section, problems of the SC08 scheme will be discussed.

Subsequently, by referring to FIGS. 10 to 14, a key-substitutable electronic signature scheme (hereinafter referred to as present scheme 1) according to the first embodiment of the present invention and the configuration of a key update system will be described in detail. In this section, a specific algorithm of the key-substitutable electronic signature scheme according to the embodiment will also be described in detail. In addition, the system configuration of the key update system according to the embodiment and the functional configuration of a signer terminal, a verifier terminal, and a substitute key generator terminal will also be described.

Figure 15:
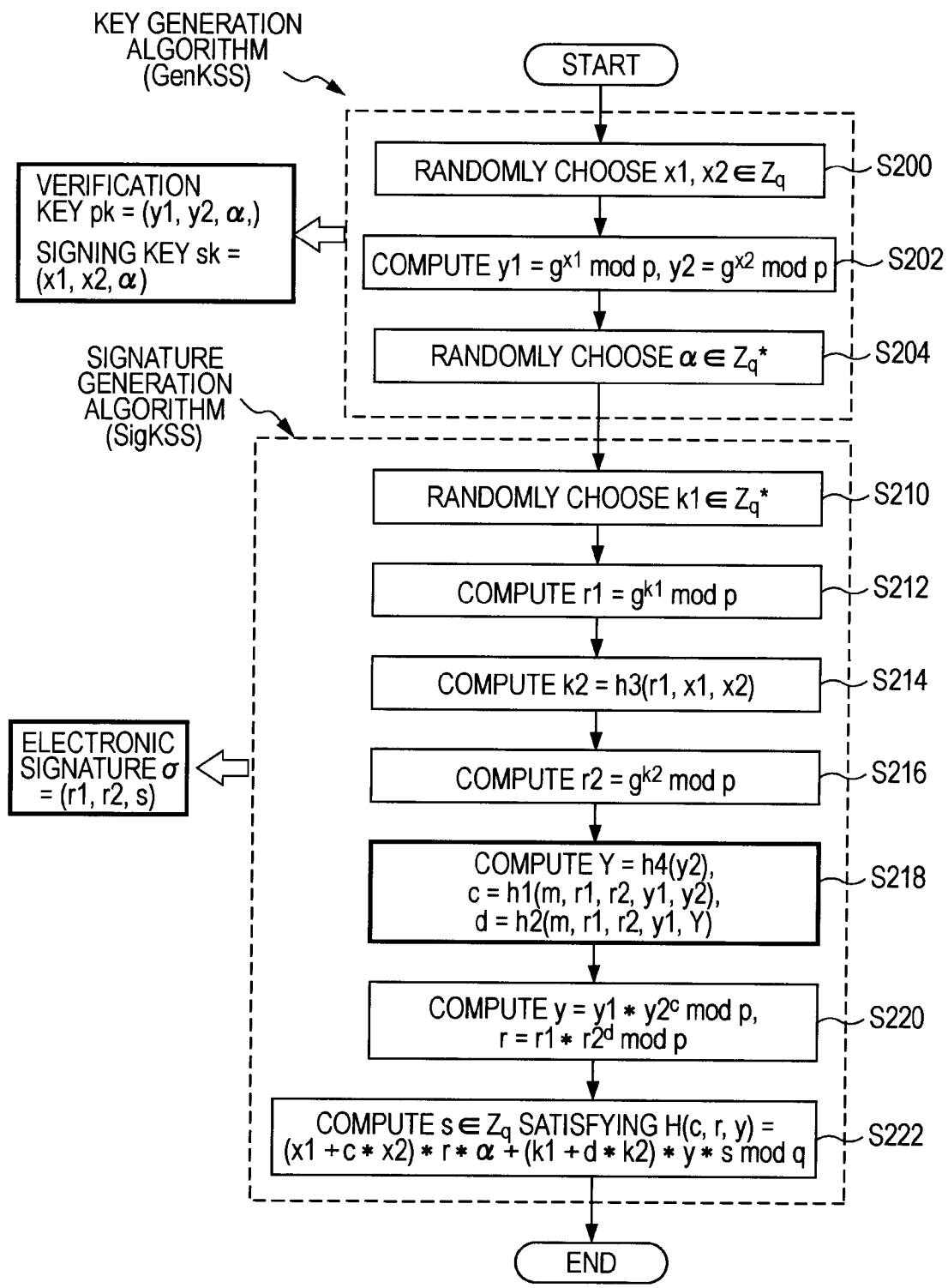
FIG. 15 is a diagram showing an electronic signature generation method according to a second embodiment of the present invention.
Figure 16:
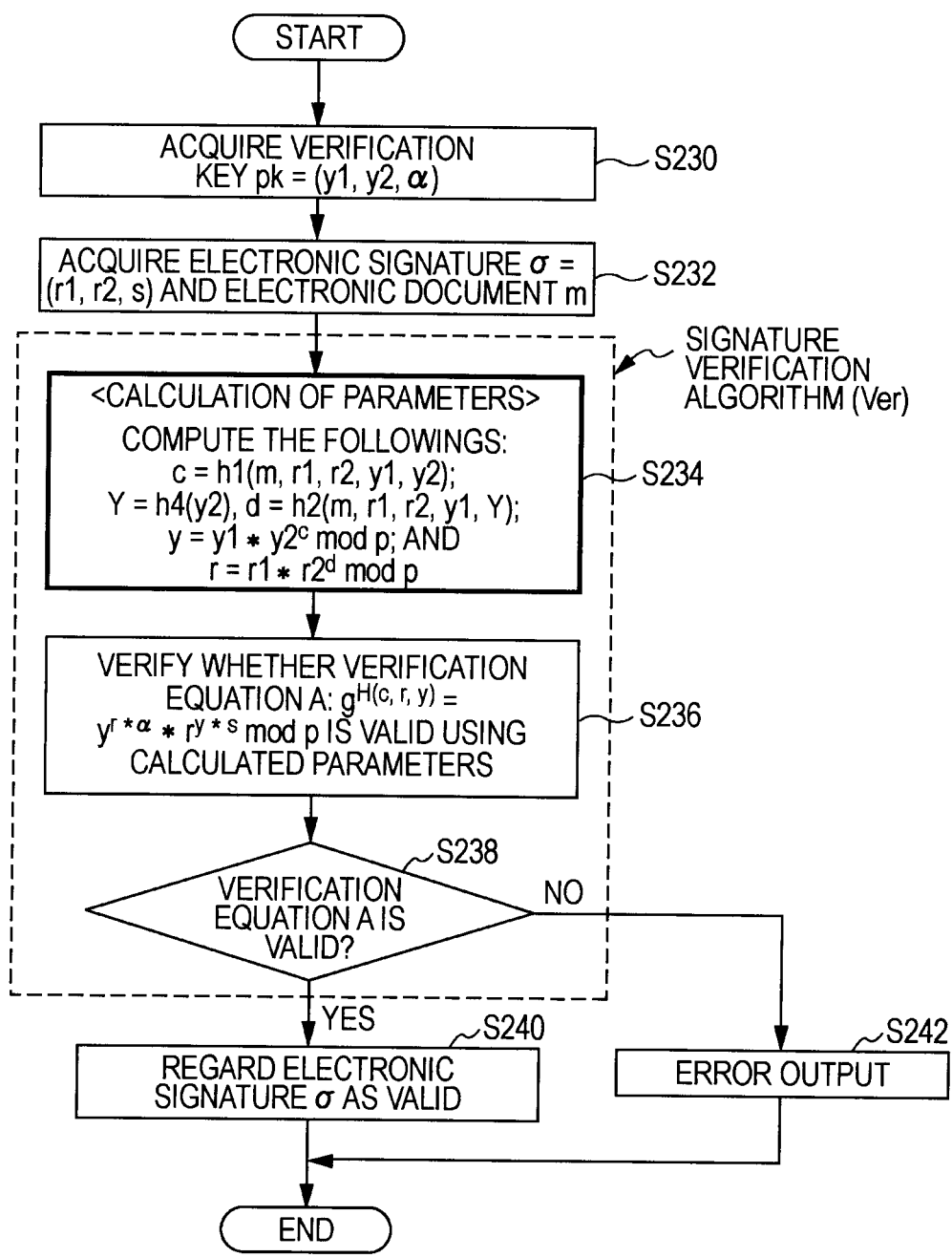
FIG. 16 is a diagram showing an electronic signature verification method according to the second embodiment.
Figure 17:
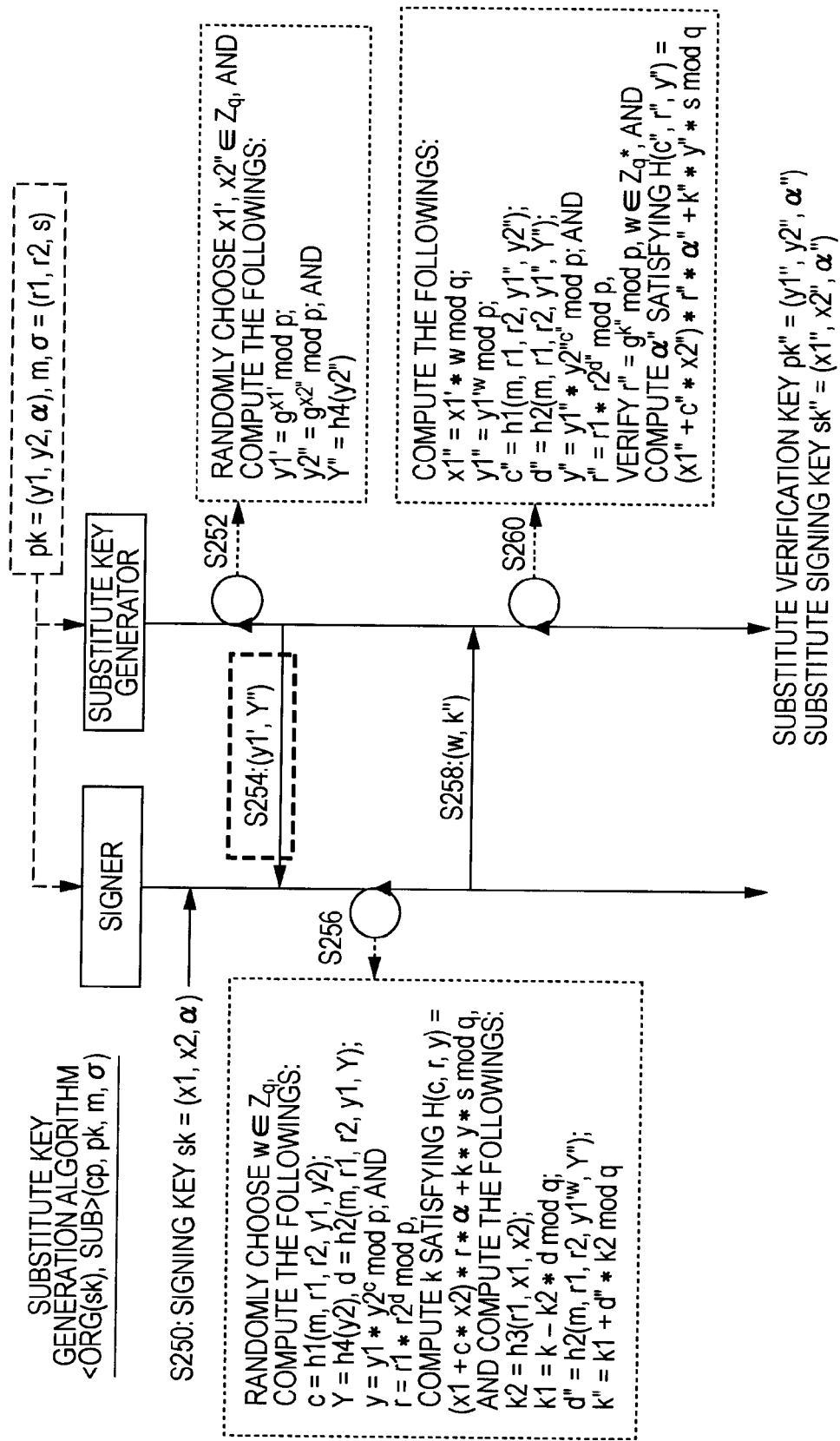
FIG. 17 is a diagram showing a substitute key generation method according to the second embodiment in detail.

Subsequently, by referring to FIGS. 15 to 17, a key-substitutable electronic signature scheme (hereinafter referred to as present scheme 2) according to the second embodiment of the present invention and the configuration of a key update system will be described in detail. In this section, a specific algorithm of the key-substitutable electronic signature scheme according to the embodiment will also be described in detail. However, the system configuration of the key update system according to the embodiment and the functional con-figuration of a signer terminal, a verifier terminal, and a substitute key generator terminal will not be described since they are substantially the same as those of the first embodiment.

Figure 18:
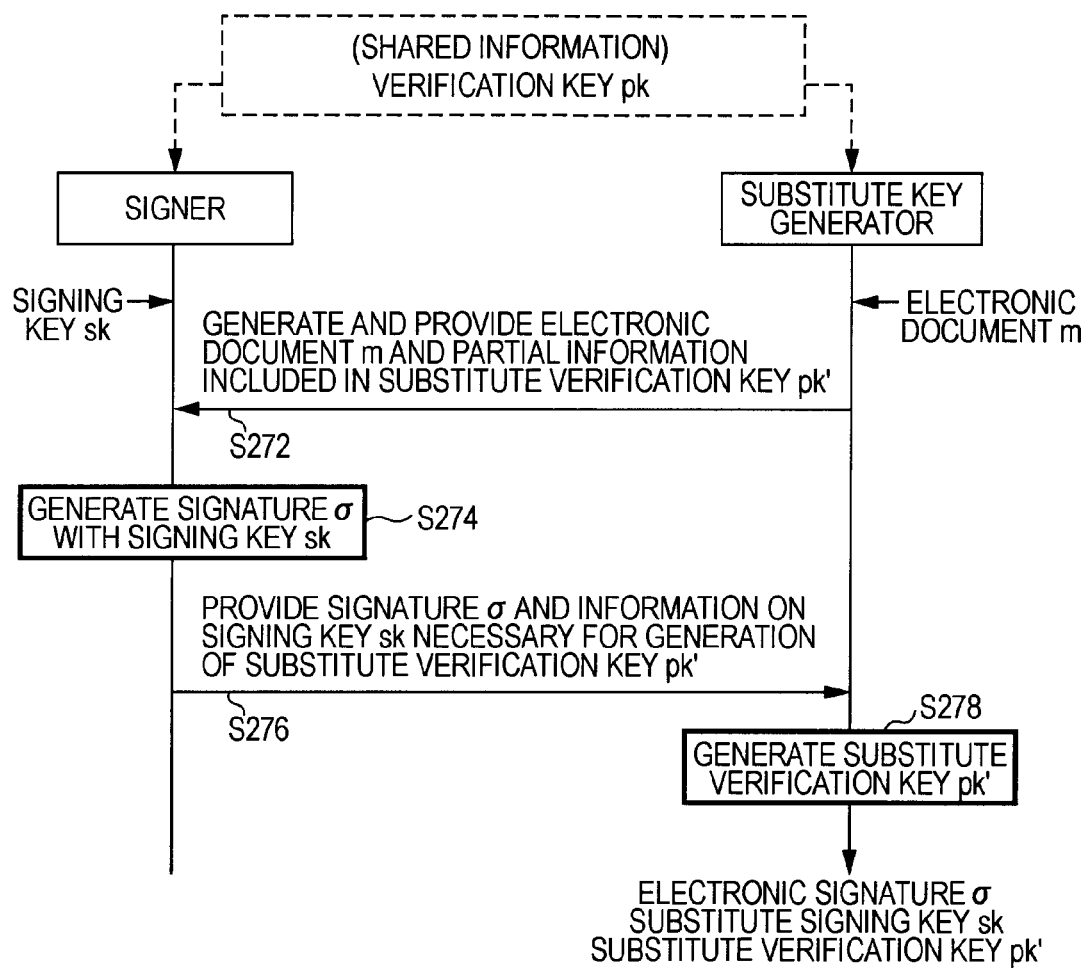
FIG. 18 is a diagram showing the flow of a substitute key generation method according to one modification of the first and second embodiments of the present invention.

Subsequently, by referring to FIG. 18, one modification of the substitute key generation method according to the first and second embodiments of the present invention will be described. After that, by referring to FIG. 20, the exemplary hardware configuration of a signer terminal and a verifier terminal according to the embodiment will be described. Subsequently, by referring to FIGS. 21 and 22, an application method where the substitute key generation method according to the first and second embodiments is applied to PKI will be described. After that, by referring to FIGS. 23 and 24, an application method where the substitute key generation method according to the first and second embodiments is applied to a proxy signature scheme will be described. Subsequently, an application method where the substitute key generation method according to the first and second embodiments is applied to a role-sharing electronic signature scheme will be described.

Description Items
- 1: Introduction
    - 1-1: Revelation of Signing Key
    - 1-2: Real-Life Signature Scheme
    - 1-3: System Configuration
    - 1-4: Property of Substitute Verification Key
    - 1-5: Substitute Key Generation Method of SC08 Scheme
    - 1-6: Algorithm of SC08 Scheme
- 2: First Embodiment
    - 2-1: Substitute Key Generation Method
    - 2-2: Algorithm
    - 2-3: Functional Configuration of Terminal
- 3: Second Embodiment
    - 3-1: Algorithm
- 4: Modifications of First and Second Embodiments
    - 4-1: Substitute Key Generation Method
- 5: Exemplary Hardware Configuration of Terminal
- 6: Application Example
    - 6-1: Application to PKI
    - 6-2: Application to Proxy Signature Scheme
    - 6-3: Application to Role-Sharing Electronic Signature 1: Introduction First, prior to detailed description of embodiments of the present invention, in order to help better understanding of the technical significance of the embodiments and the technical content, the details of the technical content that should be referenced for the understanding will be described in brief. In this section, a substitute key generation method of the SC08 scheme which is considered as the infrastructure in development of the technique of the embodiments and an algorithm thereof will be described in detail.

1-1: Revelation of Signing Key

First, by referring to FIG. 1, revelation of a signing key will be described in brief. In FIG. 1, problems occurring when a signing key sk used for generating an electronic signature σ attached to an electronic document m are schematically shown.

As shown in FIG. 1, a valid electronic signature σ that is attached to an electronic document m using a signing key sk can be verified using a valid verification key pk that pairs with the signing key sk. The verification key pk is made public. Moreover, in this verification, a predetermined verification equation is used. That is to say, a verifier inputs an electronic document m, an electronic signature σ, and information on a verification key pk with respect to a predetermined verification equation and determines whether or not the predetermined verification equation is valid, thus verifying the validity of the electronic signature σ. In this way, when an electronic signature σ for an electronic document m is determined to be valid with respect to the verification key pk, it is said that "the verification key pk accepts the electronic signature σ and electronic document m pair (m, σ).

However, the signing key sk is secretly managed by a signer and typically will not be known to other persons. Of course, the signer will manage the signing key sk so as not to be known to the verifier. However, it is difficult to guarantee that the signing key sk will never be revealed. For example, there may be many cases where a terminal used by a signer gets attacked, and information on a signing key sk stored in the terminal leaks out. Like this, when a signing key sk is revealed to an adversary (hereinafter referred to as an attacker) due to some reason (S1), the attacker is able to attach an electronic signature σ to any electronic document. That is to say, the electronic signature σ is forged.

For instance, let's consider a case where an attacker attaches an electronic signature σ to an electronic document m1 using a revealed signing key sk. In this case, since the electronic signature σ attached to the electronic document m1 is generated using a valid signing key sk, the electronic signature σ will be accepted by a verification key pk. That is to say, the signature is accepted as a signature of a valid signer although it is generated by the attacker. For example, if the electronic document m1 was a contract for the purchase of real estate, the valid signer is in danger of his/her own real estate being sold arbitrarily behind the signer's back.

Therefore, the valid signer will invalidate the signing key sk when the revelation of the signing key sk is detected (S2). When the signing key sk is made invalid, a verification key pk that pairs with the signing key sk will be also made invalid. In addition, the electronic signature σ generated with the signing key sk is also made invalid. For example, if the electronic document m was a contract, when the electronic signature σ is made invalid, the contract transacted using the electronic document m will be made invalid. If the electronic document m was an intra-office document with low importance, it is okay to attach another electronic signature σ' using a newly generated signing key sk'. However, in many cases, it is difficult to just simply place a signature again if the electronic document m was an important document such as a contract transacted with a third party.

The problem of the revealed signing key sk is severe if many such important documents are handled. Various countermeasures have been considered to solve the problem that electronic signatures σ generated in the past are also made invalid accompanied by the revelation of the signing key sk. However, most of the countermeasures are only able to reduce the effect of the electronic signatures σ being made invalid accompanied by the revelation of the signing key sk, but they are not means for recovering the electronic signatures σ having been made invalid. Here, a real-life signature scheme will be introduced as an example of a countermeasure against the revelation of signing keys sk.

1-2: Real-Life Signature Scheme

A real-life signature scheme is a scheme as shown in FIG. 20. In this scheme, signing keys sk are updated every predetermined period. On the other hand, it is assumed that a same verification key pk is used throughout the whole periods. For example, a signing key sk1 is used in Period 1, and an electronic signature that is valid during only Period 1 is generated. When time passes and enters Period 2, a signing key sk2 that is valid during only Period 2 is used, and an electronic signature that is valid during only Period 2 is generated. In this scheme, even if an electronic signature is generated during Period 2 using the signing key sk1, that electronic signature is not accepted by the verification key pk.

Therefore, even when the signing keys sk1, sk3, and sk4 are revealed as shown by Step B in FIG. 20, and the electronic signatures generated during Periods 1, 3, 4 are made invalid as shown by Step C, the electronic signatures generated during Periods 2, 5, . . . , and so on will be maintained as valid as they were. For this reason, it is not necessary to invalidate electronic documents to which the electronic signatures generated during Periods 2, 5, . . . , and so on using the signing key sk2, sk5, . . . , and so on are attached. However, this scheme has not reached a fundamental solution to the above-mentioned problem since the electronic documents to which the electronic signatures generated during Periods 1, 3, and 4 are attached are made invalid. After all, a solution to the above-mentioned problem demands means for recovering electronic signatures σ generated with signing keys sk before the revelation.

In view of such reasons, the present inventors had conceived the idea of generating another verification key pk' that does not accept an electronic signature σ forged by an attacker but only accepts an electronic signature σ that a valid signer attached to an electronic document m in the past. However, it is not easy to generate such another verification key pk' while securing sufficient security. Nevertheless, it may be possible to achieve such another verification key pk' when a substitute key called in the SC08 scheme is used. Thus, the present inventors paid attention to the SC08 scheme.

The SC08 scheme described later is not developed to be used for only the above-mentioned purposes but is developed with the intention to enable generation of a plurality of verification keys that are secure with respect to any electronic signature and electronic document pair. That is to say, the SC08 scheme is not developed for limited applications. Therefore, it should be noted that the SC08 scheme can be used for various applications. Moreover, it should be noted that although the techniques of the embodiments described later put additional ideas to the SC08 scheme to provide higher security, the techniques also can be applied to a wide range of applications.

1-3: System Configuration

Here, a model of an electronic signature system according to the SC08 scheme and the schemes used in the embodiments described later will be described. In these schemes, the model of the electronic signature system is specified by five entities. As shown in FIG. 2, the five entities are a system administrator, a signer, a verifier, a certificate authority, and a substitute signer (hereinafter referred to as a substitute key generator).

The system administrator is an entity that generates system parameters cp using a system parameter generation algorithm (SetupKSS). The signer is an entity that generates signing keys sk unique to each signer and verification keys pk pairing with the signing keys sk using a key generation algorithm (GenKSS). Moreover, the signer generates an electronic signature σ for an electronic document m using a signature generation algorithm (SigKSS).

The verifier is an entity that verifies the validity of an electronic signature σ attached to an electronic document m using a signature verification algorithm (Ver). The substitute key generator is an entity that generates a substitute signing key sk' and a substitute verification key pk' pairing with the substitute signing key sk' using a substitute key generation algorithm <ORG(sk), SUB>. However, when generating a substitute key for a certain electronic document m and an electronic signature σ attached to that electronic document m, the substitute key generator generates the substitute key while performing an interaction with a signer that is a generator of an electronic signature σ attached to that electronic document m. Moreover, the certificate authority is an entity that issues a certificate for guaranteeing the validity of a verification key or a substitute verification key that is generated by the signer or the substitute key generator.

Figure 3:
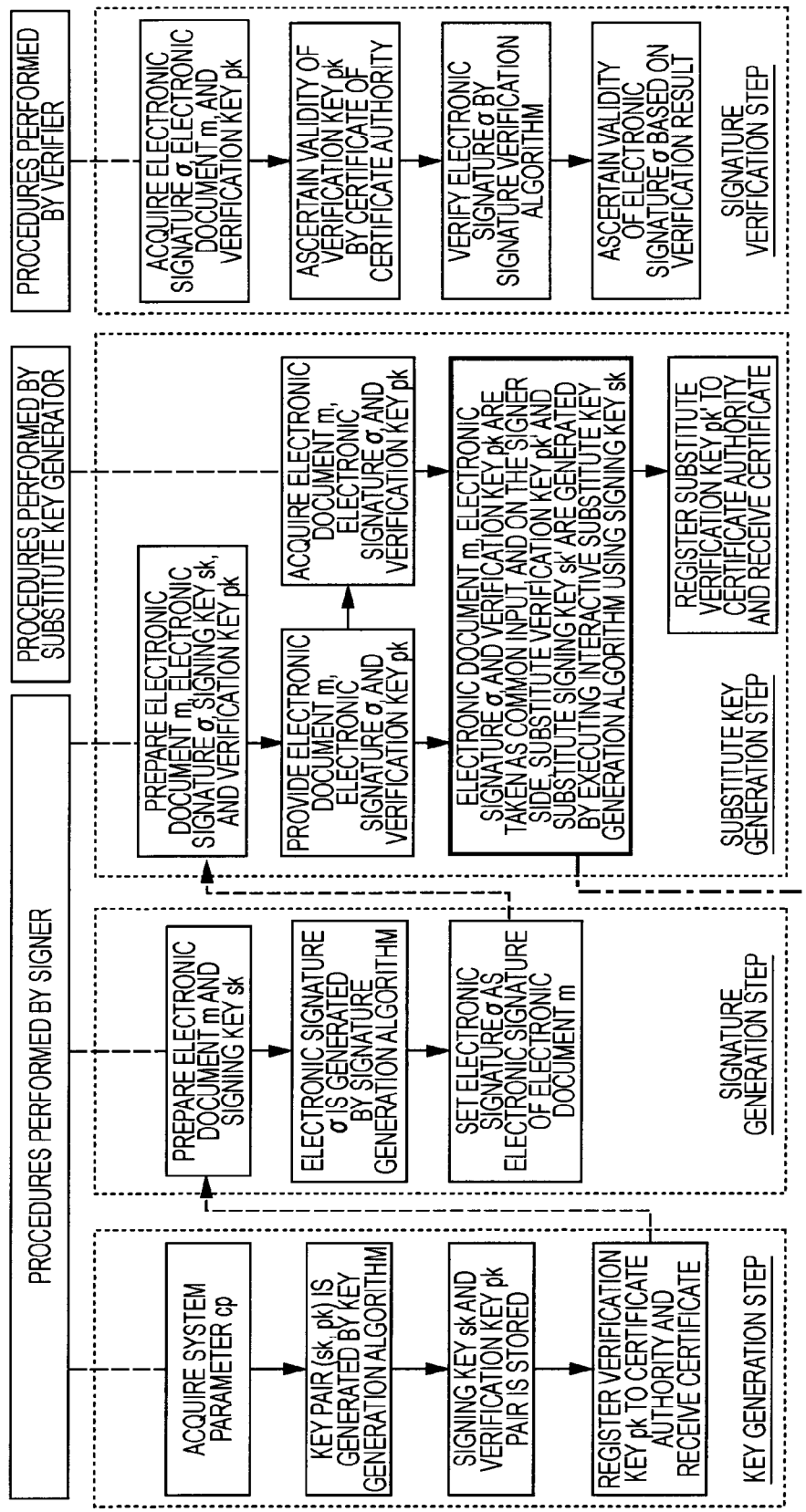
FIG. 3 is a diagram showing a substitute key generation method, an electronic signature generation method, and an electronic signature verification method according to the SC08 scheme.

These entities execute the procedures as shown in FIG. 3, thus achieving generation of signing keys sk and verification keys pk, generation of electronic signatures σ, generation of sgks sk' and substitute verification keys pk', and verification of electronic signatures σ. It will be assumed that system parameters cp are already generated by a system administrator using the system parameter generation algorithm (SetupKSS). The generation of cp using SetupKSS is expressed as Equation 1 below. In the equation, $1^\lambda$ is a security parameter.

$$cp = \text{SetupKSS}(1^\lambda) \quad (1)$$

Key Generation Step by Signer

First, a key generation procedure performed by a signer will be described. As shown in FIG. 3, the signer acquires system parameters cp from a system administrator in a key generation step. Subsequently, the signer inputs the system parameters cp to the key generation algorithm (GenKSS) to generate a signing key sk and verification key pk pair. The generation of (sk, pk) using GenKSS is expressed as Equation (2) below. When the signing key sk and the verification key pk are generated using the key generation algorithm GenKSS, the signer stores the generated signing keys sk and the verification keys pk in a paired manner. Moreover, if necessary, the signer registers a verification key pk to the certificate authority as its own verification key and receives a certificate thereof.

$$(sk, pk) = \text{GenKSS}(cp) \quad (2)$$

Signature Generation Step by Signer

Next, a signature generation procedure performed by the signer will be described. As shown in FIG. 3, the signer prepares an electronic document m to which a signature will be attached and a signing key sk that is stored therein. Subsequently, the signer inputs the signing key sk and the electronic document m to the signature generation algorithm (SigKSS) to generate an electronic signature σ. The generation of σ using SigKSS is expressed as Equation (3) below. Subsequently, the signer sets the electronic signature σ (output of algorithm) generated by Equation (3) below as an electronic signature σ for the electronic document m.

$$\sigma = \text{SigKSS}(sk, m) \quad (3)$$

Substitute Key Generation Step by Signer and Substitute Signer

Next, an outline of a substitute key generation procedure performed collaboratively by the signer and the substitute signer will be described. The details of the substitute key generation method will be described later. First, the signer prepares an electronic document m, an electronic signature σ, a signing key sk used for generation of the electronic signature σ and a verification key pk pairing with the signing key sk. Subsequently, the signer provides the prepared electronic document m, the electronic signature σ, and the verification key pk to a substitute key generator. At this time, the substitute key generator acquires the electronic document m, the electronic signature σ, and the verification key pk from the signer.

Subsequently, the signer and the substitute key generator inputs the verification key pk, the electronic document m, and the electronic signature σ to the substitute key generation algorithm <ORG(sk), SUB> as common parameters. In addition, the signer generates a substitute verification key pk' that accepts the electronic document m and the electronic signature σ and a substitute signing key sk' that pairs with the substitute verification key pk' during an interaction with the substitute key generator. As described in a later stage, it should be noted that although in the SC08 scheme, "actually, the signer generates the substitute key," in the schemes of the embodiments described later, "the substitute key generator generates the substitute key". This is the greatest difference that determines a difference in security between both schemes.

Moreover, the generation of sk' and pk' using <ORG(sk), SUB> is expressed as Equation 4 below. Here, ORG corresponds to the signer, and SUB corresponds to the substitute key generator. That is to say, ORG(sk) indicates that the signer uses a signing key sk in the substitute key generation algorithm. However, the signing key sk is not presented to the substitute key generator which is the SUB but is used for computation that is closed on the side of the signer which is the ORG, and only the computation results thereof are provided to the substitute key generator. The details thereof will be described later. When the substitute signing key sk' and the substitute verification key pk' are generated by Equation 4 below, the substitute key generator registers the substitute verification key pk' to the certificate authority as its own verification key, if necessary, and receives a certificate thereof.

$$(sk',pk')=<ORG(sk),SUB>(pk,m,\sigma) \quad (4)$$

Signature Verification Step by Verifier

Next, a procedure performed by the verifier will be described. First, the verifier acquires the electronic signature σ, the electronic document m, and the verification key pk from the signer. Subsequently, if necessary, the verifier verifies by a certificate of the certificate authority whether or not the verification key pk is a valid verification key of the signer. After that, the verifier inputs the verification key pk, the electronic document m, and the electronic signature σ to the signature verification algorithm (Ver) and calculates a verification result $v_{out}$=0 (error) or 1 (accept). The calculation of $v_{out}$ by Ver is expressed as Equation 5 below. Subsequently, the verifier accepts (σ, m) if $v_{out}$=1 and rejects them if $v_{out}$=0 in accordance with the verification result $v_{out}$ calculated by Equation 5 below. The same processing is performed when performing a verification procedure using the substitute verification key pk'.

$$v_{out}=Ver(pk,m,\sigma) \quad (5)$$

As described above, in these schemes, by the interaction between the signer and the substitute key generator, the substitute verification key pk' that accepts the electronic signature σ for the electronic document m generated with the signing key sk is generated. As mentioned earlier, these schemes are not originally devised to implement a key update method but are techniques for allowing an entity (substitute key generator) other than the signer to securely generate a substitute key. Therefore, an interaction with a valid signer is a requirement of the substitute key generation so that the substitute key is not generated at will. For this reason, in the substitute key generation step, an interactive method that focuses on the kind of input information is used.

1-4: Property of Substitute Verification Key

Figure 4:
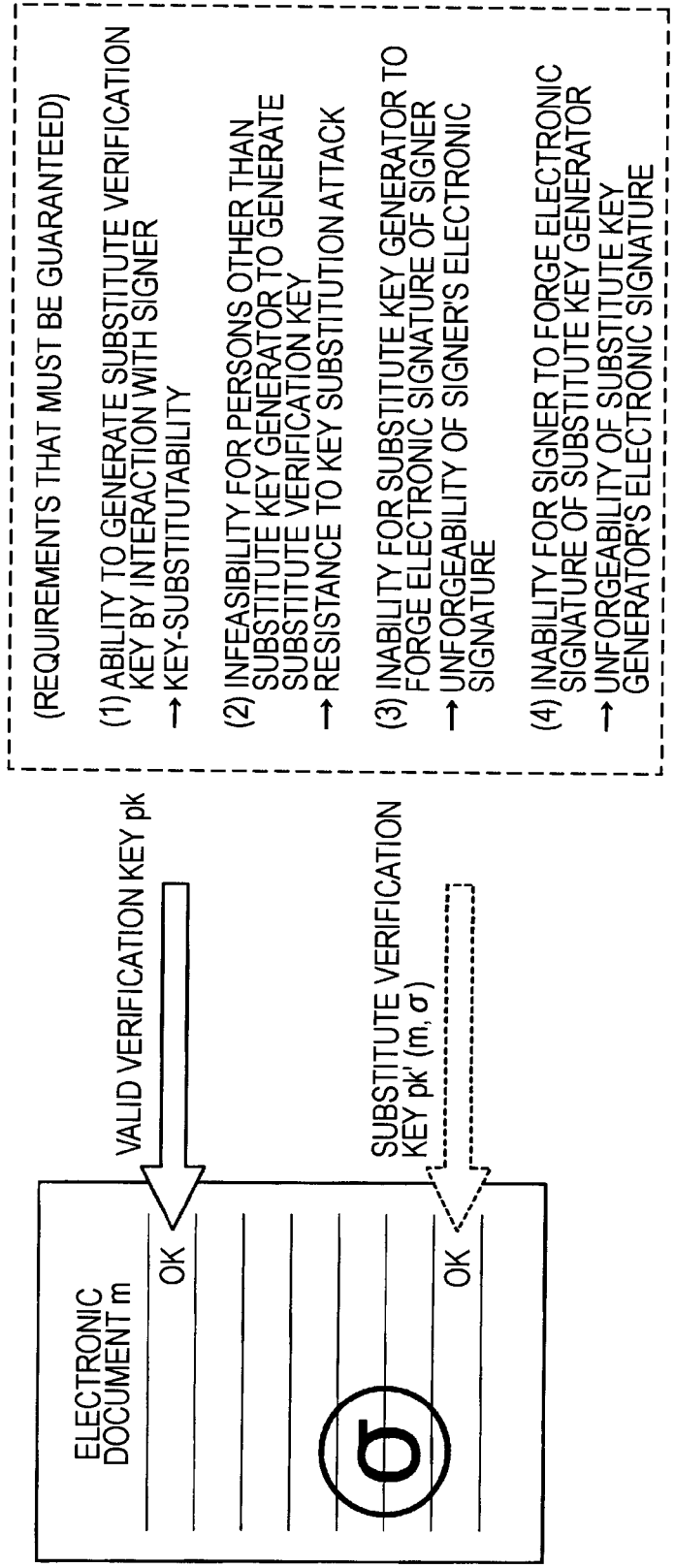
FIG. 4 is a diagram showing the properties of a substitute verification key.

Here, by referring to FIG. 4, the property of the substitute verification key pk' will be summarized in brief. As mentioned earlier, the substitute verification key pk' is configured to accept an electronic signature σ generated with a certain signing key sk and an electronic document m to which that electronic signature σ is attached. Therefore, the substitute verification key pk' is generated with respect to the electronic document m and electronic signature σ pair. Of course, the substitute verification key pk' is different from the verification key pk that pairs with the signing key sk.

Moreover, the substitute verification key pk' must guarantee at least the following requirements. Requirement 1: Ability to generate a substitute verification key pk' by interaction with a signer. Requirement 2: Infeasibility for persons other than the substitute key generator to generate the substitute verification key. By these requirements, entities that are able to generate the substitute verification key pk' are limited to an entity that is able to interact with the signer. In other words, it is possible to give the ability to generate the substitute key to the entity that is able to interact with the signer.

Requirement 3: Inability for the substitute key generator to forge the electronic signature of the signer. That is to say, it is guaranteed as requirement that the substitute key generator is unable to forge the electronic signature of the signer even with information acquired during an interaction. By this requirement, it is possible to secure unforgeability of the signer's electronic signature. Requirement 4: Inability for the signer to forge the electronic signature of the substitute key generator. That is to say, it is guaranteed as requirement that the signer is unable to forge an electronic signature σ' generated using a substitute signing key sk' pairing with the substitute verification key pk' even with information acquired during an interaction. By this requirement, it is possible to secure unforgeability of the substitute key generator' electronic signature.

By satisfying the above-described requirements 1 to 4, it is possible to secure the security of the electronic signature system using the substitute keys. Next, a substitute key generation method of the SC08 scheme satisfying these requirements and a specific algorithm will be described below.

1-5: Substitute Key Generation Method of SC08 Scheme

Figure 5:
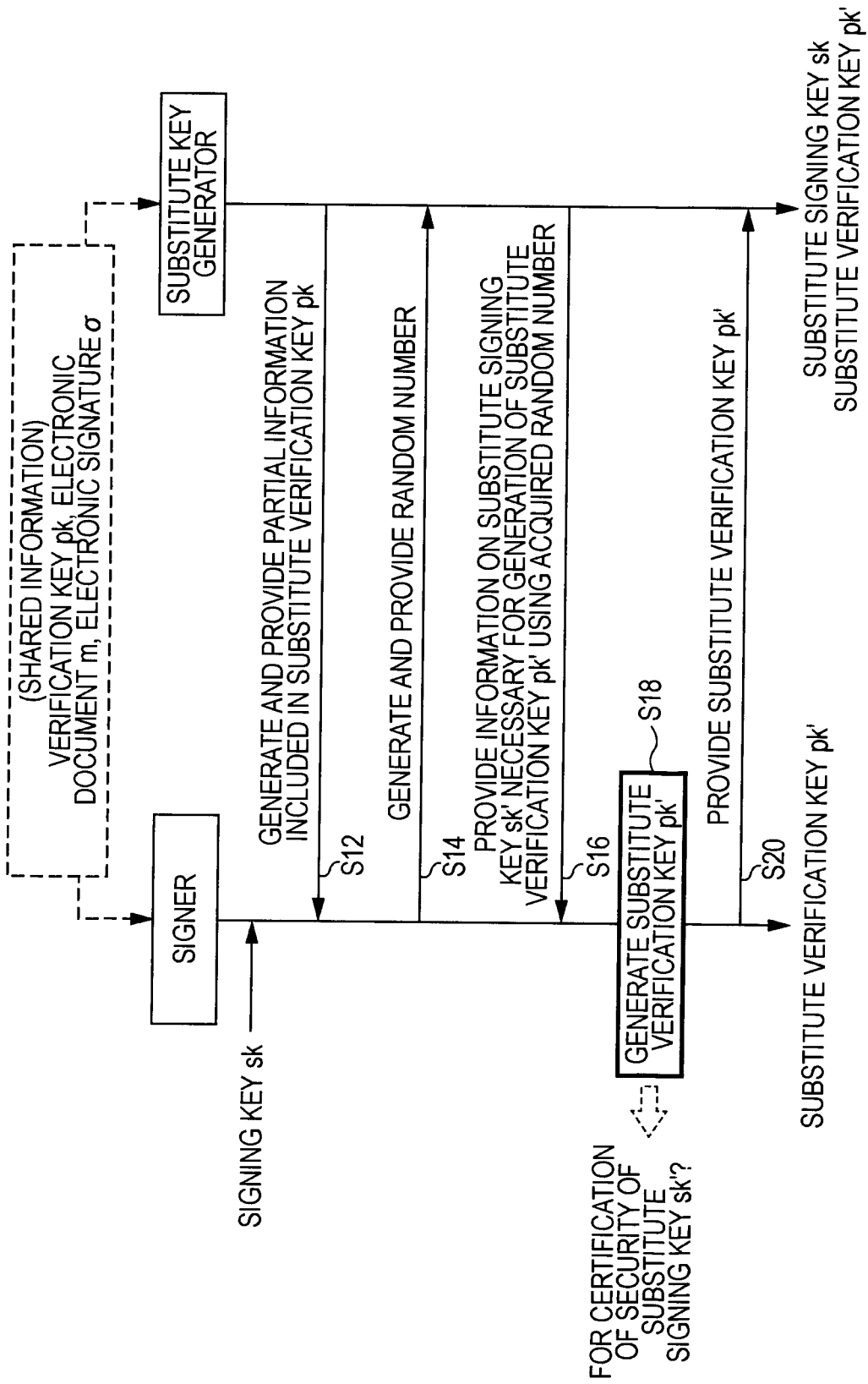
FIG. 5 is a diagram showing the flow of a substitute key generation method according to the SC08 scheme.

First, reference is made to FIG. 5. FIG. 5 is a diagram illustrating a rough processing flow in the substitute key generation algorithm <ORG(sk), SUB> of the SC08 scheme. As shown in FIG. 5, it will be assumed that a verification key pk, an electronic document m, and an electronic signature σ are input as information shared between a signer and a substitute key generator. Moreover, a signing key sk is also used on the side of the signer. However, in order to make the substitute key generator unable to forge the electronic signature of the signer, the signing key sk is not directly provided to the substitute key generator.

First, a substitute signing key sk' is generated by the substitute key generator, and partial information of a substitute verification key pk' is generated using information on the substitute signing key sk'. As mentioned above, the substitute verification key pk' will accept an electronic signature σ generated with the signing key sk. For this reason, the substitute key generator that does not have information on the signing key sk is unable to generate the substitute verification key pk' without knowing the information on the signing key sk. Moreover, the substitute verification key pk' will accept an electronic signature σ' (σ'≠σ) that is generated with the substitute signing key sk'. For this reason, it is necessary for the substitute verification key pk' to include information on the substitute signing key sk'. Therefore, as described above, the partial information included in the substitute verification key pk' is generated by the substitute key generator.

The partial information included in the substitute verification key pk' generated by the substitute key generator is provided from the substitute key generator to the signer (S12). Subsequently, upon acquiring the partial information of the substitute verification key pk', the signer generates random numbers and provides the random numbers to the substitute key generator (S14). Upon acquiring the random numbers from the signer, the substitute key generator provides information on the substitute signing key sk' necessary for generation of the substitute verification key pk' using the acquired random numbers to the signer (S16). As mentioned above, the substitute verification key pk' needs to accept an electronic signature σ' generated with the substitute signing key sk'. For this reason, it is necessary to provide the information on the substitute signing key sk' to the signer.

However, when the substitute signing key sk' is known to the signer, the electronic signature σ' generated with the substitute signing key sk' will be generated at will. Therefore, the substitute key generator provides the information on the substitute signing key sk' to the signer in such a way that the substitute verification key pk' can be generated using the random numbers with the substitute signing key sk' unidentified by the signer. Upon acquiring such information on the substitute signing key sk', the signer generates the substitute verification key pk' (in practice, information for determining the substitute verification key pk') (S18). Subsequently, the signer provides the generated substitute verification key pk' to the substitute key generator. That is to say, according to the SC08 scheme, although the term substitute key generator is used, actually, the substitute verification key pk' is generated by the signer.

By the above-described method, the substitute signing key sk' and the substitute verification key pk' are generated. Hereinabove, by referring to FIG. 5, a rough flow of the substitute key generation process of the SC08 scheme has been described. However, a specific computation method is not presented in the above description. Next, a specific computation algorithm for implementing the content of each process step shown in FIG. 5 will be described in detail. Here, it should be noted that the specific computation formulas and the like given below are exemplary only and can be modified in various ways.

1-6: Algorithm of SC08 Scheme

First, prior to description of the specific computation content of the substitute key generation algorithm, a system parameter generation algorithm, a key generation algorithm, a signature generation algorithm, and a signature verification algorithm according to the SC08 scheme will be described sequentially. These algorithms are related to one another and include a characteristic configuration of the SC08 scheme for implementation of the substitute key generation algorithm. After that, the substitute key generation algorithm will be described.

System Parameter Generation Algorithm

Figure 6:
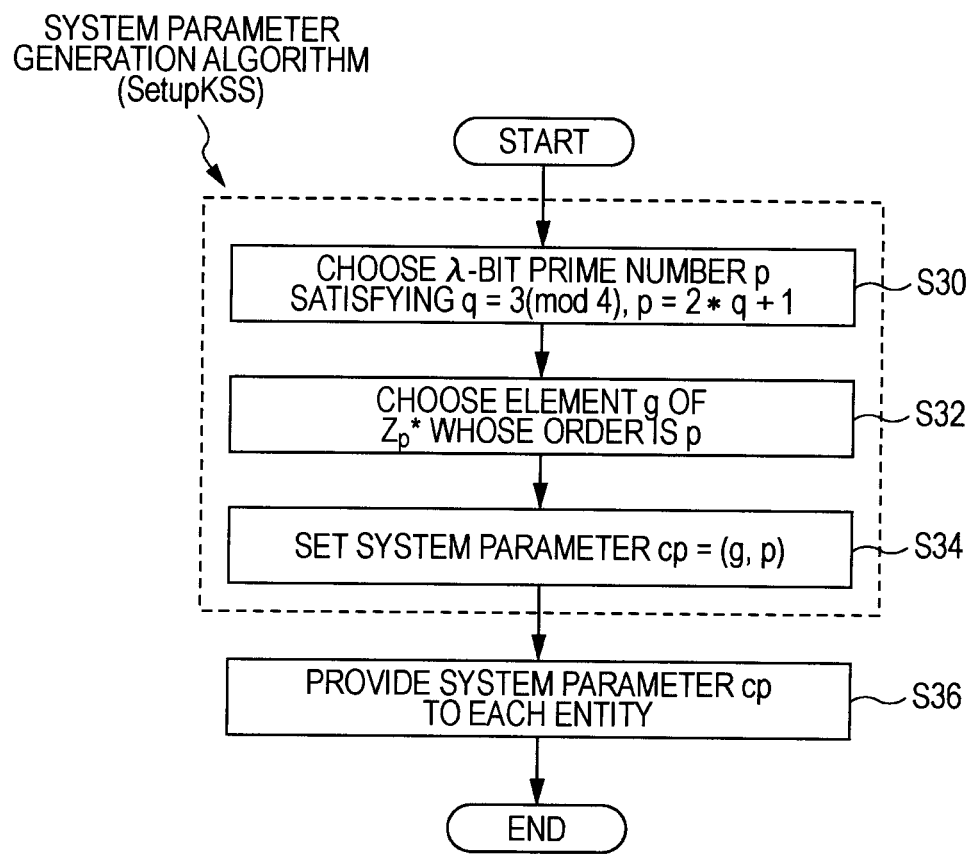
FIG. 6 is a diagram showing a system parameter generation method according to the SC08 scheme.

First, by referring to FIG. 6, the system parameter generation algorithm given by Equation 1 above will be described. FIG. 6 is a diagram illustrating an example of the specific computation content of the system parameter generation algorithm. The system parameter generation algorithm is executed by a system administrator.

In the system parameter generation algorithm, first, for a prime number q=3(mod 4), a λ-bit prime number p satisfying Equation 6 below is chosen (S30). Subsequently, the element g of $Z_p^*$ whose order is p is chosen (S32). Here, $Z_p$ means a finite field of integers whose modulo is the prime number p, and $Z_p^*$ means the multiplicative group thereof. After that, system parameters cp=(g, p) including the prime number p and the element g are set up (S34). This is the content of the system parameter generation algorithm. When the system parameters cp are generated in this way, the system administrator provides the system parameters cp to each entity (S36).

In the following description, it will be assumed that the system parameters cp are provided to each entity.

$$p=2q+1 \quad (6)$$

Key Generation Algorithm and Signature Generation Algorithm

Figure 7:
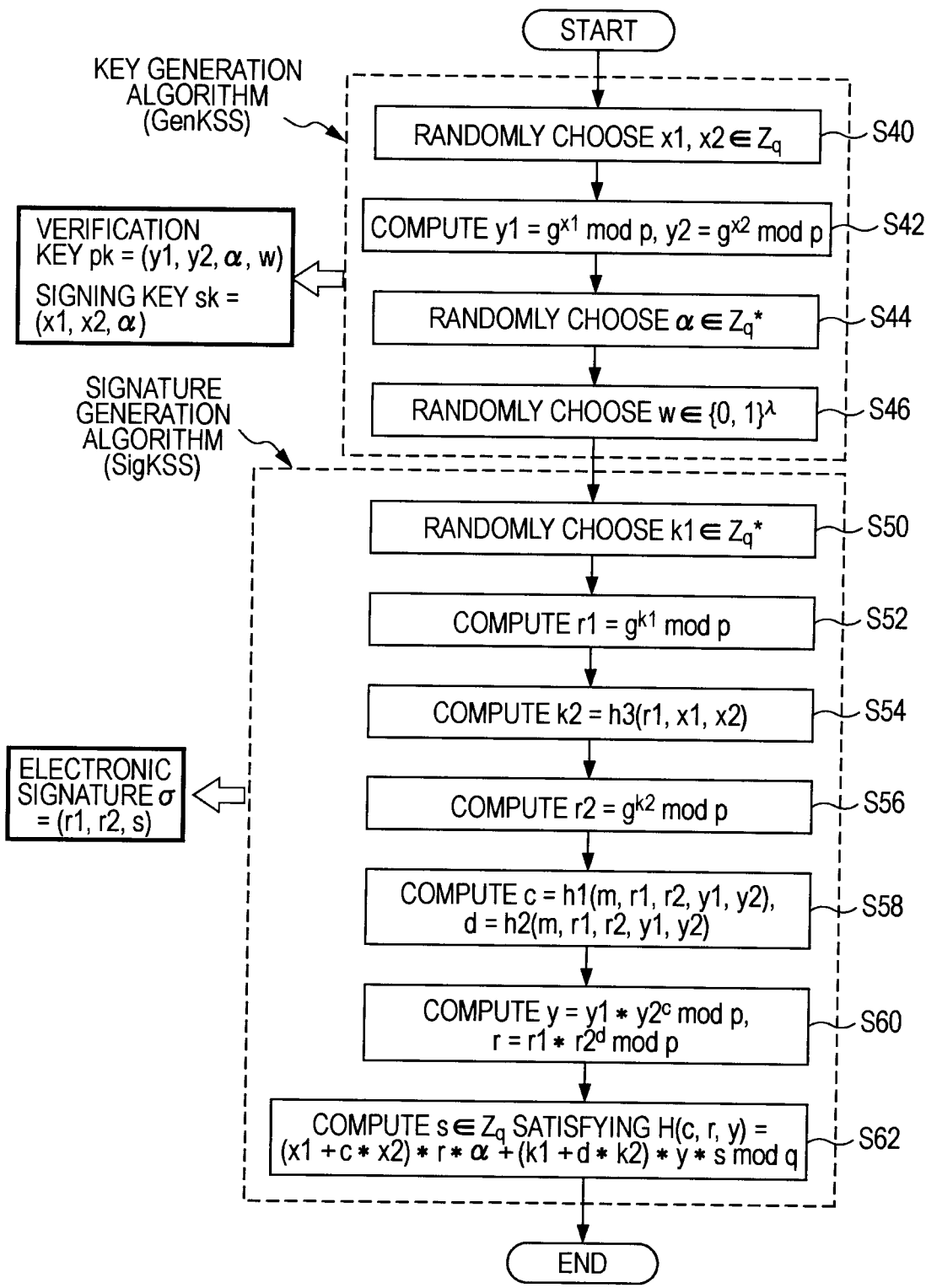
FIG. 7 is a diagram showing an electronic signature generation method according to the SC08 scheme.

Next, by referring to FIG. 7, the key generation algorithm given by Equation 2 above and the signature generation algorithm given by Equation 3 above will be described. FIG. 7 is a diagram illustrating an example of the specific computation content of the key generation algorithm and the signature generation algorithm. The key generation algorithm and the signature generation algorithm are executed by the signer.

First, the key generation algorithm will be described. In the key generation algorithm, first, the elements x1 and x2 of $Z_q$ are randomly chosen (S40). Subsequently, using the chosen elements x1 and x2, y1 and y2 are calculated by Equations 7 and 8 below (S42). Subsequently, the element α of $Z_q^*$ is randomly chosen (S44). After that, the element w of $\{0,1\}^\lambda$ is randomly chosen (S46). The processing order of steps S44 and S46 may be changed appropriately. This is the content of the key generation algorithm. By the above computations, the verification key pk given by Equation 9 below and the signing key sk given by Equation 10 below are generated.

$$y1=g^{x1} \bmod p \quad (7)$$

$$y2=g^{x2} \bmod p \quad (8)$$

$$pk=(y1,y2,\alpha,w) \quad (9)$$

$$sk=(x1,x2,\alpha) \quad (10)$$

Next, the signature generation algorithm will be described. As given by Equation 3 above, in the signature generation algorithm, the signing key sk generated by the key generation algorithm and an electronic document m are input. In this case, since the verification key pk is already calculated, the verification key pk may be included in the input values. When the input values are changed in this manner, if the same computation formula as y1 or y2 given by Equation 7 or 8 above is included in the signature generation algorithm, it is not necessary to perform corresponding arithmetic processing. In the following description, portions where the same computation formulas as Equations 7 and 8 will be denoted as y1 and y2, respectively.

In the signature generation algorithm, first, the element k1 of $Z_q^*$ is randomly chosen (S50). Subsequently, using the chosen element k1, r1 given by Equation 11 below is calculated (S52). Subsequently, using r1, x1, and x2, k2 given by Equation 12 below is calculated (S54). Here, h3 ( . . . ) is a hash function. A hash function is a function that generates a predetermined range of numerical values from a certain bit sequence a∈{0, 1}. Moreover, the values obtained by applying a certain bit sequence to a hash function are called hash values. In Equation 12 below, the values r1, x1, and x2 which are given as parameters are concatenated to each other, for example, and then input to the hash function h3. It should be noted that processing performed when the parameters are input is not limited to the concatenation.

Subsequently, using the calculated k2, r2 given by Equation 13 below is calculated (S56). After that, using an electronic document m to which the electronic signature σ is attached, the parameters r1 and r2 calculated by the above-mentioned computation, and the parameters y1 and y2 (which can be generated from x1 and x2) included in the verification key pk, parameters c and d given by Equations 14 and 15 below are calculated (S58). Here, h1( . . . ) and h2( . . . ) are all hash functions. Moreover, the parameters m, r1, r2, y1, and y2 are concatenated to each other, for example, and then input to the hash functions. It should be noted that processing performed when the parameters are input is not limited to the concatenation.

Subsequently, using the calculated parameters c and d, y and r given by Equations 16 and 17 below are calculated (S60). After that, using the parameters obtained in steps S50 to S60, the element s of $Z_q$ satisfying Equation 18 below is calculated (S62). Here, H( . . . ) is a hash function. Moreover, the parameters c, r, and y are concatenated to each other, for example, and then input to the hash function. It should be noted that processing performed when the parameters are input is not limited to the concatenation. By the above computations, the electronic signature σ given by Equation 19 below is obtained.

$$r1 = g^{k1} \bmod p \quad (11)$$

$$k2 = h3(r1, x1, x2) \quad (12)$$

$$r2 = g^{k2} \bmod p \quad (13)$$

$$c = h1(m, r1, r2, y1, y2, w) \quad (14)$$

$$d = h2(m, r1, r2, y1, y2, w) \quad (15)$$

$$y = y1 \cdot y2^c \bmod p \quad (16)$$

$$r = r1 \cdot r2^d \bmod p \quad (17)$$

$$H(c, r, y) = (x1 + c \cdot x2) r \cdot \alpha + (k1 + d \cdot k2) y \cdot s \quad (18)$$

$$\sigma = (r1, r2, s) \quad (19)$$

Signature Verification Algorithm

Figure 8:
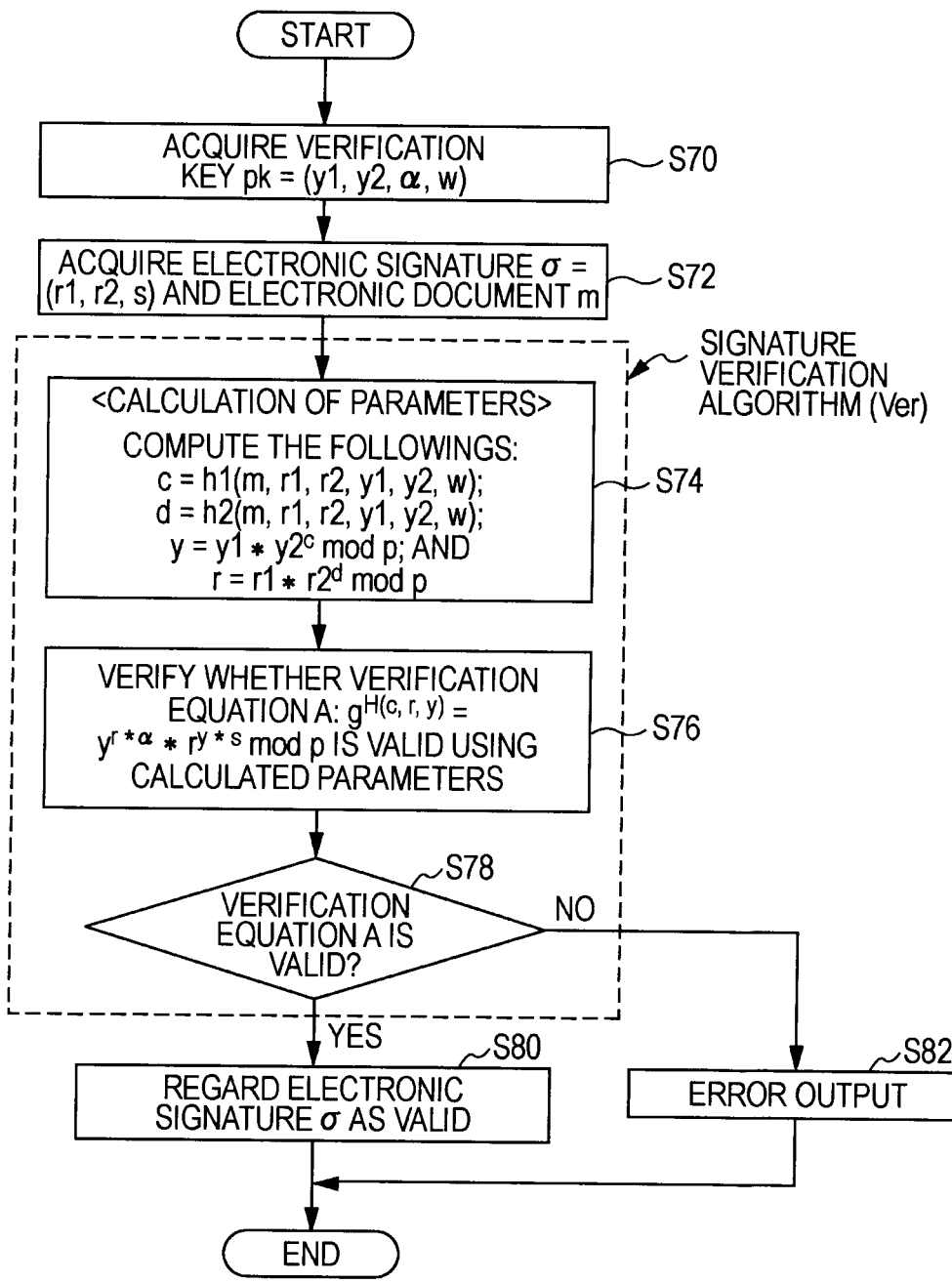
FIG. 8 is a diagram showing an electronic signature verification method according to the SC08 scheme.

Next, by referring to FIG. 8, the signature verification algorithm given by Equation 5 above will be described. FIG. 8 is a diagram illustrating an example of the specific computation content of the signature verification algorithm. The signature verification algorithm is executed by the verifier.

First, the verifier acquires a verification key pk (see Equation 9) that is made public (S70). Moreover, the verifier acquires the electronic signature σ (see Equation 19) and the electronic document m from the signer (S72). The verifier inputs these acquired information to the signature verification algorithm to verify the electronic signature σ. In addition, it will be assumed that the system parameters cp are already acquired by the verifier.

In the signature verification algorithm, first, the parameters c, d, y, and r are calculated based on Equations 14, 15, 16, and 17 above (S74). Subsequently, the calculated parameters are substituted into a verification equation A given by Equation 20 below, whereby it is verified whether or not the verification equation A is valid (S76 and S78). If the verification equation A is valid, that electronic signature σ is regarded as valid, and an output value $v_{out} = 1$ indicative of "accept" is output (S80), and a series of processing ends. On the other hand, if the verification equation A is not valid, an output value $v_{out} = 0$ indicative of error is output (S82), and a series of processing ends. By the above computations, the validity of the electronic signature σ with respect to the electronic document m is verified.

(SC08 scheme)

$$g^{H(c,r,y)} = y^{r \cdot \alpha} \cdot r^{y \cdot s} \bmod p \quad (20)$$

Ideas of SC08 Scheme

It is safe to say that an electronic signature scheme is determined by the form of a verification equation. In addition, the verification equation A is specific to the SC08 scheme. The verification equation A is developed by improving a verification equation of the ElGamal signature scheme given by Equation 21 below. In the case of the ElGamal signature scheme, when the element g of $Z_p^*$ whose order is q is used as a system parameter where the prime numbers q and p satisfy the relation $p = 2 \times q + 1$ and $q = 3 \pmod 4$, there is only one verification key pk that accepts an electronic document m and electronic signature σ pair. For this reason, when a signature generation system is constructed based on the verification equation of the ElGamal signature scheme, it is unable to generate a substitute key. That is to say, the above-mentioned requirement 1 is not satisfied. Therefore, the verification equation A of the SC08 scheme given by Equation 20 above is devised. Hereinafter, the idea of the SC08 scheme will be described in more detail.

(Elgamal Signature Scheme)

Electronic Signature: $\sigma = (r, s)$, $r = g^k \bmod p$,

Signature Key: $sk = x \in Z_p^*$,

Verification Key: $pk = y = g^x \bmod p$,

Verification Equation: $g^{H(m,r)} = y^r \cdot r^s \bmod p$ (21)

First, in the SC08 scheme, the elements of the verification key pk are added and the verification equation is modified. At that time, the requirement (1) that it is able to generate a substitute key by an interaction with a valid signer and the requirement (2) that it is infeasible to generate a substitute verification key without an interaction with a valid signer are taken into consideration. That is to say, modification is made so as to satisfy the requirements (1) and (2).

Sakumoto et al. noticed that the ElGamal signature scheme has a property that "it is unable to compute an electronic signature satisfying a verification equation even when a verification key is given." Moreover, Sakumoto et al. noticed the property that "it is unable to compute an electronic signature satisfying a verification equation even when an electronic signature is given" if the element r of the electronic signature appearing in the verification equation and the element y of the verification key are symmetric, by referring to the property of the ElGamal signature scheme and the verification equation given by Equation 21 above. The expression symmetric means a form $(a^b \times b^a)$ that 'b' rides on the shoulder (exponential part) of 'a' and 'a' rides on the shoulder (exponential part) of 'b'.

Therefore, Sakumoto et al. adds a parameter α to the verification key pk like Equation 22 below based on this idea and modified the verification equation like Equation 23 below. By the added parameter α in the verification key pk, it became possible to generate a substitute key. However, when the verification equation of Equation 23 below that is valid based on the verification key pk given by Equation 22 below is used, the substitute key generator will be able to calculate the original signing key sk. For example, with a substitute signing key sk'=x' and a substitute verification key pk'=(y', α'), since the substitute key generator will be able to know Equation 24 below, based on this equation, the substitute key generator is able to calculate the parameter k that should be secretly held by the signer. In addition, since the substitute key generator knows that Equation 25 below is valid using the original signing key sk=x, the substitute key generator is able to calculate the signing key sk from Equation 25 below using the parameter k.

$$pk = (y, \alpha) \quad (22)$$

$$g^{H(m,r,y)} = y^{r \cdot \alpha} \cdot r^{y \cdot s} \bmod p \quad (23)$$

$$H(m,r,y')=x'\cdot r\cdot\alpha+k\cdot y'\cdot s \bmod q \quad (24)$$

$$H(m,r,y)=x\cdot r\cdot\alpha+k\cdot y\cdot s \bmod q \quad (25)$$

Therefore, Sakumoto et al. doubled the parameters included in the signing key sk and the verification keys pk as given by Equations 9 and 10 above so that the substitute key generator is unable to generate the original signing key sk. Of course, the parameters included in the substitute signing key sk' and the substitute verification key pk' ware also doubled. Moreover, in the SC08 scheme, the requirement (Requirement 4 above) that the signer is unable to know the substitute signing key sk' that the substitute key generator holds secretly is also taken into consideration. The requirements 3 and 4 regarding the substitute key are implemented by the substitute key generation algorithm described later. Hereinafter, the substitute key generation algorithm of the SC08 scheme embodying this idea will be described.

Substitute Key Generation Algorithm

Figure 9:
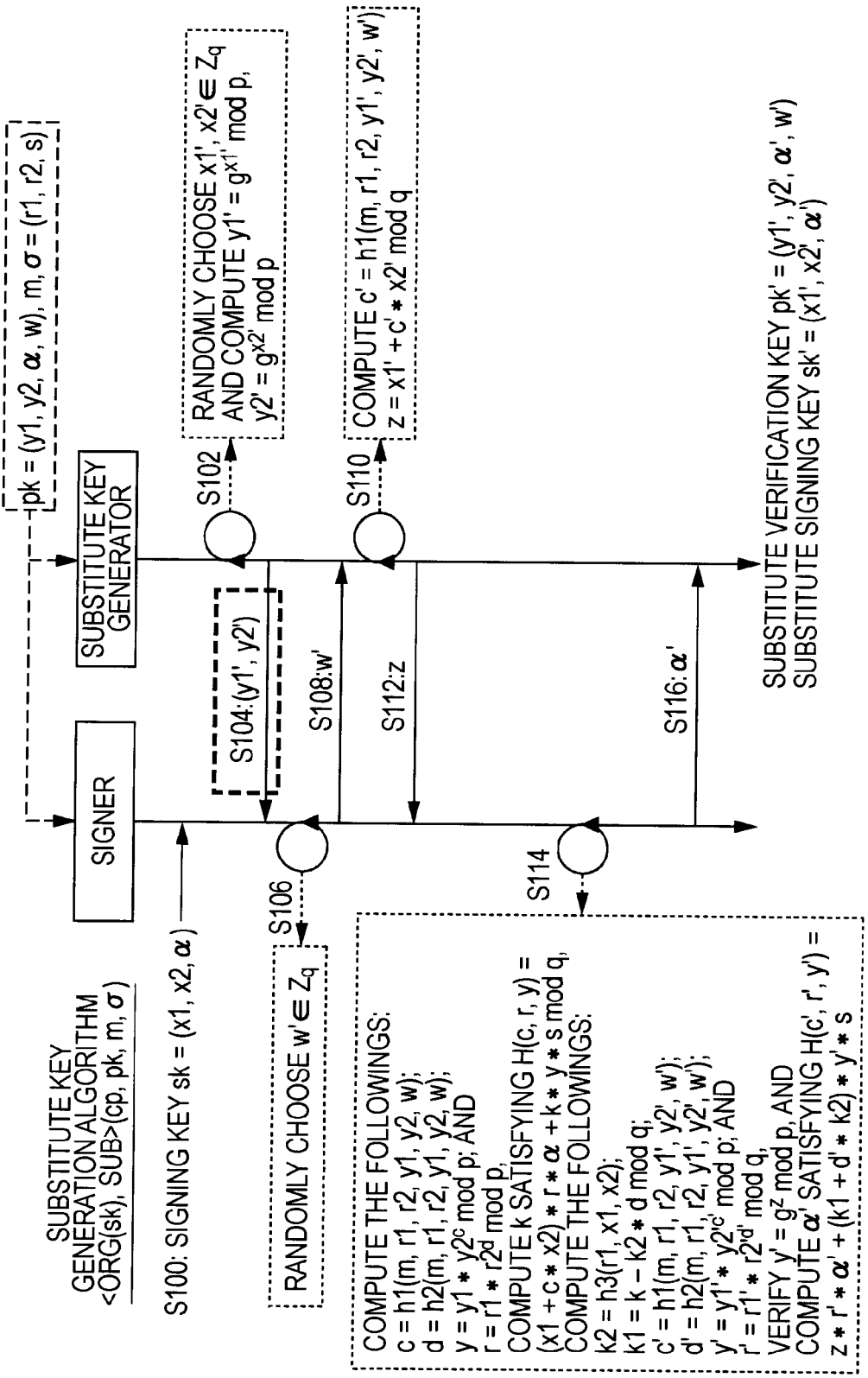
FIG. 9 is a diagram showing the substitute key generation method according to the SC08 scheme in detail.

By referring to FIG. 9, the substitute key generation algorithm given by Equation 4 above will be described. FIG. 9 is a diagram illustrating an example of the specific computation content of the substitute key generation algorithm. The substitute key generation algorithm is based on an interactive protocol and implemented by an interaction between the signer and the substitute key generator.

In the substitute key generation algorithm, first, a signing key sk is input by the signer (S100). In this case, the signing key sk is not directly provided to the substitute key generator. Moreover, the elements x1' and x2' of $Z_q$ are randomly chosen by the substitute key generator, and y1' and y2' given by Equations 26 and 27 below are calculated (S102). The values x1' and x2' are parameters included in the substitute signing key sk'. Moreover, the values y1' and y2' are parameters included in the substitute verification key pk'. Subsequently, the parameters y1' and y2' are provided from the substitute key generator to the signer (S104). After that, the signer randomly chooses the element w' of $Z_q$ (S106). Subsequently, the element w' is provided from the signer to the substitute key generator (S108).

Upon acquiring the value w', the substitute key generator calculates c' given by Equation 28 below and z given by Equation 29 below using the acquired value w' (S110). Subsequently, the value z is provided from the substitute key generator to the signer (S112). It should be noted that although the value z includes the parameters x1' and x2' that constitute part of the substitute signing key sk', the value z is provided to the signer in such a way that the parameters x1' and x2' are not individually identified. After that, upon acquiring the value z, the signer calculates c, d, y, and r based on Equations 14, 15, 16, and 17 above and calculates k satisfying Equation 30 below. In many cases, the signer is not holding the parameters k1 and k2 therein. For this reason, in this step, the parameters k1 and k2 are recalculated.

Of course, if the parameters k1 and k2 are held therein, these computations may be omitted. Subsequently, the signer calculates k2 using Equation 12 above and calculates k1 by substituting the calculated values k and k2 into Equation 31 below. In this step, the parameters k1 and k2 are obtained. After that, the signer calculates c' based on Equation 28 below. In addition, the signer calculates d' based on Equation 32 below. Subsequently, the signer calculates y' and r' based on Equations 33 and 34 below. In addition, the signer verifies whether or not Equation 35 below is valid using the calculated value y'. At that time, if Equation 35 is not valid, the signer outputs error and a series of processing ends.

Subsequently, the signer calculates α' satisfying Equation 36 below (S114). Moreover, the parameter α' is provided from the signer to the substitute key generator. By combining the parameter α' and the parameters y1', y2', and w', the substitute verification key pk' is generated. If the parameter α' is included input image the substitute signing key sk', the substitute signing key sk' is also generated at this point in time. In addition, it may be constructed such that the signer generates the substitute verification key pk' and provides it to the substitute signer. In the SC08 scheme, by the above-described method, the substitute verification key pk' and the substitute signing key sk' are generated.

$$y1'=g^{x1'} \bmod p \quad (26)$$

$$y2'=g^{x2'} \bmod p \quad (27)$$

$$c'=h1(m,r1,r2,y1',y2',w') \quad (28)$$

$$z=x1'+c'x2' \bmod q \quad (29)$$

$$H(c,r,y)=(x1+c\cdot x2)r\cdot\alpha+k\cdot y\cdot s \bmod q \quad (30)$$

$$k1=k-d\cdot k2 \bmod q \quad (31)$$

$$d'=h2(m,r1,r2,y1',y2',w') \quad (32)$$

$$y'=y1'\cdot y2'^{c'} \bmod p \quad (33)$$

$$r'=r1\cdot r2^{d'} \bmod p \quad (34)$$

$$y'=g^z \bmod p \quad (35)$$

$$H(c',r',y')=z\cdot r'\cdot\alpha'+(k1+d'\cdot k2)y'\cdot s \bmod q \quad (36)$$

Hereinabove, the SC08 scheme has been described in detail. Here, it should be noted that the signer is able to obtain sufficient information necessary for generating the substitute verification key pk' during the interaction before the substitute key generator obtains the substitute verification key pk' (see FIG. 5). This means that there is a possibility where partial information of the substitute signing key sk' is leaked to an attacker before the substitute key generator is determined by the substitute verification key pk'. As a result, the SC08 scheme does not guarantee the security regarding the unforgeability of the electronic signature with respect to the substitute verification key pk' determined by the substitute key generator.

Further description of this problem will be provided below. The security guaranteed by the ElGamal signature scheme, which constitutes a partial basis of the security regarding the SC08 scheme, is guaranteed under the following idealized situation. The idealized situation mentioned therein refers to a situation where "an attacker wins if a signer first generates a public key pk, then, the signer transfers the public key pk to the attacker, and finally, the attacker is able to generate an electronic signature that accepts the public key pk". In the sense that the attacker is difficult to win in this idealized situation, the security of the ElGamal signature scheme is guaranteed. In other words, the security is not guaranteed in a situation where any of the requirements is not satisfied. However, the SC08 scheme has a construction where an attacker is able to know a public key of a signer before the signer knows the public key. For this reason, a signature scheme that is based on the ElGamal signature scheme may fall outside the guaranteed range of the security as guaranteed by the ElGamal signature scheme.

In order to solve the above-mentioned problem, the present inventors put additional ideas to the SC08 scheme and devised a substitute key generation method according to the embodiments described later. The techniques of the embodiments solve the above-mentioned problems and provide a substitute key generation method more efficient than the SC08 scheme. Hereinafter, the substitute key generation method according to the embodiment of the present invention will be described in detail.

2: First Embodiment

First, a first embodiment of the present invention will be described. The present embodiment solves the problem regarding the security of the SC08 scheme and relates to a technique in which "at a stage where a substitute key generator has determined only part of a substitute verification key pk', sufficient information necessary for estimating the whole information including the remaining part of the substitute verification key pk' that is generated later by a substitute verifier is prevented from being provided to a signer". That is to say, although the signer is able to generate a substitute verification key other than a substitute verification key pk', at a state where the substitute key generator has determined only part of the substitute verification key pk' when generating the substitute verification key pk'', the signer is prevented from knowing the entirety of the substitute verification key pk' including the remaining part earlier than the substitute verifier. Hereinafter, this technique (present scheme 1) will be described in detail.

2-1: Substitute Key Generation Method

Figure 10:
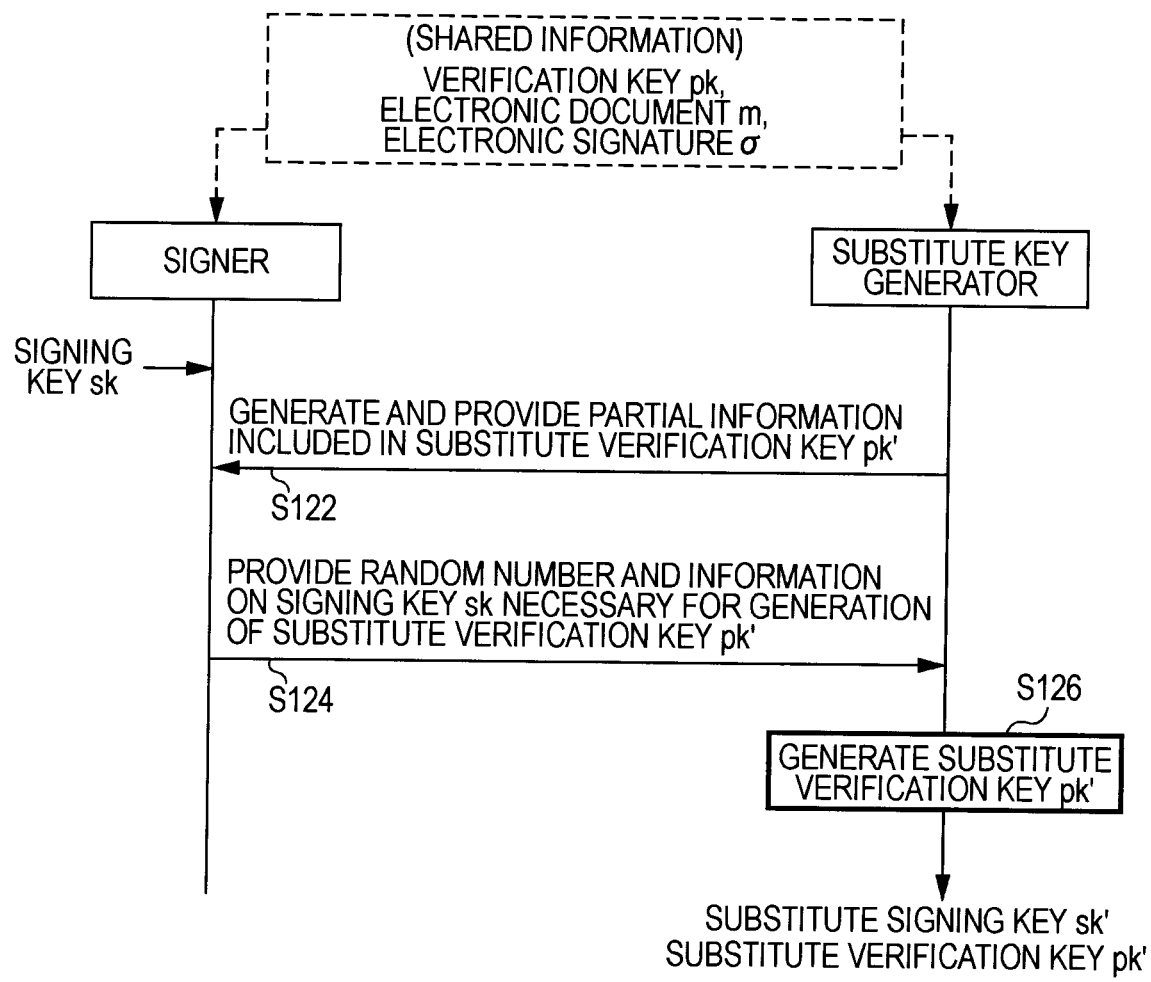
FIG. 10 is a diagram showing the flow of a substitute key generation method according to a first embodiment of the present invention.

First, reference is made to FIG. 10. FIG. 10 is a diagram illustrating a rough processing flow in the substitute key generation algorithm <ORG(sk), SUB> of the present scheme 1. As shown in FIG. 10, it will be assumed that a verification key pk, an electronic document m, and an electronic signature σ are input as information shared between a signer and a substitute key generator. Moreover, a signing key sk is also used on the side of the signer. However, in order to make the substitute key generator unable to forge the electronic signature of the signer, the signing key sk is not directly provided to the substitute key generator.

First, a substitute signing key sk' is generated by the substitute key generator, and partial information of a substitute verification key pk' is generated using information on the substitute signing key sk'. The partial information included in the substitute verification key pk' generated by the substitute key generator is provided from the substitute key generator to the signer (S122). However, the partial information provided in this step is information that is not sufficient for estimating the substitute verification key pk' that is obtained finally.

Subsequently, upon acquiring the partial information of the substitute verification key pk', the signer generates random numbers and provides information on the signing key sk necessary for generation of the substitute verification key pk' to the substitute key generator together with the random numbers (S124). However, the information on the signing key sk provided in this step is information that is not sufficient for the substitute key generator to estimate the signing key sk. Upon acquiring the information on the signing key sk, the substitute key generator generates a substitute verification key pk' (S126).

By the above-described method, the substitute signing key sk' and the substitute verification key pk' are generated. In this manner, in the present scheme 1, the substitute verification key pk' is generated by the substitute key generator. Moreover, before the substitute verification key pk' is determined by the substitute key generator, sufficient information necessary for generating the substitute verification key pk' is not provided to the signer. For this reason, by using the present scheme 1, the above-described problem of the SC08 scheme is solved. However, a specific computation method is not presented in the above description. Next, a specific computation algorithm for implementing the content of each process step shown in FIG. 10 will be described in detail. Here, it should be noted that the specific computation formulas and the like given below are exemplary only and can be modified in various ways.

2-2: Algorithm

First, prior to description of the specific computation content of the substitute key generation algorithm, a system parameter generation algorithm, a key generation algorithm, a signature generation algorithm, and a signature verification algorithm according to the present scheme 1 will be described sequentially. Since the system parameter generation algorithm is substantially the same as that of the SC08 scheme, description thereof will be omitted. Moreover, these algorithms are related to one another and include a characteristic configuration of the present scheme 1 for implementation of the substitute key generation algorithm. After that, the substitute key generation algorithm will be described.

Key Generation Algorithm and Signature Generation Algorithm

Figure 11:
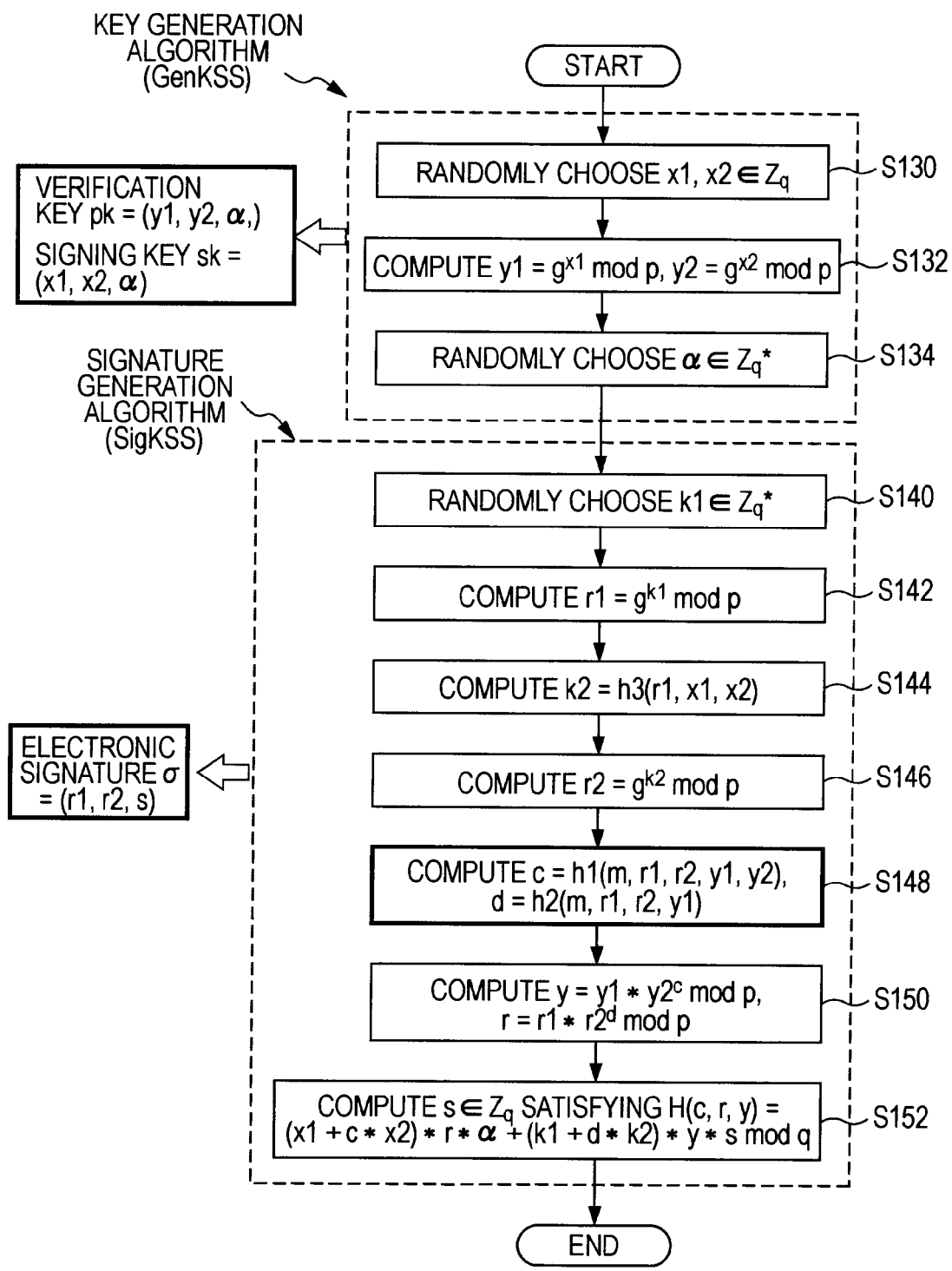
FIG. 11 is a diagram showing an electronic signature generation method according to the first embodiment.

First, by referring to FIG. 11, the key generation algorithm given by Equation 2 above and the signature generation algorithm given by Equation 3 above will be described. FIG. 11 is a diagram illustrating an example of the specific computation content of the key generation algorithm and the signature generation algorithm. The key generation algorithm and the signature generation algorithm are executed by the signer.

First, the key generation algorithm will be described. In the key generation algorithm, first, the elements x1 and x2 of $Z_q$ are randomly chosen (S130). Subsequently, using the chosen elements x1 and x2, y1 and y2 are calculated by Equations 37 and 38 below (S132). Subsequently, the element α of $Z_q^*$ is randomly chosen (S134). The processing order of step S134 may be changed appropriately. This is the content of the key generation algorithm. By the above computations, the verification key pk given by Equation 39 below and the signing key sk given by Equation 40 below are generated.

$$y1 = g^{x1} \bmod p \quad (37)$$

$$y2 = g^{x2} \bmod p \quad (38)$$

$$pk = (y1, y2, \alpha) \quad (39)$$

$$sk = (x1, x2, \alpha) \quad (40)$$

Next, the signature generation algorithm will be described. As given by Equation 3 above, in the signature generation algorithm, the signing key sk generated by the key generation algorithm and an electronic document m are input. In this case, since the verification key pk is already calculated, the verification key pk may be included in the input values. When the input values are changed in this manner, if the same computation formula as y1 or y2 given by Equation 37 or 38 above is included in the signature generation algorithm, it is not necessary to perform corresponding arithmetic processing. In the following description, portions where the same computation formulas as Equations 37 and 38 will be denoted as y1 and y2, respectively.

In the signature generation algorithm, first, the element k1 of $Z_q^*$ is randomly chosen (S140). Subsequently, using the chosen element k1, r1 given by Equation 41 below is calculated (S142). Subsequently, using r1, x1, and x2, k2 given by Equation 42 below is calculated (S144). Here, h3( . . . ) is a hash function. In Equation 42 below, the values r1, x1, and x2 which are given as parameters are concatenated to each other, for example, and then input to the hash function h3. It should be noted that processing performed when the parameters are input is not limited to the concatenation.

Subsequently, using the calculated k2, r2 given by Equation 43 below is calculated (S146). After that, using an electronic document m to which the electronic signature σ is attached, the parameters r1 and r2 calculated by the above-mentioned computation, and the parameters y1 and y2 (which can be generated from x1 and x2) included in the verification key pk, parameters c and d given by Equations 44 and 45 below are calculated (S148). Here, h1( . . . ) and h2( . . . ) are all hash functions. Moreover, the parameters m, r1, r2, y1, and y2 are concatenated to each other, for example, and then input to the hash functions. It should be noted that processing performed when the parameters are input is not limited to the concatenation.

Subsequently, using the calculated parameters c and d, y and r given by Equations 46 and 47 below are calculated (S150). After that, using the parameters obtained in steps S130 to 5150, the element s of $Z_q$ satisfying Equation 48 below is calculated (S152). Here, H( . . . ) is a hash function. Moreover, the parameters c, r, and y are concatenated to each other, for example, and then input to the hash function. It should be noted that processing performed when the parameters are input is not limited to the concatenation. By the above computations, the electronic signature σ given by Equation 49 below is obtained.

$$r1 = g^{k1} \bmod p \tag{41}$$

$$k2 = h3(r1, x1, x2) \tag{42}$$

$$r2 = g^{k2} \bmod p \tag{43}$$

$$c = h1(m, r1, r2, y1, y2) \tag{44}$$

$$d = h2(m, r1, r2, y1, y2) \tag{45}$$

$$y = y1 \cdot y2^c \bmod p \tag{46}$$

$$r = r1 \cdot r2^d \bmod p \tag{47}$$

$$H(c, r, y) = (x1 + c \cdot x2) r \cdot \alpha + (k1 + d \cdot k2) y \cdot s \bmod q \tag{48}$$

$$\sigma = (r1, r2, s) \tag{49}$$

Hereinabove, the key generation algorithm and the signature generation algorithm according to the present scheme 1 have been described. In the key generation algorithm, the construction of the generated verification key pk is changed from that of the SC08 scheme. On the other hand, in the signature generation algorithm, the construction of the parameters c and d used for generation of the electronic signature σ is changed from that of the SC08 scheme. In particular, it should be noted that the kind of the parameter input to the hash function h2 is changed when the parameter d is generated. This change results from the fact that the information provided from the substitute key generator to the signer is smaller than that of the SC08 scheme. In other words, by such a change, it is possible to reduce the amount of information provided from the substitute key generator to the signer.

Signature Verification Algorithm

Figure 12:
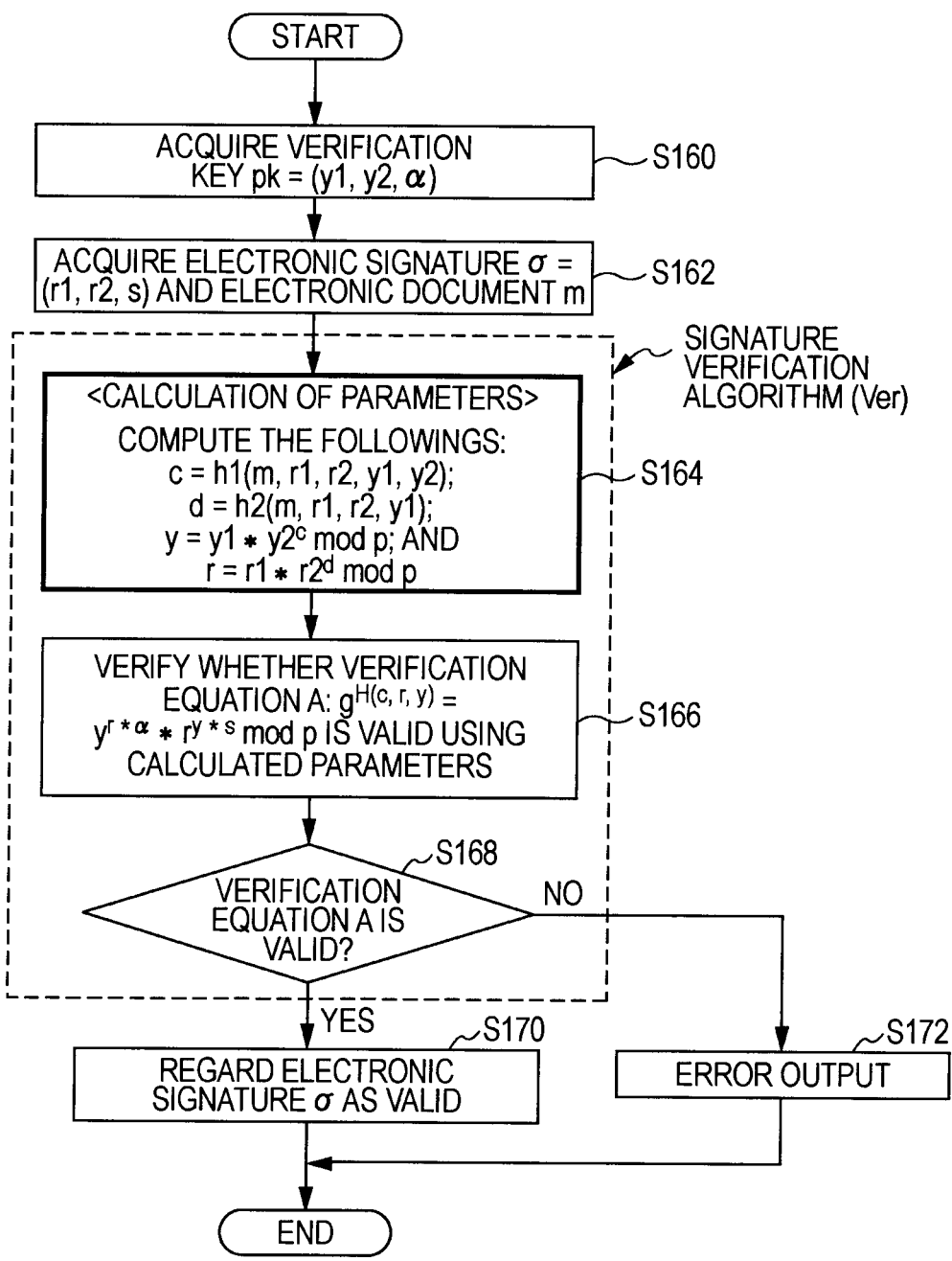
FIG. 12 is a diagram showing an electronic signature verification method according to the first embodiment.

Next, by referring to FIG. 12, the signature verification algorithm given by Equation 5 above will be described. FIG. 12 is a diagram illustrating an example of the specific computation content of the signature verification algorithm. The signature verification algorithm is executed by the verifier.

First, the verifier acquires a verification key pk (see Equation 39) that is made public (S160). Moreover, the verifier acquires the electronic signature σ (see Equation 49) and the electronic document m from the signer (S162). The verifier inputs these acquired information to the signature verification algorithm to verify the electronic signature σ. In addition, it will be assumed that the system parameters cp are already acquired by the verifier.

In the signature verification algorithm, first, the parameters c, d, y, and r are calculated based on Equations 44, 45, 46, and 47 above (S164). Subsequently, the calculated parameters are substituted into a verification equation A given by Equation 50 below, whereby it is verified whether or not the verification equation A is valid (S166 and S168). If the verification equation A is valid, that electronic signature σ is regarded as valid, and an output value $v_{out} = 1$ indicative of "accept" is output (S170), and a series of processing ends. On the other hand, if the verification equation A is not valid, an output value $v_{out} = 0$ indicative of error is output (S172), and a series of processing ends. By the above computations, the validity of the electronic signature σ with respect to the electronic document m is verified. Here, it should be noted that the form of the verification equation A according to the present scheme 1 appears to be the same as that of the SC08 scheme.

(Present Scheme 1)

$$g^{H(c,r,y)} = y^{r \cdot \alpha} \cdot r^{y \cdot s} \bmod p \tag{50}$$

Substitute Key Generation Algorithm

Figure 13:
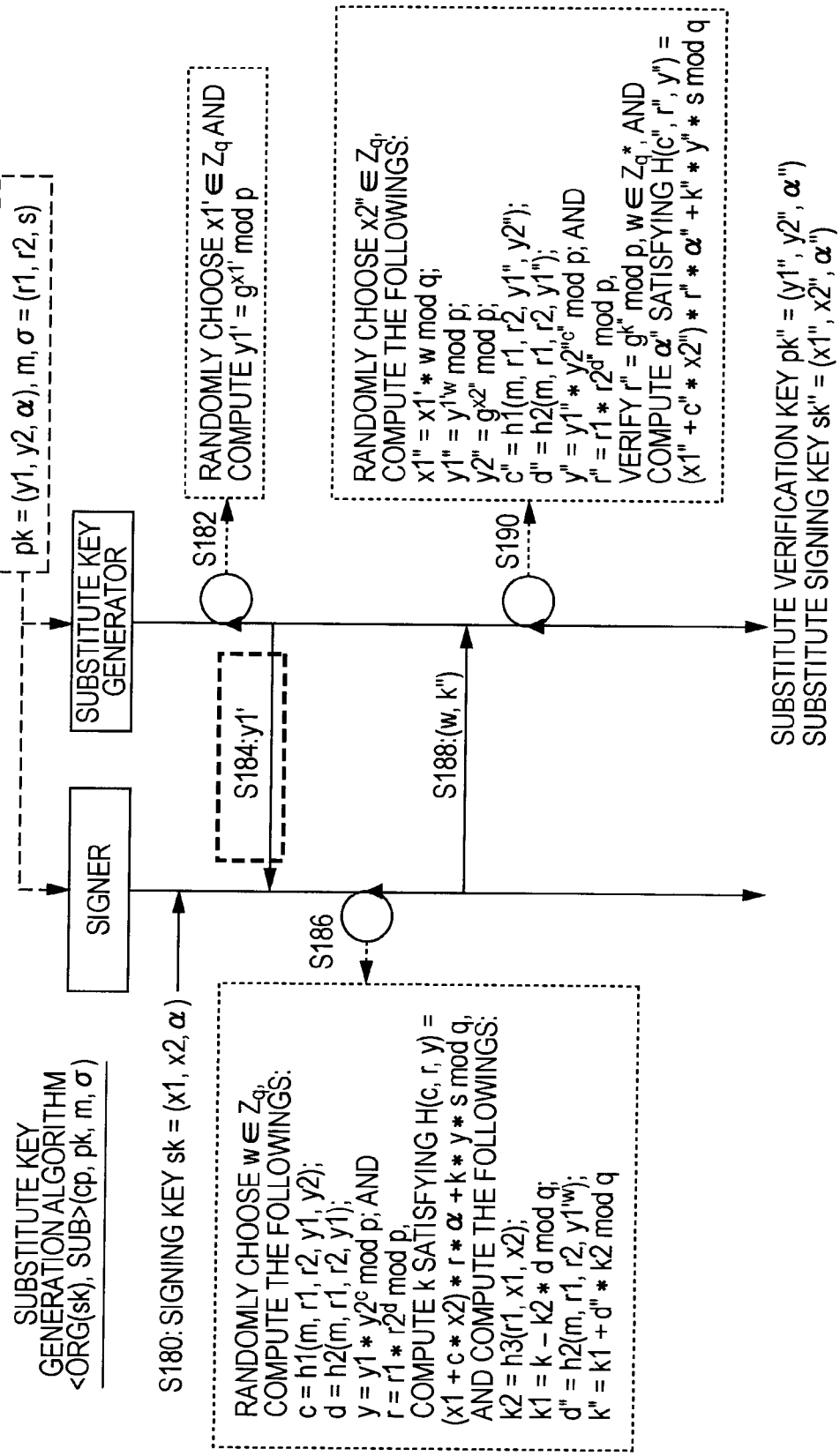
FIG. 13 is a diagram showing the substitute key generation method according to the first embodiment in detail.

Next, by referring to FIG. 13, the substitute key generation algorithm given by Equation 4 above will be described. FIG. 13 is a diagram illustrating an example of the specific computation content of the substitute key generation algorithm. The substitute key generation algorithm is based on an interactive protocol and implemented by an interaction between the signer and the substitute key generator. However, differently from the SC08 scheme, in the present scheme 1, the substitute verification key is generated on the side of the substitute key generator.

In the substitute key generation algorithm, first, a signing key sk is input by the signer (S180). In this case, the signing key sk is not directly provided to the substitute key generator. Moreover, the element x1' of $Z_q$ is randomly chosen by the substitute key generator, and a parameter y1' given by Equation 51 below is calculated (S182). Subsequently, the parameter y1' is provided from the substitute key generator to the signer (S184). It should be noted that the signer is unable to generate the substitute verification key even with the parameter y1' provided to the signer in step S184. After that, the signer randomly chooses the element w of $Z_q$ (S186).

Subsequently, the signer calculates c, d, y, and r based on Equations 44, 45, 46, and 47 above and calculates k satisfying Equation 52 below. In many cases, the signer is not holding the parameters k1 and k2 therein. For this reason, in this step, the parameters k1 and k2 are recalculated. Of course, if the parameters k1 and k2 are held therein, these computations may be omitted.

Subsequently, the signer calculates k2 using Equation 42 above and calculates k1 by substituting the calculated values k and k2 into Equation 53 below. In this step, the parameters k1 and k2 are obtained. After that, the signer calculates d" based on Equation 54 below. In addition, the signer calculates k" based on Equation 55 below (S186) and provides the value k" to the substitute key generator together with the random numbers w (S188). It should be noted that from the information held by the signer at this stage, it is unable to estimate the substitute verification key that is finally generated by the substitute key generator.

Upon acquiring the random numbers w and the parameter k" from the signer, the substitute key generator randomly chooses the element x2" of $Z_q$. Subsequently, the substitute key generator calculates a parameter x1" given by Equation 56 below using the random numbers w acquired from the signer and the chosen parameter x1". In addition, the substitute key generator calculates parameters y1" and y2" based on Equations 57 and 58 below. The parameters x1" and x2" obtained thus are included in the substitute signing key sk". Moreover, the parameters y1" and y2" are included in the substitute verification key pk".

Subsequently, the substitute key generator calculates a parameter c" by Equation 59 below using an electronic document m to which an electronic signature σ to be accepted by the substitute verification key pk" is attached, the parameters r1 and r2 included in the electronic signature σ, and the parameters y1" and y2" to be included in the substitute verification key pk". In addition, the substitute key generator calculates a predetermined d" based on Equation 54 below. At that time, it may be constructed such that in lieu of y1", y1' may be substituted into the hash function h2. After that, the substitute key generator calculates parameters y" and r" based on Equations 60 and 61 below.

Moreover, the substitute key generator verifies whether or not Equation 61 below is valid and w∈$Z_q^*$ using the parameter d" obtained so far. If any of the conditions is not satisfied, a series of processing associated to the substitute key generation algorithm ends. If both conditions are satisfied, the substitute key generator calculates a parameter α" satisfying Equation 63 below (S190) and determines the substitute verification key pk" and the substitute signing key sk" respectively given by Equations 64 and 65 below. By the above-described method, the substitute verification key pk" and the substitute signing key sk" are generated.

As mentioned above, in the present scheme 1, the information provided from the substitute key generator to the signer is only the parameter y1'. For this reason, the signer is unable to obtain sufficient information necessary for estimating the substitute verification key pk" before the substitute verification key pk" is determined by the substitute key generator. Therefore, the problem of the SC08 scheme that a person other than the substitute key generator is able to estimate the substitute verification key pk" before the substitute verification key pk" is determined.

Moreover, in the case of the present scheme 1, the number of communications and the amount of data communicated between the signer and the substitute key generator during the interaction are reduced. In the case of the substitute key generation algorithm of the SC08 scheme shown in FIG. 9, two round-trip interactions are occurring. Moreover, if it is assumed that a is the data size of a security parameter, the size of data communicated during the interaction is 5×a in the case of the SC08 scheme. The data consist of the three parameters y1', y2', and z which are transmitted from the substitute key generator to the signer and the two parameters w' and α' which are transmitted from the signer to the substitute key generator.

On the other hand, in the case of the substitute key generation algorithm of the present scheme 1 shown in FIG. 13, there is only one round-trip interaction. In addition, the size of data communicated during the interaction is only 3×a in the case of the present scheme 1. The data consist of the one parameter y1' which is transmitted from the substitute key generator to the signer and the two parameters w and k' which are transmitted from the signer to the substitute key generator. Furthermore, when the substitute verification key pk' of the SC08 scheme is compared with the substitute verification key pk" of the present scheme 1, the data size of the substitute verification key pk' is 4×a, whereas the data size of the substitute verification key pk" is only 3×a.

As seen above, the present scheme 1 is more efficient than the SC08 scheme, and from the viewpoint of a communication load and the data size of the substitute verification key, the present scheme 1 is advantageous over the SC08 scheme.

$$y1' = g^{x1'} \bmod p \quad (51)$$

$$H(c,r,y) = (x1 + c \cdot x2) r \cdot \alpha + k \cdot y \cdot s \bmod q \quad (52)$$

$$k1 = k - d \cdot k2 \bmod q \quad (53)$$

$$d'' = h2(m, r1, r2, y1''') \quad (54)$$

$$k'' = k1 + d'' \cdot k2 \bmod q \quad (55)$$

$$x1'' = x1' \cdot w \bmod q \quad (56)$$

$$y1'' = y1'^{w} \bmod p \quad (57)$$

$$y2'' = g^{x2''} \bmod p \quad (58)$$

$$c'' = h1(m, r1, r2, y1'', y2'') \quad (59)$$

$$y'' = y1'' \cdot y2''^{c''} \bmod p \quad (60)$$

$$r'' = r1 \cdot r2^{d''} \bmod p \quad (61)$$

$$y'' = g^{k''} \bmod p \quad (62)$$

$$H(c'', r'', y'') = (x1'' + c'' \cdot x2'') r'' \cdot \alpha'' + k'' \cdot y'' \cdot s \bmod q \quad (63)$$

$$pk'' = (y1'', y2'', \alpha'') \quad (64)$$

$$sk'' = (x1'', x2'', \alpha'') \quad (65)$$

2-3: Functional Configuration of Terminal

Figure 14:
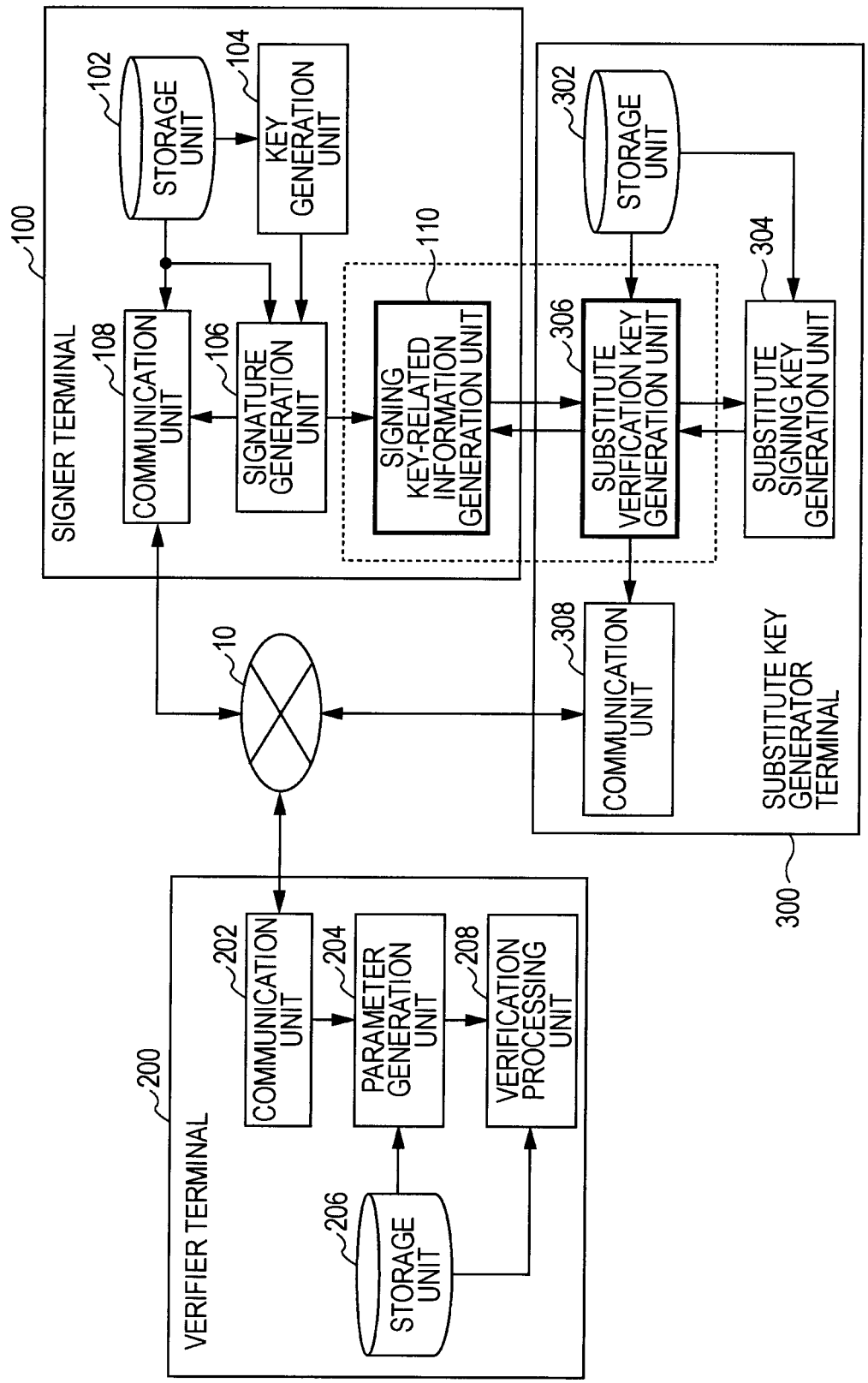
FIG. 14 is a diagram showing one exemplary configuration of a key update system according to the first embodiment and an exemplary functional configuration of a signer terminal, a verifier terminal, and a substitute key generator terminal.

Here, by referring to FIG. 14, a system configuration of the present scheme 1 capable of the above-mentioned algorithms will be described in brief. Referring to FIG. 14, the functional configuration of a signer terminal 100 used by a signer, a verifier terminal 200 used by a verifier, and a substitute key generator terminal 300 used by a substitute key generator is illustrated. Moreover, it will be assumed that the signer terminal 100, the verifier terminal 200, and the substitute key generator terminal 300 are connected to a network 10. Here, the terminals of a system administrator and a certificate authority are not shown.

Signer Terminal 100

First, the functional configuration of the signer terminal 100 will be described. As shown in FIG. 14, the signer terminal 100 mainly includes a storage unit 102, a key generation unit 104, a signature generation unit 106, a communication unit 108, and a signing key-related information generation unit 110.

The storage unit 102 is a means for storing the system parameter cp, the electronic document m, and programs for executing each algorithms. The key generation unit 104 read the system parameter cp and the execution program of the key generation algorithm from the storage unit 102 and generates a signing key sk and a verification key pk. The signing key sk and the verification key pk generated by the key generation unit 104 are input to the signature generation unit 106.

The signature generation unit 106 reads the system parameter cp and the execution program of the signature generation algorithm from the storage unit 102 and generates an electronic signature σ to be attached to the electronic document m using the input signing key sk (verification key pk) and the electronic document m. The electronic signature σ and the electronic document m generated by the signature generation unit 106 are provided by the communication unit 108 to the verifier terminal 200 via the network 10.

The signing key-related information generation unit 110 is a means for generating random numbers w when a substitute key is generated and calculating a parameter k" used for generation of a substitute verification key pk". First, the signing key-related information generation unit 110 acquires a parameter y1' concerning the substitute verification key pk" from the substitute key generator terminal 300 (specifically, a substitute verification key generation unit 306) and generates a parameter k" using the parameter y1'. Moreover, the signing key-related information generation unit 110 provides the parameters k" and w to the substitute key generator terminal 300.

As seen above, the signer terminal 100 mounts thereon a function of executing the algorithms that are to be executed by the signer according to the present scheme 1. As a consequence, by using the signer terminal 100, the key update method according to the present scheme is realized.

Verifier Terminal 200

Next, the functional configuration of the verifier terminal 200 will be described. As shown in FIG. 14, the verifier terminal 200 mainly includes a communication unit 202, a parameter generation unit 204, a storage unit 206, and a verification processing unit 208. In the storage unit 206, in addition to the system parameter cp, the execution programs of the algorithms to be executed by the verifier are stored.

When the electronic document m and the electronic signature σ are acquired from the signer terminal 100 by the communication unit 202 via the network 10, these electronic document m and electronic signature σ are input to the parameter generation unit 204. In the parameter generation unit 204, parameters that need to be input to a verification equation are calculated. The parameters calculated by the parameter generation unit 204 are input to the verification processing unit 208. In the verification processing unit 208, the parameters calculated by the parameter generation unit 204, the verification key pk, the electronic document m, and the electronic signature σ are input to the verification equation, and the accept/reject of the electronic signature σ is determined based on the validity of the verification equation.

As seen above, the verifier terminal 200 mounts thereon a function of executing the algorithms that are to be executed by the verifier according to the present scheme. As a consequence, by using the verifier terminal 200, the key update method according to the present scheme is realized.

Substitute Key Generator Terminal 300

Next, the functional configuration of the substitute key generator terminal 300 will be described. As shown in FIG. 14, the substitute key generator terminal 300 mainly includes a storage unit 302, a substitute signing key generation unit 304, a substitute verification key generation unit 306, and a communication unit 308. In the storage unit 302, in addition to the system parameter cp, the execution programs of the algorithms to be executed by the substitute key generator are stored.

The substitute signing key generation unit 304 reads the system parameter cp stored in the storage unit 302 when generating the substitute key and generates parameters x1' and x2" concerning the substitute signing key sk". The parameters x1' and x2" generated by the substitute signing key generation unit 304 are input to the substitute verification key generation unit 306. Moreover, when sufficient information necessary for generation of the substitute signing key sk" is input from the substitute verification key generation unit 306, the substitute signing key generation unit 304 generates the substitute signing key sk" using that information.

When the parameters x1' and x2" are input from the substitute signing key generation unit 304, the substitute verification key generation unit 306 executes an interaction with the signer terminal 100 (specifically, the signing key-related information generation unit 110) based on the substitute verification key generation algorithm and acquires parameters k" and w which are sufficient for generation of the substitute verification key pk". During this interaction, the substitute verification key generation unit 306 provides only the parameter y1' to the signer terminal 100 as information concerning the substitute verification key pk". For this reason, at this stage, the signer terminal 100 is unable to estimate the substitute verification key pk" which is determined later.

Upon acquiring the parameters k" and w from the signer terminal 100, the substitute verification key generation unit 306 generates the substitute verification key pk" using the parameters k" and w. The parameter that is to be included in the substitute signing key sk" calculated in this generation step is input from the substitute verification key generation unit 306 to the substitute signing key generation unit 304. Moreover, the substitute verification key pk" generated by the substitute verification key generation unit 306 is provided by the communication unit 308 to the verifier terminal 200 via the network 10. Although not depicted clearly in FIG. 14, the substitute key generator terminal 300 may further include signature generation means for generating an electronic signature using the substitute signing key sk", for example.

Hereinabove, the substitute key generation method according to the present scheme 1 has been described. By using the present scheme 1, it is possible to implement a key-substitutable electronic signature system with higher security and higher efficiency than the SC08 scheme. It should be noted that the specific computation content presented in the above description can be arbitrarily changed within the range where it succeeds the ideas of the present scheme 1. Of course, the changed computation content also falls within the technical scope of the present scheme 1.

3: Second Embodiment

Next, a second embodiment of the present invention will be described. Similar to the first embodiment, the present embodiment solves the problem regarding the security of the SC08 scheme and realizes a technique in which "at a stage where a substitute key generator has determined only part of a substitute verification key pk', sufficient information necessary for estimating the whole information including the remaining part of the substitute verification key pk' that is generated later by a substitute verifier is prevented from being provided to a signer".

However, the method of the present embodiment includes a different idea in that the information on the substitute verification key pk" is provided from the substitute key generator to the signer in such a way that the information is kept secret. Hereinafter, this technique (present scheme 2) will be described in detail. The present scheme 2 is common to the present scheme 1 in the basic technical idea, and thus the rough flow of the substitute key generation method shown in FIG. 10 and the terminal configuration for implementing the substitute key generation method according to the present scheme 2 are substantially the same as those of the present scheme 1. Therefore, description of these redundant portions will be omitted.

3-1: Algorithm

First, prior to description of the specific computation content of the substitute key generation algorithm, a system parameter generation algorithm, a key generation algorithm, a signature generation algorithm, and a signature verification algorithm according to the present scheme 2 will be described sequentially. Since the system parameter generation algorithm is substantially the same as that of the SC08 scheme, description thereof will be omitted. Moreover, these algorithms are related to one another and include a characteristic configuration of the present scheme 2 for implementation of the substitute key generation algorithm. After that, the substitute key generation algorithm will be described.

Key Generation Algorithm and Signature Generation Algorithm

First, by referring to FIG. 15, the key generation algorithm given by Equation 2 above and the signature generation algorithm given by Equation 3 above will be described. FIG. 15 is a diagram illustrating an example of the specific computation content of the key generation algorithm and the signature generation algorithm. The key generation algorithm and the signature generation algorithm are executed by the signer.

First, the key generation algorithm will be described. In the key generation algorithm, first, the elements x1 and x2 of $Z_q$ are randomly chosen (S200). Subsequently, using the chosen elements x1 and x2, y1 and y2 are calculated by Equations 37 and 38 above (S202). Subsequently, the element α of $Z_q^*$ is randomly chosen (S204). The processing order of step S204 may be changed appropriately. This is the content of the key generation algorithm. By the above computations, the verification key pk given by Equation 39 above and the signing key sk given by Equation 40 above are generated. As seen above, the key generation algorithm of the present scheme 2 is the same as that of the present scheme 1.

Next, the signature generation algorithm will be described. As given by Equation 3 above, in the signature generation algorithm, the signing key sk generated by the key generation algorithm and an electronic document m are input. In this case, since the verification key pk is already calculated, the verification key pk may be included in the input values. When the input values are changed in this manner, if the same computation formula as y1 or y2 given by Equation 37 or 38 above is included in the signature generation algorithm, it is not necessary to perform corresponding arithmetic processing. In the following description, portions where the same computation formulas as Equations 37 and 38 will be denoted as y1 and y2, respectively.

In the signature generation algorithm, first, the element k1 of $Z_q^*$ is randomly chosen (S210). Subsequently, using the chosen element k1, r1 given by Equation 41 above is calculated (S212). Subsequently, using r1, x1, and x2, k2 given by Equation 42 above is calculated (S214). Subsequently, using the calculated k2, r2 given by Equation 43 above is calculated (S216). The processing steps so far are the same as those of the present scheme 1.

Subsequently, using the parameter y2, Y given by Equation 66 below is calculated, and at the same time, using an electronic document m to which the electronic signature σ is attached, the parameters r1 and r2 calculated by the above-mentioned computation, and the parameters y1 and y2 (which can be generated from x1 and x2) included in the verification key pk, parameters c and d given by Equation 44 above and Equation 67 below are calculated (S218). Here, h4( . . . ) is a hash function. As seen above, a new parameter Y is introduced in the present scheme 2.

Subsequently, using the calculated parameters c and d, y and r given by Equations 46 and 47 above are calculated (S220). After that, using the parameters obtained in steps S200 to S220, the element s of $Z_q$ satisfying Equation 48 above is calculated (S222). By the above computations, the electronic signature σ given by Equation 49 above is obtained.

$$Y = h4(y2) \quad (66)$$

$$d = h2(m, r1, r2, y1, Y) \quad (67)$$

Hereinabove, the key generation algorithm and the signature generation algorithm according to the present scheme 2 have been described. As mentioned above, in the present scheme 2, the new parameter Y is introduced when generating the parameter d. This parameter Y is information on the substitute verification key pk" as given by Equation 66 above. Here, it should be noted that the parameter y2 is converted to a hash value. The reason for conversion to the hash value will be given in the description of the substitute key generation algorithm.

As understood from Equation 48 above, the parameter d ensures that the parameters k1 and k2 which should be kept secret by the signer are not identified. In the present scheme 1, only the parameter y1 is used as the information on the substitute verification key pk" when the parameter d is generated. On the other hand, in the present scheme 2, in addition to the parameter y1, the parameter Y concerning the parameter y2 is included. For this reason, by using the present scheme 2, the security of the parameters k1 and k2 can be increased as the amount of information that should be known in order to identify the parameter d increases.

Signature Verification Algorithm

Next, by referring to FIG. 16, the signature verification algorithm given by Equation 5 above will be described. FIG. 16 is a diagram illustrating an example of the specific computation content of the signature verification algorithm. The signature verification algorithm is executed by the verifier.

First, the verifier acquires a verification key pk (see Equation 39) that is made public (S230). Moreover, the verifier acquires the electronic signature σ (see Equation 49) and the electronic document m from the signer (S232). The verifier inputs these acquired information to the signature verification algorithm to verify the electronic signature σ. In addition, it will be assumed that the system parameters cp are already acquired by the verifier.

In the signature verification algorithm, first, the parameters c, Y, and d are calculated based on Equations 44, 66, and 67 above, and the parameters y and r are calculated based on Equations 46 and 47 above (S234). Subsequently, the calculated parameters are substituted into a verification equation A given by Equation 50 above, whereby it is verified whether or not the verification equation A is valid (S236 and S238). Here, it should be noted that the same verification equation A as that used in the present scheme 1 is used in the present scheme 2.

If the verification equation A is valid, that electronic signature σ is regarded as valid, and an output value $v_{out}=1$ indicative of "accept" is output (S240), and a series of processing ends. On the other hand, if the verification equation A is not valid, an output value $v_{out}=0$ indicative of error is output (S242), and a series of processing ends. By the above computations, the validity of the electronic signature σ with respect to the electronic document m is verified.

Substitute Key Generation Algorithm

Next, by referring to FIG. 17, the substitute key generation algorithm given by Equation 4 above will be described. FIG. 17 is a diagram illustrating an example of the specific computation content of the substitute key generation algorithm. The substitute key generation algorithm is based on an interactive protocol and implemented by an interaction between the signer and the substitute key generator. Similar to the present scheme 1, in the present scheme 2, the substitute verification key is generated on the side of the substitute key generator.

In the substitute key generation algorithm, first, a signing key sk is input by the signer (S250). In this case, the signing key sk is not directly provided to the substitute key generator. Moreover, the elements x1' and x2" of $Z_q$ are randomly chosen by the substitute key generator, and parameters y1' and y2" given by Equations 68 and 69 below are calculated. In addition, a parameter Y" is calculated based on Equation 70 below (S252). Subsequently, the parameters y1' and y" are provided from the substitute key generator to the signer (S254).

Differently from the present scheme 1, in the present scheme 2, information on the two parameters y1' and y2" included in the substitute verification key pk" is provided to the signer in step S254. The parameter y1" included in the substitute verification key pk" can be generated by the parameter w provided by the signer. For this reason, it appears that two parameters y1" and y2" which are same as those used in the SC08 scheme are transferred to the signer. However, since the parameter y2" is converted to the hash value Y", the signer is unable to generate the substitute verification key pk" from the hash value Y" and the parameter y1". That is to say, the same security as the present scheme 1 is ensured.

However, upon acquiring the parameters y1' and Y", the signer randomly chooses the element w of $Z_q$. Subsequently, the signer calculates c, Y, d, y, and r based on Equations 44, 66, 67, 46, and 47 above and calculates k satisfying Equation 52 above. In many cases, the signer is not holding the parameters k1 and k2 therein. For this reason, in this step, the parameters k1 and k2 are recalculated. Of course, if the parameters k1 and k2 are held therein, these computations may be omitted.

Subsequently, the signer calculates k2 using Equation 42 above and calculates k1 by substituting the calculated values k and k2 into Equation 53 below. In this step, the parameters k1 and k2 are obtained. After that, the signer calculates d" based on Equation 71 below. In addition, the signer calculates k" based on Equation 55 above (S256) and provides the value k" to the substitute key generator together with the random numbers w (S258). It should be noted that from the information held by the signer at this stage, it is unable to estimate the substitute verification key that is finally generated by the substitute key generator.

Upon acquiring the random numbers w and the parameter k" from the signer, the substitute key generator calculates a parameter x1" given by Equation 56 above using the acquired random numbers w and the chosen parameter x1'. In addition, the substitute key generator calculates parameters y1" and y2" based on Equations 57 and 58 above. The parameters x1" and x2" obtained thus are included in the substitute signing key sk". Moreover, the parameters y1" and y2" are included in the substitute verification key pk".

Subsequently, the substitute key generator calculates a parameter c" by Equation 59 above using an electronic document m to which an electronic signature σ to be accepted by the substitute verification key pk" is attached, the parameters r1 and r2 included in the electronic signature σ, and the parameters y1" and y2" to be included in the substitute verification key pk". In addition, the substitute key generator calculates a predetermined d" based on Equation 71 above. At that time, it may be constructed such that in lieu of $y1'^w$, y1" may be substituted into the hash function h2. After that, the substitute key generator calculates parameters y" and r" based on Equations 60 and 61 above.

Moreover, the substitute key generator verifies whether or not Equation 61 above is valid and $w \in Z_q^*$ using the parameter d" obtained so far. If any of the conditions is not satisfied, a series of processing associated to the substitute key generation algorithm ends. If both conditions are satisfied, the substitute key generator calculates a parameter α" satisfying Equation 63 above (S260) and determines the substitute verification key pk" and the substitute signing key sk" respectively given by Equations 64 and 65 above. By the above-described method, the substitute verification key pk" and the substitute signing key sk" are generated.

As mentioned above, in the present scheme 2, the information provided from the substitute key generator to the signer is only the parameters y1' and Y". However, the parameter Y" is the hash value of the information y2" on the substitute verification key pk". For this reason, the signer is unable to obtain sufficient information necessary for estimating the substitute verification key pk" before the substitute verification key pk" is determined by the substitute key generator. Therefore, the problem of the SC08 scheme that a person other than the substitute key generator is able to estimate the substitute verification key pk" before the substitute verification key pk" is determined. Moreover, the present scheme 2 is also more efficient than the SC08 scheme.

$$y1' = g^{x1'} \bmod p \tag{68}$$

$$y2' = g^{x2'} \bmod p \tag{69}$$

$$Y'' = h4(y2'') \tag{70}$$

$$d'' = h2(m, r1, r2, y1'', Y'') \tag{71}$$

4: Modifications of First and Second Embodiments

Hereinabove, the substitute key generation method according to the first and second embodiments of the present invention has been described. However, in the above description, only the method of generating the substitute key that accepts an electronic document and electronic signature pair prepared on the side of the signer has been mentioned. Next, a method (hereinafter referred to as a present modification) of generating a substitute key that accepts a pair of an electronic document prepared by a substitute key generator and an electronic signature attached to the electronic document using the substitute key generation method according to the first and second embodiments will be described in brief.

4-1: Substitute Key Generation Method

Hereinafter, by referring to FIG. 18, a substitute key generation method according to the present modification will be described in brief. As shown in FIG. 18, a substitute key generator prepares an electronic document m to which the substitute key generator wants to attach an electronic signature. At that time, a signer also prepares a signing key sk. First, the substitute key generator provides an electronic document m and partial information included in a substitute verification key pk' (S272). The information provided at that time is the same as that of the present schemes 1 and 2. Upon acquiring the information, the signer generates an electronic signature σ for the electronic document m using the signer's signing key sk (S274).

Subsequently, the signer calculates information necessary for generating a substitute verification key pk' using information on the substitute verification key pk' acquired from the substitute key generator and information on the signing key sk and provides the calculated information to the substitute key generator together with the electronic signature σ (S276). Upon acquiring the information and the electronic signature σ, the substitute key generator generates a substitute verification key pk' (S278). By executing these processes, the substitute key generator is able to obtain the electronic signature σ for the electronic document m, the substitute verification key pk' that accepts the electronic document m and the electronic signature σ, and the substitute signing key sk' that pairs with the substitute verification key pk'.

With such a configuration, it is possible to generate a substitute key with respect to the electronic signature σ for the electronic document m that is prepared on the side of the substitute key generator. Such a modification can be appropriately made depending on an aspect of the embodiment. As understood from the modification, the same advantage as the present schemes 1 and 2 can be obtained within a range where it adheres to the technical scope proposed by the present schemes 1 and 2. Therefore, such a modification also belongs to the technical scope of the first and second embodiments according to the present invention.

5: Exemplary Hardware Configuration of Terminal

Figure 19:
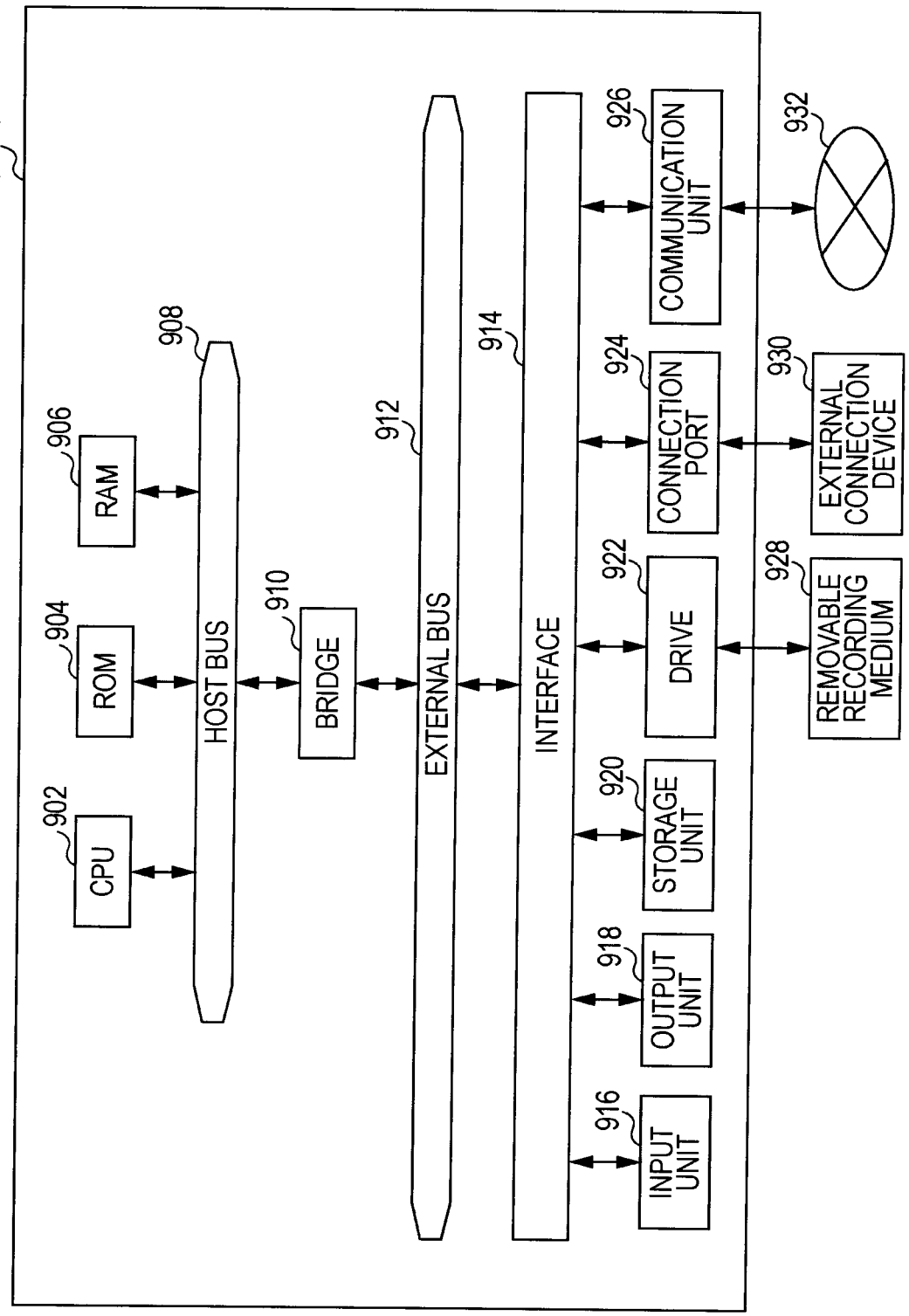
FIG. 19 is a diagram showing an exemplary hardware configuration of a signer terminal and a verifier terminal according to the first and second embodiments of the present invention.

The functions of the respective constituent elements of the signer terminal 100, the verifier terminal 200, and the substitute key generator terminal 300 can be realized with a hardware configuration of an image processing apparatus shown in FIG. 19, for example. That is to say, the functions of the constituent elements are realized by controlling the hardware shown in FIG. 19 using a computer program. The form of the hardware is arbitrary and may include a mobile information terminal such as a personal computer, a cellular phone, a PHS, or a PDA, a game machine, and various information appliances. Here, the PHS is an abbreviation of Personal Handyphone System. Moreover, the PDA is an abbreviation of Personal Digital Assistant.

As shown in FIG. 19, the hardware mainly includes a CPU 902, a ROM 904, a RAM 906, a host bus 908, and a bridge 910. In addition, the hardware further includes an external bus 912, an interface 914, an input unit 916, an output unit 918, a storage unit 920, a drive 922, a connection port 924, and a communication unit 926. Here, CPU is an abbreviation of Central Processing Unit. Moreover, ROM is an abbreviation of Read Only Memory. Moreover, RAM is an abbreviation of Random Access Memory.

The CPU 902 functions as an arithmetic processing unit and a control device, for example, and controls all or a part of the operations of the various constituent elements based on various types of programs that are stored in at least one of the ROM 904, the RAM 906, the storage unit 920, and a removable storage medium 928. The ROM 904 is a means for storing data and the like that are used in computations and by programs that are read by the CPU 902, for example. The RAM 906 stores therein temporarily and permanently the programs that are read by the CPU 902, various types of parameters and the like that vary as necessary when the programs are executed, for example.

These constituent elements are interconnected by the host bus 908, for example, which is capable of high speed data transmission. The host bus 908 is connected through the bridge 910 to the external bus 912, whose data transmission speed is relatively low. Moreover, as the input unit 916, a mouse, a keyboard, a touch panel, a button, a switch, a lever, and the like are used, for example. Furthermore, as the input unit 916, a remote control unit that is capable of transmitting a control signal using infrared rays or other electromagnetic waves may be used.

As the output unit 918, a display device such as a CRT, an LCD, a PDP, or an ELD, an audio output device such as a speaker or a headphone, a facsimile machine, and the like may be used. That is to say, the output unit 918 is a means for visibly and audibly notifying users of information that has been obtained. Here, CRT is an abbreviation of Cathode Ray Tube. Moreover, LCD is an abbreviation of Liquid Crystal Display. Furthermore, PDP is an abbreviation of Plasma Display Panel. Furthermore, ELD is an abbreviation of Electro-Luminescence Display.

The storage unit 920 is a device for storing various types of data. As the storage unit 920, a magnetic storage device such as an HDD, a semiconductor storage device, an optical storage device, a magneto-optical storage device, and the like are used, for example. Here, HDD is an abbreviation of Hard Disk Drive.

The drive 922 is a device that reads or writes information from/to the removable storage medium 928, which may be a magnetic disk, an optical disk, a magneto optical disk, a semiconductor memory, or the like, for example. The removable storage medium 928 may be a DVD medium, a Blu-ray medium, an HD DVD medium, and various types of semiconductor storage medium, for example. Of course, the removable storage medium 928 may be an IC card mounting a non-contact IC chip thereon, an electronic device, or the like. Here, IC is an abbreviation of Integrated Circuit.

The connection port 924 is a port for connecting an external connection device 930 thereto, such as a USB port, an IEEE 1394 port, an SCSI port, an RS-232C port, or an optical audio terminal. The external connection device 930 may be a printer, a portable music player, a digital camera, a digital video camera, an IC recorder, or the like, for example. Here, USB is an abbreviation of Universal Serial Bus. Moreover, SCSI is an abbreviation of Small Computer System Interface.

The communication unit 926 is a communication device for connecting to a network 932 and may be, for example, a communication card for a wired or wireless LAN, Bluetooth (registered trademark), or WUSB, a router for optical communication, a router for ADSL, a modem for various types of communication, or the like. Moreover, the network 932 connected to the communication unit 926 is a network that is connected by wire or wirelessly, and may be, for example, the Internet, a home LAN, an infrared communication network, a visible light communication network, a broadcast network, a satellite communication network, or the like. Here, LAN is an abbreviation of Local Area Network. Moreover, WUSB is an abbreviation of Wireless USB. Furthermore, ADSL is an abbreviation of Asymmetric Digital Subscriber Line.

6: Application Example

Next, an application example of the substitute key generation method according to the first and second embodiments will be described. The substitute key generation method relates to a method of generating a substitute verification key pk" that an electronic signature σ generating using a signing key sk and verification key pk pair with respect to an electronic document m. As a method of using the substitute verification key pk" that accepts the electronic document m and electronic signature σ pair (m, σ), a key update method that substitutes a signing key sk and a verification key pk with a substitute verification key pk" and a substitute signing key sk" when the signing key sk is revealed can be considered, for example.

Moreover, by making the most of the property of the substitute verification key pk", a method of applying the substitute key generation method to a PKI, a proxy signature scheme, and the like which will be described later can be considered. Of course, the range of application of the substitute key generation method is not limited to such examples. In order to help expand the range of application of the substitute key generation method, in this section, application to the PKI, application to the proxy signature scheme, and application to a role-sharing electronic signature will be introduced as a specific example. In addition, any of the techniques of the substitute key generation method according to the first and second embodiments can be applied to the application examples introduced in this section.

6-1: Application to PKI

Figure 21:
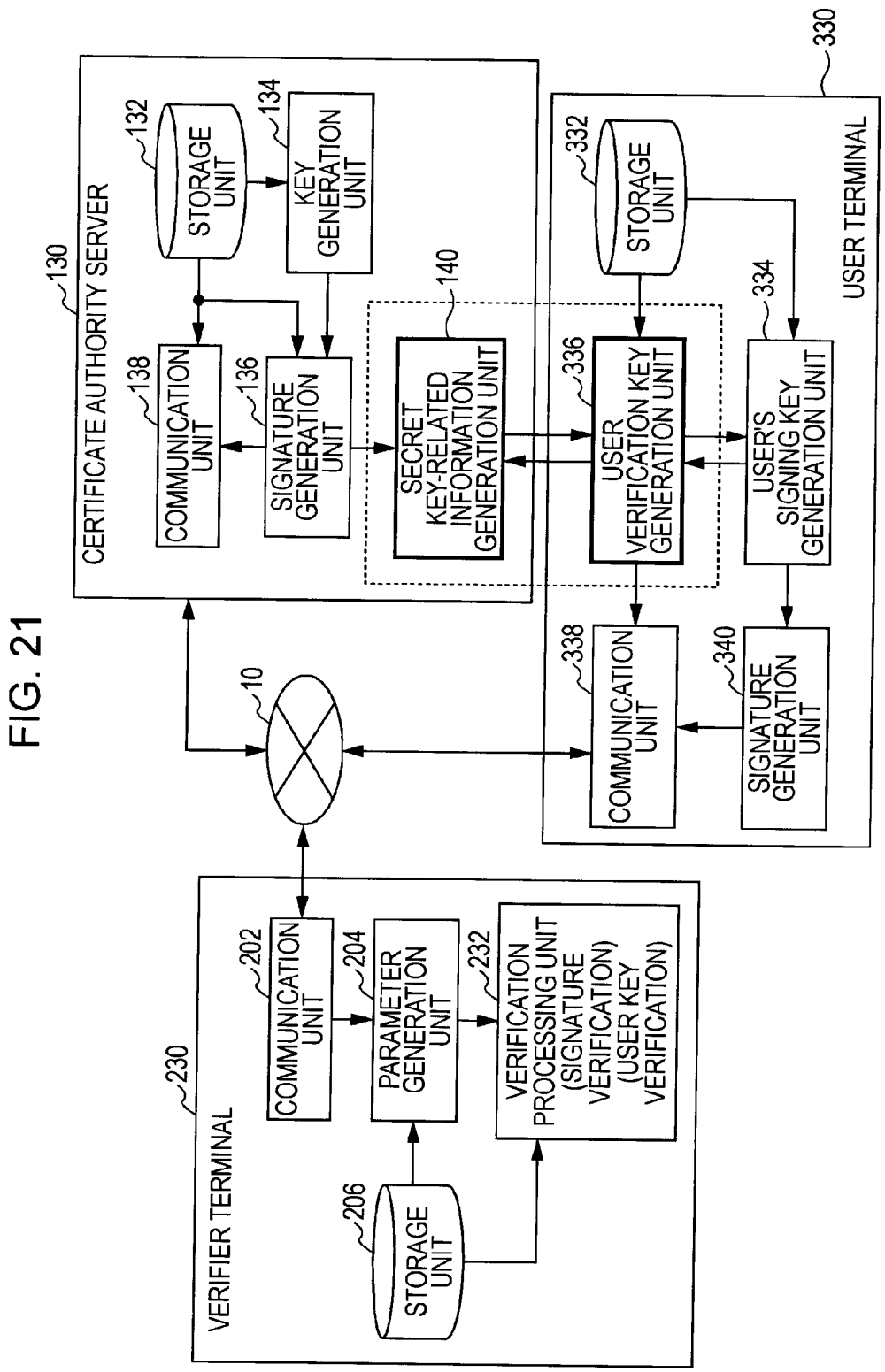
FIG. 21 is a diagram showing an exemplary system configuration where the substitute key generation method according to the first and second embodiments of the present invention is applied to key authentication between a PKI certificate authority server and a user terminal.
Figure 22:
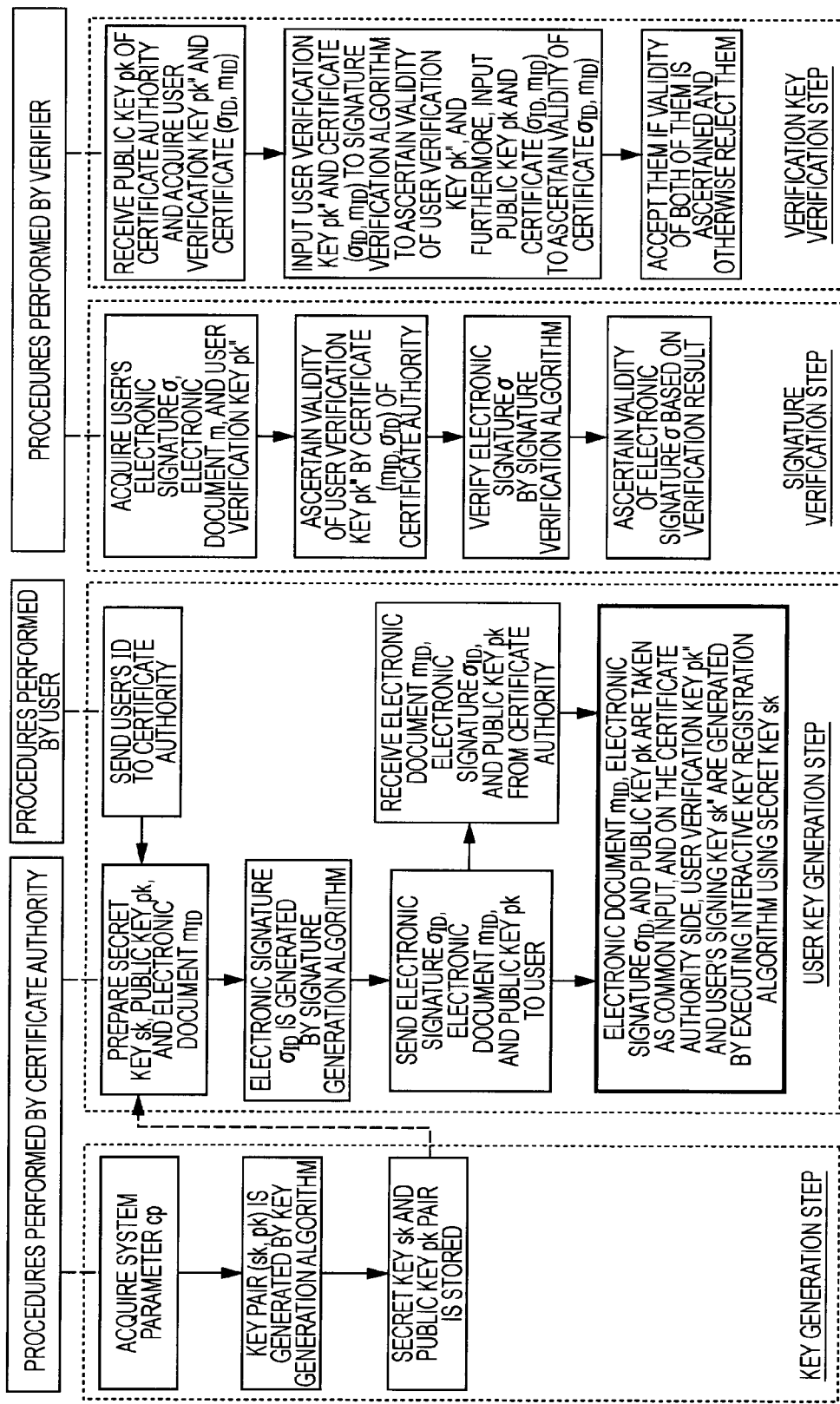
FIG. 22 is a diagram showing an application method where the substitute key generation method according to the first and second embodiments of the present invention is applied to key authentication between a PKI certificate authority server and a user terminal.

First, by referring to FIGS. 21 and 22, a method (hereinafter referred to as application example 1) of applying the substitute key generation method according to the first and second embodiments to a PKI will be described. FIG. 21 is a diagram showing an example of a PKI system capable of implementing a method according to the application example 1. FIG. 22 is a diagram showing the flow of an overall process according to the application example 1. The application example 1 applies the substitute key generation method to a certificate authority-based verification method of a public key (corresponding to a verification key).

PKI (Public Key Infrastructure) is a scheme in which a certificate authority (CA) examines the ID (Identity) of a user that possesses a public key pk and binds the user's ID with the public key pk. Here, CA is an abbreviation of Certification Authority. The PKI scheme in the application example 1 can be expressed as the following 6 sets of algorithms, for example.

(A1) System Parameter Generation Algorithm
(A2) CA Key Generation Algorithm
(A3) Key Registration Algorithm (Interaction Protocol)
(A4) Signature Generation Algorithm
(A5) Signature Verification Algorithm
(A6) Verification Key Verification Algorithm The system parameter generation algorithm A1 is used by a system administrator and corresponds to the system parameter generation algorithm SetupKSS (see FIG. 6) in the SC08 scheme.

The CA key generation algorithm A2 is an algorithm that is used by a certificate authority and generates a secret key sk and public key pk pair that is used by the certificate authority and unique to the certificate authority. The public key pk generated by the CA key generation algorithm is made public to be used for verifying a certificate that is issued by the certificate authority. The secret key sk generated by the CA key generation algorithm is managed secretly by the certificate authority.

The secret key sk that is managed secretly by the certificate authority is used for generating a user verification key pk" described later. Here, the certificate issued by the certificate authority certifies that the user verification key pk" is bound to the user ID. Moreover, the CA key generation algorithm corresponds to the key generation algorithm GenKSS (see FIGS. 11 and 15) according to the first and second embodiments. However, it should be noted that the CA key generation algorithm is used by the certificate authority rather than the signer mentioned in the previous description.

The key registration algorithm A3 is an algorithm that generates a user's signing key sk" and a user verification key pk" used by the user and generates a certificate for certifying the validity of the user verification key pk". The key registration algorithm is executed between the certificate authority and the user based on an interactive protocol. The user verification key pk" generated by the key registration algorithm is made public and used for verification of an electronic signature that is generated using the user's signing key sk".

Moreover, the user's signing key sk" is managed secretly by the user. Moreover, the key registration algorithm corresponds to the substitute key generation algorithm (see FIGS. 13 and 17) according to the first and second embodiments. However, it should be noted that the key registration algorithm is used between the certificate authority and the user rather than between the signer and the substitute signer mentioned in the previous description.

The signature generation algorithm A4 is an algorithm that allows the user to generate an electronic signature σ for an electronic document m using the user's signing key sk". Moreover, the signature generation algorithm corresponds to the signature generation algorithm SigKSS (see FIGS. 11 and 15) according to the first and second embodiments. However, it should be noted that the signature generation algorithm is used by the user (corresponding to the substitute key generator).

The signature verification algorithm A5 is an algorithm that verifies whether or not the user's electronic signature σ is a valid electronic signature for the electronic document m. The signature verification algorithm is used by a verifier that verifies the user's electronic signature σ. The signature verification algorithm mentioned herein corresponds to the signature verification algorithm Ver (see FIGS. 12 and 16) according to the first and second embodiments.

The verification key verification algorithm A6 is an algorithm that verifies whether or not the certificate issued by the certificate authority is a valid certificate and also verifies using the certificate whether or not the user verification key pk" is a valid verification key. Here, the verification key verification algorithm A6 will be described in more detail.

As mentioned above, the substitute key generation method according to the first and second embodiments is a method of generating a substitute verification key pk" that accepts an electronic signature σ that is generated using a signing key sk and verification key pk pair with respect to an electronic document m. In the application example 1, the signing key sk and the verification key pk correspond to a secret key sk and a public key pk that are generated by the certificate authority. Moreover, in the application example 1, an electronic document $m_{ID}$ in which the user ID is described is used as the electronic document m. Furthermore, as the electronic signature σ, an electronic signature $\sigma_{ID}$ that is generated based on a secret key sk with respect to the electronic document $m_{ID}$ is used.

However, the electronic signature $\sigma_{ID}$ is used as a certificate for the user verification key pk" issued by the certificate authority. The user verification key pk" corresponds to the substitute verification key pk" that is generated by the substitute key generation algorithm according to the first and second embodiments. That is to say, a valid user verification key pk" accepts the certificate $\sigma_{ID}$ that is generated with respect to the electronic document $m_{ID}$. Conversely, by verifying whether or not the user verification key pk" accepts the ($m_{ID}$, $\sigma_{ID}$) pair, it is possible to verify the validity of the user verification key pk".

Moreover, the validity of the certificate $\sigma_{ID}$ can be ascertained by verifying whether or not the public key pk issued by the certificate authority accepts the ($m_{ID}$, $\sigma_{ID}$) pair. In this way, the verification key verification algorithm A6 verifies the validity of the certificate $\sigma_{ID}$ issued by the certificate authority and the user verification key pk" by verifying whether or not the public key pk generated by the certificate authority accepts the ($m_{ID}$, $\sigma_{ID}$) pair and whether or not the user verification key pk" generated based on an interactive protocol accepts the ($m_{ID}$, $\sigma_{ID}$) pair.

Hereinafter, the system configuration according to the application example 1 and a specific processing flow will be described.

System Configuration

First, reference is made to FIG. 21. As shown in FIG. 21, the system of the application example 1 includes a certificate authority server 130 provided to a certificate authority, a verifier terminal 230 used by a verifier, and a user terminal 330 used by a user. Moreover, the certificate authority server 130, the verifier terminal 230, and the user terminal 330 are connected by a network 10. Here, the configuration of a system administrator is not shown.

Certificate Authority Server 130

First, the functional configuration of the certificate authority server 130 will be described. As shown in FIG. 21, the certificate authority server 130 mainly includes a storage unit 132, a key generation unit 134, a signature generation unit 136, a communication unit 138, and a secret key-related information generation unit 140.

The storage unit 132 is a means for storing the system parameter cp, the electronic document m, and programs for executing each algorithm. The key generation unit 134 reads the system parameter cp and the execution program of the CA key generation algorithm from the storage unit 132 and generates a secret key sk and a public key pk. The secret key sk and the public key pk generated by the key generation unit 134 are input to the signature generation unit 136. Moreover, the public key pk is made public by the communication unit 138 and input to the verifier terminal 230. Of course, the user terminal 330 is also able to acquire the public key pk.

Moreover, the signature generation unit 136 also receives an electronic document $m_{ID}$ in which a user ID for identifying a user is included. Here, the secret key sk and the public key pk correspond to the signing key sk and the verification key pk generated by a valid signer in the first and second embodiments. The signature generation unit 136 reads the system parameter cp and the execution program of the signature generation algorithm from the storage unit 132 and generates an electronic signature $\sigma_{ID}$ to be attached to the electronic document $m_{ID}$ using the input secret key sk and the electronic document $m_{ID}$.

The electronic signature $\sigma_{ID}$ and the electronic document $m_{ID}$ generated by the signature generation unit 136 are provided by the communication unit 138 to the verifier terminal 230 via the network 10. The electronic document $m_{ID}$ and electronic signature $\sigma_{ID}$ pair is used as a certificate $(m_{ID}, \sigma_{ID})$ of a user verification key pk" described later. For this reason, the public key pk and the certificate $(m_{ID}, \sigma_{ID})$ are not provided from the certificate authority server 130 to the verifier terminal 230.

The secret key-related information generation unit 140 is a means for generating information on the secret key sk necessary for generating the user verification key pk" using the key registration algorithm. As mentioned above, the key registration algorithm is an interactive protocol that corresponds to the substitute key generation algorithm according to the first and second embodiments. For this reason, the secret key-related information generation unit 140 acquires information necessary for generating the information on the secret key sk from the user terminal 330 (specifically, a user verification key generation unit 336) and generates information on the secret key sk using the acquired information.

For example, when an interactive protocol corresponding to the substitute key generation algorithm (see FIG. 13) according to the first embodiment is used, the secret key-related information generation unit 140 generates random numbers w and calculates parameters k" used for generation of the substitute verification key pk". In addition, the secret key-related information generation unit 140 acquires a parameter y1' related to the user verification key pk" from the user terminal 330 (specifically, the user verification key generation unit 336) and generates a parameter k" using the parameter y1'.

The parameters k" and w generated in this way are provided to the user terminal 330 from the secret key-related information generation unit 140. In this way, in the key registration algorithm which is an interactive protocol, information necessary for generation of the user verification key pk" is provided to the user terminal 330 from the certificate authority server 130.

Verifier Terminal 230

Next, the functional configuration of the verifier terminal 230 will be described. As shown in FIG. 21, the verifier terminal 230 mainly includes a communication unit 202, a parameter generation unit 204, a storage unit 206, and a verification processing unit 232. In the storage unit 206, in addition to the system parameter cp, the execution programs of the algorithms to be executed by the verifier are stored. In this example, it will be assumed that the public key pk that is made public by the certificate authority is also stored in advance in the storage unit 206.

First, the communication unit 202 acquires the certificate $(m_{ID}, \sigma_{ID})$ from the certificate authority server 130 via the network 10, and the certificate $(m_{ID}, \sigma_{ID})$ is input to the parameter generation unit 204. In the parameter generation unit 204, parameters necessary for execution of the signature verification algorithm and the verification key verification algorithm are calculated. The parameters calculated by the parameter generation unit 204 are input to the verification processing unit 232.

Then, the verification processing unit 232 first inputs the parameters calculated by the parameter generation unit 204, the user verification key pk", the public key pk, and the certificate $(m_{ID}, \sigma_{ID})$ to the verification key verification algorithm, thus verifying the validity of the certificate and the validity of the user verification key pk". When the validity of the information is verified, the verification processing unit 232 inputs the parameters calculated by the parameter generation unit 204, the user verification key pk", and the electronic document m and the electronic signature σ generated by the user to the signature verification algorithm, thus verifying the validity of the electronic signature σ.

In this way, in the verifier terminal 230, the validity of the certificate and the user verification key is verified. As a result, it is possible to ascertain the binding between the user verification key which corresponds to the user's public key in the PKI and the electronic document $m_{ID}$ which corresponds to the user ID. When the binding is ascertained, the electronic signature is verified using the user verification key.

User Terminal 330

Next, the functional configuration of the user terminal 330 will be described. As shown in FIG. 21, the user terminal 330 mainly includes a storage unit 332, a user's signing key generation unit 334, a user verification key generation unit 336, a communication unit 338, and a signature generation unit 340. In the storage unit 332, in addition to the system parameter cp, the execution programs of the algorithms to be executed by the substitute key generator are stored.

The user's signing key generation unit 334 is a means for generating the user's signing key sk". For example, when the same algorithm as the key generation algorithm (see FIG. 11) according to the first embodiment is used, the user's signing key generation unit 334 reads the system parameter cp stored in the storage unit 332 and generates parameters x1' and x2" related to the user's signing key sk".

Then, the user's signing key generation unit 334 inputs the parameters x1' and x2" to the user verification key generation unit 336. Moreover, upon receiving the information necessary for generation of the substitute signing key sk" from the user verification key generation unit 336, the user's signing key generation unit 334 generates the substitute signing key sk" by adding the information. The user's signing key generated by the user's signing key generation unit 334 is input to the signature generation unit 340.

Upon receiving the parameters x1' and x2" from the user's signing key generation unit 334, the user verification key generation unit 336 executes an interaction with the certificate authority server 130 (specifically, the secret key-related information generation unit 140) and acquires parameters k" and w necessary for generation of the substitute verification key pk". This interaction is executed based on the key registration algorithm which corresponds to the substitute key generation algorithm according to the first and second embodiments. For example, when the key registration algorithm corresponding to the substitute key generation algorithm according to the first embodiment is used, the user verification key generation unit 336 provides the parameter y1' to the certificate authority server 130 as the information on the substitute verification key pk".

As mentioned above, upon receiving the parameter y1', the secret key-related information generation unit 140 of the certificate authority server 130 provides the information (for example, k" and w) necessary for generation of the user verification key pk" to the user verification key generation unit 336 based on the parameter y1'. Here, it should be noted that at this stage, the certificate authority server 130 is unable to estimate the user verification key pk" which is determined later. Upon acquiring the parameters k" and w from the certificate authority server 130, the user verification key generation unit 336 generates the user verification key pk" using the parameters k" and w. The user verification key pk" generated by the user verification key generation unit 336 is provided by the communication unit 338 to the verifier terminal 230 via the network 10.

A part of the parameters calculated in this generation step of the user verification key pk" may be included in the user's signing key sk". In such a case, the parameter included in the user's signing key sk" is input to the user's signing key generation unit 334 from the user verification key generation unit 336 at this stage. As mentioned above, the user's signing key generation unit 334 generates the user's signing key sk" using the input parameter. Moreover, the user's signing key sk" generated by the user's signing key generation unit 334 is input to the signature generation unit 340.

The signature generation unit 340 is a means for generating the user's electronic signature σ using the user's signing key sk" input from the user's signing key generation unit 334. The signature generation unit 340 generates an electronic signature σ for an electronic document m using the signature generation algorithm. The electronic document m and the electronic signature σ generated at this stage will be accepted by the user verification key pk" that is generated by the user verification key generation unit 336. The electronic document m and electronic signature σ pair generated by the signature generation unit 340 is provided to the verifier terminal 230 by the communication unit 338.

Hereinabove, the system configuration of the application example 1 has been described. Next, by referring to FIG. 22, a public key authentication method according to the application example 1 and an overall processing flow thereof will be described in brief.

Public Key Authentication Method

Reference is made to FIG. 22. As described above, the entities appearing in the application example 1 mainly consist of the four entities, i.e., the system administrator, the certificate authority, the user, and the verifier. In FIG. 22, the procedures performed by the certificate authority, the user, and the verifier except for the system administrator are described. The procedures will be described below.

Procedures of Certificate Authority: Key Generation Step

First, a key generation process by the certificate authority will be described. The certificate authority acquires the system parameter cp from the system administrator. Subsequently, the acquired system parameter cp is input to the CA key generation algorithm, and a secret key sk and public key pk pair is generated. After that, the certificate authority stores the secret key sk and public key pk pair.

Procedures of Certificate Authority and User: User Key Generation Step

Next, a user key generation process by the certificate authority and the user will be described. First, the user provides his/her own user ID to the certificate authority. Subsequently, the certificate authority prepares the secret key sk and public key pk generated in the key generation step and an electronic document $m_{ID}$ including the user ID. After that, the certificate authority generates an electronic signature $\sigma_{ID}$ for the electronic document $m_{ID}$ using the secret key sk. Subsequently, the certificate authority provides the electronic document $m_{ID}$, the electronic signature $\sigma_{ID}$, and the public key pk to the user.

Then, the user receives the electronic document $m_{ID}$, the electronic signature $\sigma_{ID}$, and the public key pk from the certificate authority. In this way, when the electronic document $m_{ID}$, the electronic signature $\sigma_{ID}$, and the public key pk are shared between the certificate authority and the user, the certificate authority and the user input the electronic document $m_{ID}$, the electronic signature $\sigma_{ID}$, and the public key pk to the key registration algorithm corresponding to the substitute key generation algorithm according to the first and second embodiments, thus generating a user verification key pk" and a user's signing key sk" in an interactive manner. During this interaction, the certificate authority provides information on the secret key sk to the user while preventing the secret key sk from being identified by the user.

Procedures of Verifier: Signature Verification Step

Next, a signature verification process by the verifier will be described. The verifier acquires the electronic document m, the electronic signature σ, and the user verification key pk" from the user. The electronic signature σ acquired at this stage is a signature that is generated with respect to the electronic document m using the user's signing key sk". Subsequently, if necessary, the verifier verifies the validity of the user verification key pk". At that time, the verifier verifies the validity of the user verification key pk" using the certificate ($m_{ID}$, $\sigma_{ID}$) acquired from the certificate authority using the verification key verification algorithm. When the validity of the user verification key pk" is verified, the verifier inputs the user verification key pk", the electronic document m, and the electronic signature σ to the signature verification algorithm to verify the electronic signature σ, thus ascertaining the validity of the electronic signature σ.

Procedures of Verifier: Verification Key Verification Step

Next, a verification key verification process by the verifier will be described. In the signature verification step, the verifier verifies the validity of the user verification key pk" using the verification key verification algorithm. The verification key verification step described in this section relates to this verification process. First, the verifier acquires the public key pk from the certificate authority and prepares the user verification key pk" and the certificate ($m_{ID}$, $\sigma_{ID}$). Subsequently, the verifier inputs the user verification key pk" and the certificate ($m_{ID}$, $\sigma_{ID}$) to the verification key verification algorithm, thus verifying the validity of the user verification key pk" and the certificate ($m_{ID}$, $\sigma_{ID}$).

The verification key verification algorithm is realized by employing the signature verification algorithm according to the first and second embodiments. First, in order to verify the validity of the certificate ($m_{ID}$, $\sigma_{ID}$), the certificate authority's public key pk and the certificate ($m_{ID}$, $\sigma_{ID}$) are input to the signature verification algorithm, and it is then determined whether or not the verification equation is valid. Similarly, in order to verify the user verification key pk", the user verification key pk" and the certificate ($m_{ID}$, $\sigma_{ID}$) are input to the signature verification algorithm, and it is then determined whether or not the verification equation is valid. That is, the verification key verification algorithm executes these processes. The user verification key pk" is accepted when the verification equation is determined to be valid for the two inputs.

Hereinabove, the public key authentication method according to the application example 1 has been described. As seen above, the property of the substitute key according to the first and second embodiments can be applied to authentication of the public key (user verification key) in the PKI.

6-2: Application to Proxy Signature Scheme

Figure 23:
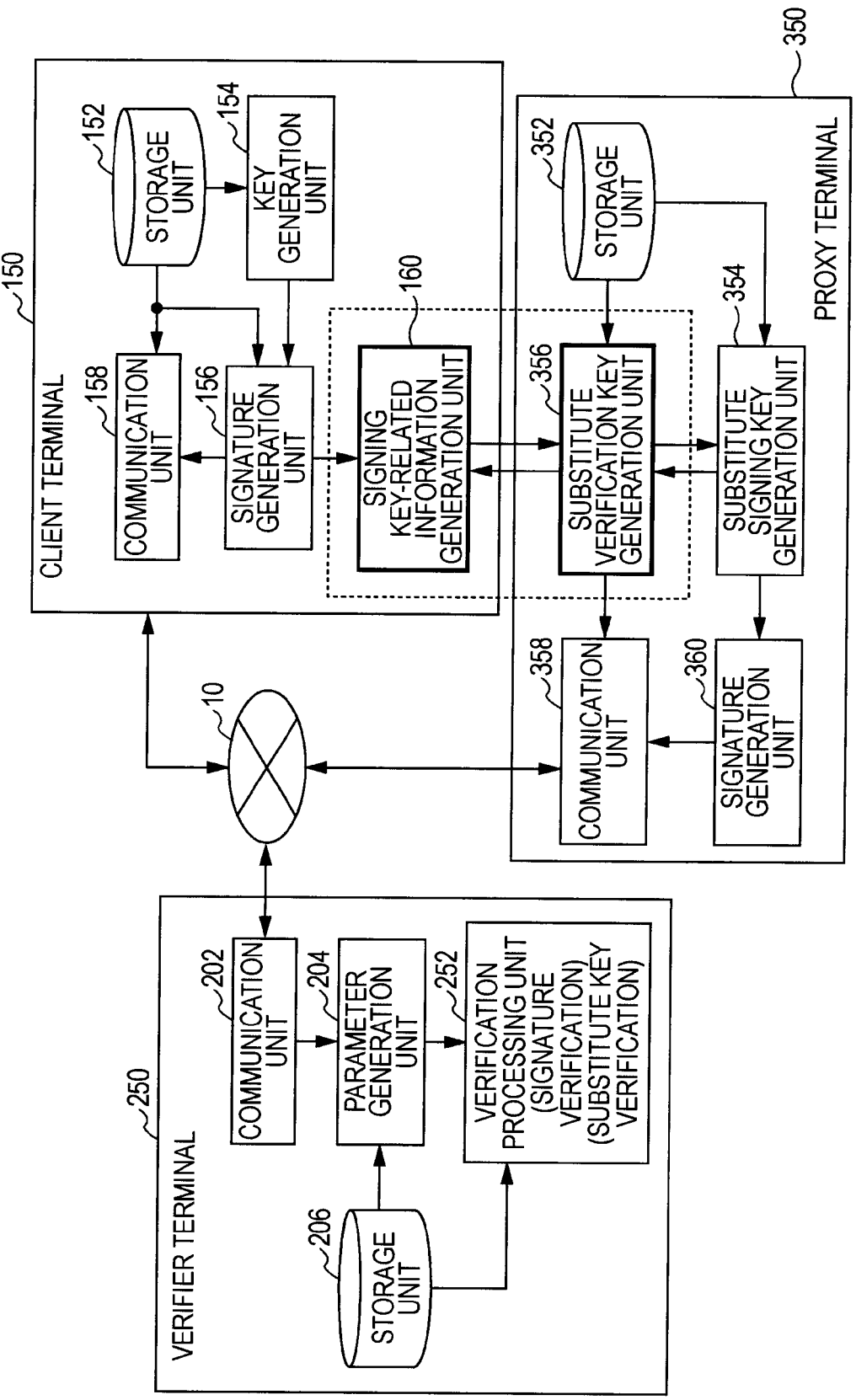
FIG. 23 is a diagram showing an exemplary system configuration where the substitute key generation method according to the first and second embodiments of the present invention is applied to proxy authentication of a proxy signature scheme.

Next, by referring to FIGS. 23 and 24, a method (hereinafter referred to as application example 2) of applying the substitute key generation method according to the first and second embodiments to a proxy signature scheme will be described. FIG. 23 is a diagram illustrating an example of a proxy signature system capable of implementing the method according to the application example 2. FIG. 24 is a diagram showing the flow of an overall process according to the application example 2.

The proxy signature scheme refers to an electronic signature scheme that enables a client to transfer a part of its own signature generation power to a proxy. The proxy signature scheme is expressed by the following six sets of algorithms, for example.

(A1) System Parameter Generation Algorithm
(A2) Key Generation Algorithm
(A3) Proxy Key Generation Algorithm
(A4) Signature Generation Algorithm
(A5) Signature Verification Algorithm
(A6) Proxy Verification Algorithm The system parameter generation algorithm A1 is used by a system administrator and corresponds to the system parameter generation algorithm SetupKSS (see FIG. 6) in the SC08 scheme.

The key generation algorithm A2 is an algorithm that is used by the client and generates a signing key sk and verification key pk pair that is used by the client and unique to the client. The verification key pk generated by the key generation algorithm is made public to be used for verifying an electronic signature σ that is generated using the signing key sk. The signing key sk generated by the key generation algorithm is managed secretly by the client.

The signing key sk that is managed secretly by the client is used for generating a substitute verification key pk" described later. Moreover, the key generation algorithm corresponds to the key generation algorithm GenKSS (see FIGS. 11 and 15) according to the first and second embodiments. However, it should be noted that the key generation algorithm is used by the client rather than the signer.

The proxy key generation algorithm A3 is an algorithm that generates a substitute signing key sk" and a substitute verification key pk" used by the proxy and generates a certificate for certifying the validity of the proxy by the client. The proxy key generation algorithm is executed between the client and the proxy based on an interactive protocol. The substitute verification key pk" generated by the proxy key generation algorithm is made public to be used for verification of an electronic signature that is generated using the substitute signing key sk".

Moreover, the substitute signing key sk" is managed secretly by the proxy. The proxy key generation algorithm corresponds to the substitute key generation algorithm (see FIGS. 13 and 17) according to the first and second embodiments. Moreover, the proxy key generation algorithm is used between the client and the proxy rather than between the signer and the substitute signer. The certificate of the client certifies that the substitute verification key of the proxy is recognized by the client.

The signature generation algorithm A4 is an algorithm that allows the proxy to generate an electronic signature σ for the electronic document m using the substitute signing key sk". Moreover, the signature generation algorithm corresponds to the signature generation algorithm SigKSS (see FIGS. 11 and 15) according to the first and second embodiments. However, it should be noted that the signature generation algorithm is used by both the client and the proxy.

The signature verification algorithm A5 is an algorithm that verifies whether or not the electronic signature σ is a valid electronic signature for the electronic document m. The signature verification algorithm is used by the client or a verifier that verifies the electronic signature σ of the proxy. The signature verification algorithm mentioned herein corresponds to the signature verification algorithm Ver (see FIGS. 12 and 16) according to the first and second embodiments.

The proxy verification algorithm A6 is an algorithm that verifies whether or not the proxy is a valid proxy that is recognized by the client. In order to verify the validity of the proxy, the proxy verification algorithm verifies whether or not the certificate issued by the client is a valid certificate and also verifies using the certificate whether or not the substitute verification key pk" is a valid verification key. Here, the proxy verification algorithm A6 will be described in more detail.

As mentioned above, the substitute key generation method according to the first and second embodiments is a method of generating a substitute verification key pk" that accepts an electronic signature σ that is generated using a signing key sk and verification key KV' pair with respect to an electronic document m. In the application example 2, the signing key sk and the verification key pk correspond to a signing key sk and a verification key pk that are generated by the client. Moreover, in the application example 2, an electronic document $m_w$ including the scope of transferred authority, an expiration date, and the like is used as the electronic document m. Furthermore, as the electronic signature σ, an electronic signature $\sigma_w$ that is generated based on a secret key sk with respect to the electronic document $m_w$ is used.

However, the electronic signature $\sigma_w$ is used as a certificate for the substitute verification key pk" issued by the client. The substitute verification key pk" corresponds to the substitute verification key pk" that is generated by the substitute key generation algorithm according to the first and second embodiments. That is to say, a valid substitute verification key pk" accepts the certificate $\sigma_w$ that is generated with respect to the electronic document $m_w$. Conversely, by verifying whether or not the substitute verification key pk" accepts the ($m_w$, $\sigma_w$) pair, it is possible to verify whether or not the proxy's substitute verification key pk" is recognized by the client.

Moreover, the validity of the certificate $\sigma_w$ can be ascertained by verifying whether or not the verification key pk issued by the client accepts the ($m_w$, $\sigma_w$) pair. In this way, the proxy verification algorithm A6 verifies the validity of the certificate $\sigma_w$ issued by the client and the substitute verification key pk" by verifying whether or not the verification key pk generated by the client accepts the ($m_w$, $\sigma_w$) pair and whether or not the substitute verification key pk" generated based on an interactive protocol accepts the ($m_w$, $\sigma_w$) pair.

Hereinafter, the system configuration according to the application example 2 and a specific processing flow will be described.

System Configuration

First, reference is made to FIG. 23. As shown in FIG. 23, the system of the application example 2 includes a client terminal 150 used by a client, a verifier terminal 250 used by a verifier, and a proxy terminal 350 used by a proxy. Moreover, the client terminal 150, the verifier terminal 250, and the proxy terminal 350 are connected by a network 10. Here, the configuration of a system administrator is not shown.

Client Terminal 150

First, the functional configuration of the client terminal 150 will be described. As shown in FIG. 23, the client terminal 150 mainly includes a storage unit 152, a key generation unit 154, a signature generation unit 156, a communication unit 158, and a signing key-related information generation unit 160.

The storage unit 152 is a means for storing the system parameter cp, the electronic document m, and programs for executing each algorithm. The key generation unit 154 reads the system parameter cp and the execution program of the key generation algorithm from the storage unit 152 and generates a signing key sk and a verification key pk. The signing key sk and the verification key pk generated by the key generation unit 154 are input to the signature generation unit 156. Moreover, the verification key pk is made public by the communication unit 158 and input to the verifier terminal 250. Of course, the proxy terminal 350 is also able to acquire the verification key pk.

Moreover, the signature generation unit 156 also receives an electronic document $m_w$ in which the scope of transferred authority, an expiration date, and the like are included. Here, the client's signing key sk and the verification key pk correspond to the signing key sk and the verification key pk generated by a valid signer in the first and second embodiments. The signature generation unit 156 reads the system parameter cp and the execution program of the signature generation algorithm from the storage unit 152 and generates an electronic signature $\sigma_w$ to be attached to the electronic document $m_w$ using the input signing key sk and the electronic document $m_w$.

The electronic signature $\sigma_w$ and the electronic document $m_w$ generated by the signature generation unit 156 are provided by the communication unit 158 to the verifier terminal 250 via the network 10. The electronic document $m_w$ and electronic signature $\sigma_w$ pair is used as a certificate $(m_w, \sigma_w)$ for certifying that the substitute verification key pk" is recognized by the client. For this reason, the verification key pk and the certificate $(m_w, \sigma_w)$ are not provided from the client terminal 150 to the verifier terminal 250.

The signing key-related information generation unit 160 is a means for generating information on the signing key sk necessary for generating the substitute verification key pk" using the proxy key generation algorithm. As mentioned above, the proxy key generation algorithm is an interactive protocol that corresponds to the substitute key generation algorithm according to the first and second embodiments. For this reason, the signing key-related information generation unit 160 acquires information necessary for generating the information on the signing key sk from the proxy terminal 350 (specifically, a substitute verification key generation unit 356) and generates information on the signing key sk using the acquired information.

For example, when an interactive protocol corresponding to the substitute key generation algorithm (see FIG. 13) according to the first embodiment is used, the signing key-related information generation unit 160 generates random numbers w and calculates parameters k" used for generation of the substitute verification key pk". In addition, the signing key-related information generation unit 160 acquires a parameter y1' related to the substitute verification key pk" from the proxy terminal 350 (specifically, the substitute verification key generation unit 356) and generates a parameter k" using the parameter y1'.

The parameters k" and w generated in this way are provided to the proxy terminal 350 from the signing key-related information generation unit 160. In this way, in the proxy key generation algorithm which is an interactive protocol, information necessary for generation of the substitute verification key pk" is provided to the proxy terminal 350 from the client terminal 150.

Verifier Terminal 250

Next, the functional configuration of the verifier terminal 250 will be described. As shown in FIG. 23, the verifier terminal 250 mainly includes a communication unit 202, a parameter generation unit 204, a storage unit 206, and a verification processing unit 252. In the storage unit 206, in addition to the system parameter cp, the execution programs of the algorithms to be executed by the verifier are stored. In this example, it will be assumed that the verification key pk that is provided from the client is also stored in advance in the storage unit 206.

First, the communication unit 202 acquires the certificate $(m_w, \sigma_w)$ from the client terminal 150 via the network 10, and the certificate $(m_w, \sigma_w)$ is input to the parameter generation unit 204. In the parameter generation unit 204, parameters necessary for execution of the signature verification algorithm and the proxy verification algorithm are calculated. The parameters calculated by the parameter generation unit 204 are input to the verification processing unit 252.

Then, the verification processing unit 252 first inputs the parameters calculated by the parameter generation unit 204, the substitute verification key pk", the verification key pk, and the certificate $(m_w, \sigma_w)$ to the proxy verification algorithm, thus verifying the validity of the proxy and the validity of the substitute verification key pk". When the validity of the information is verified, the verification processing unit 252 inputs the parameters calculated by the parameter generation unit 204, the substitute verification key pk", and the electronic document m and the electronic signature $\sigma$ generated by the user to the signature verification algorithm, thus verifying the validity of the electronic signature $\sigma$. In this way, in the verifier terminal 250, the proxy and the electronic signature are verified.

Proxy Terminal 350

Next, the functional configuration of the proxy terminal 350 will be described. As shown in FIG. 23, the proxy terminal 350 mainly includes a storage unit 352, a substitute signing key generation unit 354, a substitute verification key generation unit 356, a communication unit 358, and a signature generation unit 360. In the storage unit 352, in addition to the system parameter cp, the execution programs of the algorithms to be executed by the substitute key generator are stored.

The substitute signing key generation unit 354 is a means for generating the substitute signing key sk". For example, when the same algorithm as the key generation algorithm (see FIG. 11) according to the first embodiment is used, the substitute signing key generation unit 354 reads the system parameter cp stored in the storage unit 352 and generates parameters x1' and x2" related to the substitute signing key sk".

Then, the substitute signing key generation unit 354 inputs the parameters x1' and x2" to the substitute verification key generation unit 356. Moreover, upon receiving the information necessary for generation of the substitute signing key sk"

from the substitute verification key generation unit 356, the substitute signing key generation unit 354 generates the substitute signing key sk" by adding the information. The substitute signing key generated by the substitute signing key generation unit 354 is input to the signature generation unit 360.

Upon receiving the parameters x1' and x2" from the substitute signing key generation unit 354, the substitute verification key generation unit 356 executes an interaction with the client terminal 150 (specifically, the signing key-related information generation unit 160) and acquires parameters k" and w necessary for generation of the substitute verification key pk". This interaction is executed based on the proxy key generation algorithm which corresponds to the substitute key generation algorithm according to the first and second embodiments. For example, when the proxy key generation algorithm corresponding to the substitute key generation algorithm according to the first embodiment is used, the substitute verification key generation unit 356 provides the parameter y1' to the client terminal 150 as the information on the substitute verification key pk".

As mentioned above, upon receiving the parameter y1', the signing key-related information generation unit 160 of the client terminal 150 provides the information (for example, k" and w) necessary for generation of the substitute verification key pk" to the substitute verification key generation unit 356 based on the parameter y1'. Here, it should be noted that at this stage, the client terminal 150 is unable to estimate the substitute verification key pk" which is determined later. Upon acquiring the parameters k" and w from the client terminal 150, the substitute verification key generation unit 356 generates the substitute verification key pk" using the parameters k" and w. The substitute verification key pk" generated by the substitute verification key generation unit 356 is provided by the communication unit 358 to the verifier terminal 250 via the network 10.

A part of the parameters calculated in this generation step of the substitute verification key pk" may be included in the substitute signing key sk". In such a case, the parameter included in the substitute signing key sk" is input to the substitute signing key generation unit 354 from the substitute verification key generation unit 356 at this stage. As mentioned above, the substitute signing key generation unit 354 generates the substitute signing key sk" using the input parameter. Moreover, the substitute signing key sk" generated by the substitute signing key generation unit 354 is input to the signature generation unit 360.

The signature generation unit 360 is a means for generating the proxy's electronic signature σ using the substitute signing key sk" input from the substitute signing key generation unit 354. The signature generation unit 360 generates an electronic signature σ for an electronic document m using the signature generation algorithm. The electronic document m and the electronic signature σ generated at this stage will be accepted by the substitute verification key pk" that is generated by the substitute verification key generation unit 356. The electronic document m and electronic signature σ pair generated by the signature generation unit 360 is provided to the verifier terminal 250 by the communication unit 358.

Hereinabove, the system configuration of the application example 2 has been described. Next, by referring to FIG. 24, a proxy authentication method according to the application example 2 and an overall processing flow thereof will be described in brief.

Proxy Authentication Method

Reference is made to FIG. 24. As described above, the entities appearing in the application example 2 mainly consist of the four entities, i.e., the system administrator, the client, the proxy, and verifier. In FIG. 24, the procedures performed by the client, the proxy, and the verifier except for the system administrator are described. The procedures will be described below.

Procedures of Client: Key Generation Step

First, a key generation process by the client will be described. The client acquires the system parameter cp from the system administrator. Subsequently, the acquired system parameter cp is input to the key generation algorithm, and a signing key sk and verification key pk pair is generated. After that, the client stores the signing key sk and verification key pk pair.

Procedures of Client and Proxy: Substitute Key Generation Step

Next, a substitute key generation process by the client and the proxy will be described. First, the client prepares the signing key sk and the verification key pk generated in the key generation step and an electronic document $m_w$ including the scope of transferred proxy power, an expiration date, and the like. Subsequently, the client generates an electronic signature $\sigma_w$ for the electronic document $m_w$ using the signing key sk. Subsequently, the client provides the electronic document $m_w$, the electronic signature $\sigma_w$, and the verification key pk to the proxy.

Then, the proxy receives the electronic document $m_w$, the electronic signature $\sigma_w$, and the verification key pk from the client. In this way, when the electronic document $m_w$, the electronic signature $\sigma_w$, and the verification key pk are shared between the client and the proxy, the client and the proxy input the electronic document $m_w$, the electronic signature $\sigma_w$, and the verification key pk to the proxy key generation algorithm corresponding to the substitute key generation algorithm according to the first and second embodiments, thus generating a substitute verification key pk" and a substitute signing key sk" in an interactive manner. During this interaction, the client provides information on the signing key sk to the proxy while preventing the signing key sk from being identified by the proxy.

Procedures of Verifier: Signature Verification Step

Next, a signature verification process by the verifier will be described. The verifier acquires the electronic document m, the electronic signature σ, and the substitute verification key pk" from the proxy. The electronic signature σ acquired at this stage is a signature that the proxy has generated with respect to the electronic document m using the substitute signing key sk". Subsequently, if necessary, the verifier verifies the validity (i.e., the validity of the proxy) of the substitute verification key pk". At that time, the verifier verifies the validity of the substitute verification key pk" using the certificate ($m_w$, $\sigma_w$) acquired from the client using the proxy verification algorithm. When the validity of the substitute verification key pk" is verified, the verifier inputs the substitute verification key pk", the electronic document m, and the electronic signature σ to the signature verification algorithm to verify the electronic signature σ, thus ascertaining the validity of the electronic signature σ.

Procedures of Verifier: Proxy Verification Step

Next, a proxy verification process by the verifier will be described. In the signature verification step, the verifier verifies the validity of the substitute verification key pk" using the proxy verification algorithm. The proxy verification step described in this section relates to this verification process. First, the verifier acquires the verification key pk from the client and prepares the substitute verification key pk" and the certificate ($m_w$, $\sigma_w$). Subsequently, the verifier inputs the substitute verification key pk" and the certificate ($m_w$, $\sigma_w$) to the proxy verification algorithm, thus verifying the validity of the substitute verification key pk" and the certificate ($m_w$, $\sigma_w$).

The proxy verification algorithm is realized by employing the signature verification algorithm according to the first and second embodiments. First, in order to verify the validity of the certificate ($m_w$, $\sigma_w$), the client' verification key pk and the certificate ($m_w$, $\sigma_w$) are input to the signature verification algorithm, and it is then determined whether or not the verification equation is valid. Similarly, in order to verify the substitute verification key pk", the substitute verification key pk" and the certificate ($m_w$, $\sigma_w$) are input to the signature verification algorithm, and it is then determined whether or not the verification equation is valid. That is, the proxy verification algorithm executes these processes. The substitute verification key pk" is accepted when the verification equation is determined to be valid for the two inputs, whereby the validity of the proxy is ascertained.

Hereinabove, the public key authentication method according to the application example 2 has been described. As seen above, the property of the substitute key according to the first and second embodiments can be applied to the proxy signature scheme.

6-3: Application to Role-Sharing Electronic Signature

Next, application to a role-sharing electronic signature will be described in brief. In a typical electronic signature scheme, there is only one verification key that accepts an electronic document and electronic signature pair. For this reason, only one user will assume the responsibility for a certain pair of an electronic document and an electronic signature. However, by using the substitute key generation method according to the first and second embodiment, it is possible to generate a new pair of a verification key (substitute verification key) and a signing key (substitute signing key) that accepts an electronic document and electronic signature pair. For this reason, by allowing another user to generate a substitute verification key and substitute signing key pair, it is possible to share the responsibility for a certain pair of electronic document and electronic signature with the other user. In this way, by using the substitute key generation method according to the first and second embodiments, it is possible to realize a role-sharing electronic signature scheme.

Although not the role-sharing electronic signature scheme, concerning a technique that makes a signer unidentified, the following reports by RONALD L. RIVEST are known (hereinafter referred to as ring signature scheme). RONALD L. RIVEST AND ADI SHAMIR AND YAEL TAUMAN, "How to Leak a Secret", Advances in Cryptology, ASIACRYPT 2001, 7th International Conference on the Theory and Application of Cryptology and Information Security, Gold Coast, Australia, Dec. 9-13, 2001, Proceedings, Springer, Lecture Notes in Computer Science, Volume 2248.

A ring signature scheme relates to a technique that makes it difficult to identify who is a valid signer among the owners of a plurality of selected verification keys. For this reason, application of the ring signature scheme to whistle-blowing is considered. By using a ring signature scheme, it is possible to select a plurality of verification keys "in advance and for the first time" and to generate an electronic signature (ring signature) so as to be accepted by the plurality of selected verification keys. The verification of the ring signature is performed not individually using the respective selected verification keys but is performed by determining whether or not the ring signature is accepted by the plurality of selected verification keys. That is to say, the ring signature scheme is specified by a special signature algorithm capable of generating a ring signature that is accepted by a plurality of verification keys and a special verification algorithm that verifies the ring signature with the plurality of verification keys.

In the case of the substitute key generation method according to the first and second embodiments, the signature generation algorithm is an algorithm that generates an electronic signature accepted by one verification key. Moreover, the verification algorithm is an algorithm for verifying whether or not the electronic signature is accepted by one verification key. Furthermore, the substitute key generation method generates a new verification key that accepts the electronic signature "as a reference matter after a signature is generated". Therefore, after an electronic signature is generated once, it is possible to share the responsibility for the electronic signature with another user. Such role sharing is not achieved even when the ring signature scheme is modified in any way. In this section, just for reference, the difference between the substitute key generation method according to the first and second embodiment and the ring signature scheme, and the superiority of the technique according to the embodiments have been described. As described hereinabove, the substitute key generation method according to the first and second embodiments can be applied in various ways.

The present application contains subject matter related to that disclosed in Japanese Priority Patent Application JP 2009-111578 filed in the Japan Patent Office on Apr. 30, 2009 and Japanese Priority Patent Application JP2009-124035 filed in the Japanese Patent Office on May 22, 2009, the entire contents of which are hereby incorporated by reference.

Although preferred embodiments of the present invention have been shown and described, the present invention is not limited to the described embodiments. It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
a first information providing unit that provides first information to another device holding a first signing key KS corresponding to a first verification key KV, the first information constituting a part of a second verification key KV' (KV'≠KV) that is capable of verifying an electronic signature σ generated using the first signing key KS, the another device being unable to identify the second verification key KV';
a second information acquisition unit that acquires second information which is generated by the other device using the first information and the first signing key KS, the second information acquisition unit being unable to identify the first signing key KS and being used for generating the remaining part of the second verification key KV' excluding the first information; and
a second verification key generation unit that generates the second verification key KV' based on the first information and the second information,
wherein the first information comprises y1' from Equation (1), and the second information comprises a random number w and k" from Equation (2):

$$y1' = g^{x1'} \bmod p \quad (1)$$

$$k'' = k1 + d'' \cdot k2 \bmod q \quad (2).$$

2. The image processing apparatus according to claim 1, wherein:
the first signing key KS is configured to include N1 (N1≧2) parameters; and the second partial information acquisition unit acquires the second information which is generated using parameters generated using the first information and the N1 parameters included in the first signing key KS, and which is unable to identify the individual parameters included in the first signing key KS.

3. The image processing apparatus according to claim 2, wherein:
the second verification key KV' is configured to include N2 (N2 ≧2) parameters; and
the first information providing unit provides M2 (M2<N2) parameters included in the second verification key KV' as the first information.

4. The image processing apparatus according to claim 2, wherein:
the second verification key KV' is configured to include N2 (N2≧2) parameters; and
the first information providing unit provides hash values of M2 (M2<N2) parameters included in the second verification key KV40 and (N2−M2) parameters excluding the M2 parameters as the first information.

5. The image processing apparatus according to claim 1, wherein:
if predetermined arithmetic processing based on random numbers generated by the other device has been subjected to the first information when the information is generated, the second information acquisition unit acquires the random numbers generated by the other device together with the second information; and
the second verification key generation unit generates the second verification key KV' based on the first information, the second information, and the random number.

6. An image processing apparatus comprising:
a storage unit that stores a first verification key KV and a first signing key KS which are in pair;
a first information acquisition unit that acquires information which constitutes a part of a second verification key KV' (KV'≠KV) that is capable of verifying an electronic signature σ generated using the first signing key KS, the first information acquisition unit being unable to identify the second verification key KV';
a second information generation unit that generates second information using the first information acquired by the first information acquisition unit and the first signing key KS, the second information generating unit being unable to identify the first verification key KV and being used for generating the remaining part of the second verification key KV' excluding the first information; and
a second information providing unit that provides the second information generated by the second information generation unit to another device that provided the first information,
wherein the first information comprises y1' from Equation (1), and the second information comprises a random number w and k'' from Equation (2):

$$y1'=g^{x1'} \bmod p \qquad (1)$$

$$k''=k1+d'' \cdot k2 \bmod q \qquad (2).$$

7. The image processing apparatus according to claim 6, wherein:
the first signing key KS is configured to include N1 (N1≧2) parameters; and
the second information generation unit generates the second information using parameters generated using the first information and the N1 parameters included in the first signing key KS, the information being unable to identify the individual parameters included in the first signing key KS.

8. The image processing apparatus according to claim 7, wherein:
the second verification key KV' is configured to include N2 (N2<2) parameters; and
the information acquisition unit acquires M2 (M2<N2) parameters included in the second verification key KV' as the first information.

9. The image processing apparatus according to claim 7, wherein:
the second verification key KV' is configured to include N2 (N2≧2) parameters; and
the first information acquisition unit provides hash values of M2 (M2<N2) parameters included in the second verification key KV' and (N2−M2) parameters excluding the M2 parameters as the first information.

10. The image processing apparatus according to claim 6, further comprising:
a random number generator that generates random numbers; and
an arithmetic processing unit that performs predetermined arithmetic processing on the first information using the random numbers generated by the random number generator, wherein:
the second information generation unit generates the second information using the first information having subjected to the predetermined arithmetic processing by the arithmetic processing unit and the first signing key KS; and
the second information providing unit provides the random numbers used by the arithmetic processing unit together with the second information to the other device.

11. An electronic signature generation system comprising:
a first image processing apparatus;
a second image processing apparatus, wherein:
the first image processing apparatus comprises:
a storage unit that stores a first verification key KV and a first signing key KS which are in pair;
a first information acquisition unit that acquires, from the second image processing apparatus, first information which constitutes a part of a second verification key KV' (KV'≠KV) that is capable of verifying an electronic signature σ generated using the first signing key KS, the first information acquisition unit being unable to identify the second verification key KV';
a second information generation unit that generates second information using the first information acquired by the first information acquisition unit and the first signing key KS, the second information being unable to identify the first verification key KV and being used for generating the remaining part of the second verification key KV' excluding the first information; and
a second information providing unit that provides the second information generated by the second information generation unit to the second image processing apparatus that provided the first information; and,
the second image processing apparatus comprises:
a first information providing unit that provides the first information to the first image processing apparatus;
a second information acquisition unit that acquires the second information; and
a second verification key generation unit that generates the second verification key KV' based on the first information and the second information, wherein the first information comprises y1' from Equation (1), and the second information comprises a random number w and k" from Equation (2):

$$y1' = g^{x1'} \bmod p \quad (1)$$

$$k'' = k1 + d'' \cdot k2 \bmod q \quad (2).$$

12. An electronic signature key generation method comprising:
- a first information providing step of providing first information to another device holding a first signing key KS corresponding to a first verification key KV, the first information constituting a part of a second verification key KV' (KV'≠KV) that is capable of verifying an electronic signature σ generated using the first signing key KS, the another device being unable to identify the second verification key KV';
- a second information acquisition step of acquiring second information which is generated by the other device using the first information and the first signing key KS, the second information being unable to identify the first signing key KS and is used for generating the remaining part of the second verification key KV' excluding the first information; and
- a second verification key generation step of generating the second verification key KV' based on the first information and the second information,
- wherein the first information comprises y1' from Equation (1), and the second information comprises a random number w and k" from Equation (2):

$$y1' = g^{x1'} \bmod p \quad (1)$$

$$k'' = k1 + d'' \cdot k2 \bmod q \quad (2).$$

13. An image processing method comprising:
- a first information acquisition step of acquiring first information which constitutes a part of a second verification key KV' (KV'≠KV) that is capable of verifying an electronic signature σ generated using a first signing key KS that pairs with a first verification key KV, the first information being unable to identify the second verification key KV';
- a second information generation step of generating second information using the first information acquired in the first information acquisition step and the first signing key KS, the second information being unable to identify the first verification key KV and being used for generating the remaining part of the second verification key KV' excluding the first information; and
- a second information providing step of providing the second information generated in the second information generation step to another device that provided the first information,
- wherein the first information comprises y1' from Equation (1), and the second information comprises a random number w and k" from Equation (2):

$$y1' = g^{x1'} \bmod p \quad (1)$$

$$k'' = k1 + d'' \cdot k2 \bmod q \quad (2).$$

14. An electronic signature key generation method comprising:
- a first information acquisition step where a second image processing apparatus provides first information which constitutes a part of a second verification key KV' (KV'≠KV) that is capable of verifying an electronic signature σ generated using a first signing key KS that pairs with a first verification key KV, the first the second image processing apparatus being unable to identify the second verification key KV';
- a first information acquisition step where a first image processing apparatus acquires the first information from the second image processing apparatus;
- a second information generation step where the first image processing apparatus generates second information using the first information acquired in the first information acquisition step and the first signing key KS, the second information being unable to identify the first verification key KV and being used for generating the remaining part of the second verification key KV' excluding the first information;
- a second information providing step where the first image processing apparatus provides the second information generated in the second information generation step to the second image processing apparatus that provided the first information;
- a second information acquisition step where the second image processing apparatus acquires the second information; and
- a second verification key generation step where the second image processing apparatus generates the second verification key KV' based on the first information and the second information,
- wherein the first information comprises y1' from Equation (1), and the second information comprises a random number w and k" from Equation (2):

$$y1' = g^{x1'} \bmod p \quad (1)$$

$$k'' = k1 + d'' \cdot k2 \bmod q \quad (2).$$

15. A non-transitory computer readable medium encoded with a computer program for causing a computer to implement:
- a first information providing function of providing first information to another device holding a first signing key KS corresponding to a first verification key KV, the first information constituting a part of a second verification key KV' (KV'16 KV) that is capable of verifying an electronic signature σ generated using the first signing key KS, the first information providing function being unable to identify the second verification key KV';
- a second information acquisition function of acquiring second information which is generated by the other device using the first information and the first signing key KS, the second information acquisition function being unable to identify the first signing key KS and is used for generating the remaining part of the second verification key KV' excluding the first information; and
- a second verification key generation function of generating the second verification key KV' based on the first information and the second information,
- wherein the first information comprises y1' from Equation (1), and the second information comprises a random number w and k" from Equation (2):

$$y1' = g^{x1'} \bmod p \quad (1)$$

$$k'' = k1 + d'' \cdot k2 \bmod q \quad (2).$$

16. A non-transitory computer readable medium encoded with a computer program for causing a computer to implement:
- a first information acquisition function of acquiring first information which constitutes a part of a second verification key KV' (KV'≠KV) that is capable of verifying an electronic signature σ generated using a first signing key KS that pairs with a first verification key KV, the first information providing function being unable to identify the second verification key KV';

a second information generation function of generating second information using the first information acquired by the first information acquisition function and the first signing key KS, the second information being unable to identify the first verification key KV and being used for generating the remaining part of the second verification key KV' excluding the first partial information; and a second information providing function of providing the second partial information generated by the second information generation function to another device that provided the first information, wherein the first information comprises y1' from Equation (1), and the second information comprises a random number w and k'' from Equation (2):

$$y1' = g^{x1'} \bmod p \quad (1)$$

$$k'' = k1 + d'' \cdot k2 \bmod q \quad (2).$$

17. The image processing apparatus according to claim 1, wherein:

the other device is a certificate authority server;

the image processing apparatus further comprises an ID notification unit that notifies the other device of ID information for identifying itself; and the image processing apparatus generates an electronic document $m_{ID}$ that includes the ID information generated by the other device having receiving a notification from the ID notification unit and a second verification key KV' that accepts an electronic signature $\sigma_{ID}$ generated using the first signing key KS with respect to the electronic document $m_{ID}$ using the first information providing unit, the second information acquisition unit, and the second verification key generation unit, and uses the electronic document $m_{ID}$ and the electronic signature $\sigma_{ID}$ as an electronic certificate for certifying validity of the second verification key KV'.

18. The image processing apparatus according to claim 1, wherein:

the first device is a proxy terminal used by a proxy that substitutes for an electronic signature of a client;

the other device is a client terminal used by the client; and the image processing apparatus generates an electronic document $m_w$ that includes at least a content of a signing power that the client transfers to the proxy and a second verification key KV' that accepts an electronic signature $\sigma_w$ generated using the first signing key KS with respect to the electronic document $m_w$ using the first information providing unit, the second information acquisition unit, and the second verification key generation unit, and uses the electronic document $m_w$ and the electronic signature $\sigma_w$ as a certificate for certifying that the second verification key KV' is recognized by the client.

* * * * *